United States Patent
Kloba et al.

(10) Patent No.: US 6,779,042 B1
(45) Date of Patent: Aug. 17, 2004

(54) SYSTEM, METHOD, AND COMPUTER PROGRAM PRODUCT FOR ENABLING ON-DEVICE SERVERS, OFFLINE FORMS, AND DYNAMIC AD TRACKING ON MOBILE DEVICES

(75) Inventors: David D. Kloba, Mountain View, CA (US); Michael R. Gray, Foster City, CA (US); David M. Moore, San Francisco, CA (US); Thomas E. Whittaker, Belmont, CA (US); David J. Williams, San Francisco, CA (US); Rafael Z. Weinstein, San Francisco, CA (US); Joshua E. Freeman, San Jose, CA (US); Linus M. Upson, Redwood City, CA (US)

(73) Assignee: iAnywhere Solutions, Inc., Dublin, CA (US)

( * ) Notice: Subject to any disclaimer, the term of this patent is extended or adjusted under 35 U.S.C. 154(b) by 0 days.

(21) Appl. No.: 09/559,964

(22) Filed: Apr. 28, 2000

Related U.S. Application Data

(63) Continuation-in-part of application No. 09/393,390, filed on Sep. 10, 1999.
(60) Provisional application No. 60/173,807, filed on Dec. 30, 1999, and provisional application No. 60/189,969, filed on Mar. 17, 2000.

(51) Int. Cl.[7] .............................................. G06F 15/16
(52) U.S. Cl. ...................................... 709/248; 709/230
(58) Field of Search ................................ 709/248, 249, 709/250, 203, 217, 246, 218; 715/501.1, 513

(56) References Cited

U.S. PATENT DOCUMENTS

| | | | |
|---|---|---|---|
| 5,349,678 A | 9/1994 | Morris et al. | 395/800 |
| 5,377,326 A | 12/1994 | Murata et al. | 395/200 |
| 5,392,390 A | 2/1995 | Crozier | 395/161 |

(List continued on next page.)

FOREIGN PATENT DOCUMENTS

| | | |
|---|---|---|
| EP | 0 848 339 A1 | 6/1998 |
| EP | 0 876 034 A2 | 11/1998 |
| EP | 0 944 009 A2 | 9/1999 |
| WO | WO 94/12938 | 6/1994 |
| WO | WO 98/34203 | 8/1998 |
| WO | WO 98/34422 | 8/1998 |
| WO | WO 99/22322 | 5/1999 |
| WO | WO 99/35802 A1 | 7/1999 |
| WO | WO 00/14625 | 3/2000 |

OTHER PUBLICATIONS

"Method for bookmarking web pages of temporary interest," Research Disclosure, RD429108, Disclosed by Ericsson, Inc., Jan. 2000, Kenneth Mason Publications, Ltd., http://www.researchdisclosure.com, 1 page.

"Appointments Off By One Hour After Synchronization," http://support.microsoft.com/support/kb/articles/q195/5/79.asp, last reviewed Sep. 2, 1999, provided by Microsoft Product Support Serivces, 1 page.

"Russian Nino Computer," http://webideas.com/russian/systems.nino301.htm, last visited Jul. 25, 2000, Web Ideas Int'l Co., 1 page.

(List continued on next page.)

*Primary Examiner*—Zarni Maung
(74) *Attorney, Agent, or Firm*—Sterne, Kessler, Goldstein, Fox P.L.L.C.

(57) ABSTRACT

Described herein are systems, methods, computer program products, and combinations and sub-combinations thereof, for enabling web content (as well as other objects) to be loaded on mobile devices (as well as other types of devices), and for users of mobile devices to operate with such web content on their mobile devices in an interactive manner while in an off-line mode.

36 Claims, 73 Drawing Sheets

U.S. PATENT DOCUMENTS

| | | | |
|---|---|---|---|
| 5,410,543 A | 4/1995 | Seitz et al. | 370/85.13 |
| 5,426,594 A | 6/1995 | Wright et al. | 364/514 R |
| 5,666,530 A | 9/1997 | Clark et al. | 395/617 |
| 5,666,553 A | 9/1997 | Crozier | 395/803 |
| 5,673,322 A | 9/1997 | Pepe et al. | 380/49 |
| 5,684,828 A | 11/1997 | Bolan et al. | 375/238 |
| 5,684,990 A | 11/1997 | Boothby | 395/619 |
| 5,694,546 A | 12/1997 | Reisman | 395/200.9 |
| 5,727,129 A | 3/1998 | Barrett et al. | 395/12 |
| 5,727,159 A | 3/1998 | Kikinis | 395/200 |
| 5,727,202 A | 3/1998 | Kucala | 395/610 |
| 5,732,074 A | 3/1998 | Spaur et al. | 370/313 |
| 5,740,364 A | 4/1998 | Drerup | 395/200.09 |
| 5,754,774 A | 5/1998 | Bittinger et al. | 395/200.33 |
| 5,768,511 A | 6/1998 | Galvin et al. | 395/200.33 |
| 5,790,977 A | 8/1998 | Ezekiel | 702/122 |
| 5,794,259 A | 8/1998 | Kikinis | 707/507 |
| 5,799,063 A | 8/1998 | Krane | 379/67 |
| 5,802,292 A | 9/1998 | Mogul | 395/200.33 |
| 5,805,807 A | 9/1998 | Hanson et al. | 395/200.09 |
| 5,809,242 A | 9/1998 | Shaw et al. | 395/200.47 |
| 5,813,007 A | 9/1998 | Nielsen | 707/10 |
| 5,832,489 A | 11/1998 | Kucala | 707/10 |
| 5,850,517 A | 12/1998 | Verkler et al. | 395/200.32 |
| 5,862,339 A | 1/1999 | Bonnaure et al. | 395/200.57 |
| 5,862,346 A | 1/1999 | Kley et al. | 395/200.73 |
| 5,864,676 A | 1/1999 | Beer et al. | 395/200.59 |
| 5,873,100 A | 2/1999 | Adams et al. | 707/204 |
| 5,877,766 A | 3/1999 | Bates et al. | 345/357 |
| 5,881,234 A | 3/1999 | Schwob | 395/200.49 |
| 5,884,323 A | 3/1999 | Hawkins et al. | 707/201 |
| 5,890,158 A | 3/1999 | House et al. | 707/10 |
| 5,895,471 A | 4/1999 | King et al. | 707/104 |
| 5,896,502 A | 4/1999 | Shieh et al. | 395/200.54 |
| 5,906,657 A | 5/1999 | Tognazzini | 709/248 |
| 5,917,491 A * | 6/1999 | Bauersfeld | 345/810 |
| 5,918,013 A | 6/1999 | Mighdoll et al. | 395/200.47 |
| 5,918,237 A | 6/1999 | Montalbano | 707/513 |
| 5,919,247 A | 7/1999 | Van Hoff et al. | |
| 5,922,045 A | 7/1999 | Hanson | 709/206 |
| 5,928,329 A | 7/1999 | Clark et al. | 709/227 |
| 5,937,163 A | 8/1999 | Lee et al. | 395/200.48 |
| 5,943,676 A | 8/1999 | Boothby | 707/201 |
| 5,946,697 A | 8/1999 | Shen | 707/104 |
| 5,948,066 A | 9/1999 | Whalen et al. | 709/229 |
| 5,953,392 A | 9/1999 | Rhie et al. | 379/88.13 |
| 5,954,795 A | 9/1999 | Tomita et al. | 709/218 |
| 5,961,601 A | 10/1999 | Iyengar | 709/229 |
| 5,961,602 A | 10/1999 | Thompson et al. | 709/229 |
| 5,974,238 A | 10/1999 | Chase, Jr. | 395/200.78 |
| 5,978,828 A | 11/1999 | Greer et al. | 709/2.24 |
| 5,978,833 A | 11/1999 | Pashley et al. | 709/200 |
| 5,978,842 A | 11/1999 | Noble et al. | 709/218 |
| 5,987,454 A | 11/1999 | Hobbs | 707/4 |
| 5,987,476 A | 11/1999 | Imai et al. | 707/201 |
| 5,987,499 A | 11/1999 | Morris et al. | 709/203 |
| 5,991,800 A | 11/1999 | Burke et al. | 709/218 |
| 6,000,000 A | 12/1999 | Hawkins et al. | 707/201 |
| 6,006,231 A | 12/1999 | Popa | 707/101 |
| 6,006,274 A | 12/1999 | Hawkins et al. | 709/248 |
| 6,009,462 A | 12/1999 | Birrell et al. | 709/206 |
| 6,012,083 A | 1/2000 | Savitzky | 709/202 |
| 6,021,433 A | 2/2000 | Payne et al. | 709/219 |
| 6,023,698 A | 2/2000 | Lavey, Jr. et al. | 707/10 |
| 6,023,708 A | 2/2000 | Mendez et al. | 707/203 |
| 6,026,474 A | 2/2000 | Carter et al. | 711/202 |
| 6,029,175 A | 2/2000 | Chow et al. | 707/104 |
| 6,029,195 A | 2/2000 | Herz | 709/219 |
| 6,032,162 A | 2/2000 | Burke | 707/501 |
| 6,035,324 A | 3/2000 | Chang et al. | 709/203 |
| 6,041,360 A | 3/2000 | Himmel et al. | 709/245 |
| 6,049,821 A | 4/2000 | Theriault et al. | 709/203 |
| 6,052,735 A | 4/2000 | Ulrich et al. | 709/236 |
| 6,058,416 A | 5/2000 | Mukherjee et al. | 709/203 |
| 6,061,718 A | 5/2000 | Nelson | 709/206 |
| 6,065,051 A | 5/2000 | Steele et al. | 709/219 |
| 6,065,059 A | 5/2000 | Shieh et al. | 709/233 |
| 6,070,184 A | 5/2000 | Blount et al. | 709/200 |
| 6,076,109 A | 6/2000 | Kikinis | 709/228 |
| 6,085,192 A | 7/2000 | Mendez et al. | 707/10 |
| 6,119,167 A | 9/2000 | Boyle et al. | 709/234 |
| 6,122,658 A * | 9/2000 | Chaddha | 709/203 |
| 6,131,096 A | 10/2000 | Ng et al. | 707/10 |
| 6,148,330 A | 11/2000 | Puri et al. | 709/217 |
| 6,161,146 A | 12/2000 | Kley et al. | 709/248 |
| 6,167,255 A | 12/2000 | Kennedy, III et al. | 455/414 |
| 6,182,122 B1 * | 1/2001 | Berstis | 709/217 |
| 6,195,692 B1 | 2/2001 | Hsu | 709/219 |
| 6,209,027 B1 | 3/2001 | Gibson | 709/218 |
| 6,209,111 B1 | 3/2001 | Kadyk et al. | 714/747 |
| 6,226,650 B1 | 5/2001 | Mahajan et al. | 707/201 |
| 6,236,991 B1 * | 5/2001 | Frauenhofer et al. | 707/6 |
| 6,341,316 B1 * | 1/2002 | Kloba et al. | 709/248 |
| 6,447,396 B1 * | 9/2002 | Galyean et al. | 463/40 |
| 6,493,758 B1 * | 12/2002 | McLain | 709/227 |
| 6,519,627 B1 * | 2/2003 | Dan et al. | 709/203 |

OTHER PUBLICATIONS

"512KB Organizer w/Synchronization," http://www.codemicro.com/fs/p11109.html, last visited Jul. 25, 2000, codemicro.com.

"Synchronization Between Your Handheld PC and Desktop PC," http://www.microsoft.com/MOBILE/hpc/features/synch.asp, last visited Jul. 25, 2000, Microsoft, Inc., 1 page.

"Puma Adds Security to Wireless Syncing Software," http://devices.internet.com/news/q29908/990802puma/990802puma.html, last visited Jul. 25, 2000, Copyright 1999, internet.com Corp., 1 page.

"iMobile Data Synchronization Replicates Mobile Databases," http://www.synchrologic.com/about/about_imobile_data_synchronization.html, 2 pages, last visited Jul. 25, 2000, Synchrologic, Inc.

"WeSync.com Previews Wireless Synchronization Solution for Handheld Computers: Collaborative Service for Handheld Users Moves Into Public Beta Today; Wireless Refresh (TM) Lets Users Perform Narrow Bandwidth Wireless Syncs," http://www.palmsizepc.com/oct99–20–1.html, last visited Jul. 25, 2000, 3 pages, WeSync.com, Inc.

"XTNDConnect Server White Papers," http://www.extendsys.com/prodinfo/white/serversync/, last visited Jul. 25, 2000, 1 page, Extended Systems, Inc.

"Introduction to Wireless Internet & Mobile Computing Market," Copyright 1999, Wireless Internet & Mobile Computing, http://www.wirelessinternet.com/introto1.htm, last visited Jul. 24, 2000, 4 pages.

"Databites," http://www.databites.com/company_info.htm, Databites Corporation, 2 pages, last visited Jul. 26, 2000.

"Tools for the TEKS: Integrating Technology in the Classroom: Offline Web Browsing=No More Excuses!," Copyright 1998, Wesley A. Fryer, last visited Jun. 22, 2000, http://www.wtvi.com/teks/article4.html, 9 pages.

Story, Derrick "Palm Browsing," Miller–Freeman, Inc., Jul. 30, 1999, http://www.webreview.com/pub/1999/07/30/feature/index.html, 2 pages.

Shultz, Greg "Take Advantage of Offline Browsing Tools: Learn to browse Web site content without being connected to the Internet," last visited Jun. 22, 2000, http://www.zdnet.com/zdhelp/stories/main/0,5594,2395480,00.html, Copyright 2000, ZD Inc., 2 pages.

Dalrymple, Jim "Palm–like Internet appliance on the way from 3Com," Mar. 27, 2000, http://www.maccentral.com/news/0003/27.palm.shtml, Mac Publishing LLC, 3 pages.

"Offline Reading," http://www.microsoft.com/windows/Ie/Features/offline.asp, last updated Mar. 18, 1999, Microsoft Corporation, 1 page.

"InContext FlashSite," http://ipw.internet.com/clients_servers/offline_browsers/916161991.html, internet.com Corporation, Jan. 12, 1999, 2 pages.

"AvantGo Enterprise™," http://avantgo.com/enterprise/products/index.html, Copyright 2000 AvantGo, Inc., 2 pages, last visited Jun. 21, 2000.

"PalmPilot Software Programming and Development," http://www.pencomputersolutions.com/, Pen Computer Solutions, Inc., 4 pages, last edited Jun. 16, 2000.

"Pocket Browser 1.52 for Palm–size PC," http://www.ceshopper.com/ceshopper/pocketbrowser.html, Copyright 2000, CEShopper.com, last visited Jun. 22, 2000, 1 page.

"Answer & Tips: Browse the web on any palm," http://web.zdnet.com/zdtv/screensavers/answerstips/story/0,3656,2408515,00.html , 2 pages, Copyright 1997–2000, ZDTV LLC, last visited Jun. 22, 2000.

"Palm Announces Mobile Internet Kit, Linking Palm Handhelds With Mobile Phones for Wireless Web Connectivity: New Web Clipping Applications to Provide Out–of–the–box Access to Leading Internet Content," http://biz.yahoo.com/bw/000627/ny_palm_2.html, Yahoo!, Jun. 27, 2000, 3 pages.

"GoAmerica Licenses Oracle Platform," http://www.allnet-devices.com/wireless/news/2000/06/27/goamerica_licenses.html, internet.com Corp, Jun. 27, 2000, 2 pages.

"ProxiWeb," http://aolcom.cnet.com/downloads/0–10126–100–1757359.html?tag=st.dl.10126_106_1.1st.td, Apr. 25, 2000, CNET Networks, Inc., 2 pages.

Wilcox, Joe, "IBM aims to put computers on the wrist," http://cnet.com/news/0–1006–200–2160685.html, CNET Networks, Inc., Jun. 27, 2000, 3 pages.

Portable Internet, http://www.portableinternet.com/, Copyright 2000, Portable Internet, Inc., last visited on Jul. 5, 2000, 1 page.

BravuraNet, http://www.bravurnet.com, Copyright 2000, BravuraNet, last visited Jul. 13, 2000.

"HotLinks: Store Bookmarks Online," http://www.zdnet.com/pcmag/stories/firstlooks/0,6763,2403245,00.html, Dec. 3, 1999, ZD Inc., 2 pages.

"MyBookmarks™," http://www.mybookmarks.com, Copyright 2000, MyBookmarks.com, LLC, last visited Jul. 13, 2000, 1 page.

AvantGo Server Administration Guide, Version 2.0 for Windows NT, AvantGo Inc., Sep. 1988, 135 pages.

Press Release, "AvantGo Presents Mobile Computing Software at Herring On the Enterprise: Organizations such as Grenley–Stewart Resources and Rosenbluth International Already Reaping Benefits," Apr. 6, 1998, AvantGo, Inc.

Press Release, "AvantGo to Demonstrate New Enterprise Applications for the 3Com® PalmPilot™ Connected Organizer at Seybold '98: Applications Enable Networked Digital Workflows for Publishing Environments," 2 pages, Mar. 17, 1998, AvantGo, Inc.

Press Release, "AvantGo Software Extends Enterprise Applications to Handheld Devices: New Company Provides Instant Access to Essential Information for Mobile Professionals," 3 pages, Feb. 17, 1998, AvantGo, Inc.

Press Release, "Visto and AvantGo Team to Extend Web–Based Personal Content to Palm Pilot and Windows CE Devices: Visto Briefcase Will Leverage AvantGo 2.0 for Mobile Workforce," 2 pages, Sep. 21, 1998, AvantGo, Inc.

Press Release, "UpShot Partners with AvantGo to Display Latest Sales Data on Handhelds: Field Sales Representatives Will Have the Power of Sales Automation at Their Fingertips," 2 pages, Sep. 21, 1998, AvantGo, Inc.

Press Release, "AvantGo Announces Business Partner Program: VARs,Systems Integrators, Distributors and Consultants to Deliver Enterprise Applications for Handheld Computers," 2 pages, Sep. 21, 1998, AvantGo, Inc.

Press Release, "Industry Bigshots and Upstarts Rally Around AvantGo 2.0: Microsoft, IBM, Oracle, Symbol Technologies and Palm Computing Support AvantGo," 3 pages, Sep. 21, 1998, AvantGo, Inc.

Press Release, "Novatel Wireless and AvantGo Team Up to Provide Corporate Information to Wirelessly–Enabled Handhelds: Minstrel Modem and AvantGo 2.0 Extend Enterprise Connectivity," 2 pages, Sep. 21, 1998, AvantGo, Inc.

Press Release, "AvantGo Releases AvantGo 2.0– The Definitive Enterprise Solution for Managing Mobile Information: New Product Offering Provides Centralized Administration, Universal Remote Access and Mobile Transactions Between Corporate Databases and Handhelds," 3 pages, Sep. 21, 1998, AvantGo, Inc.

Press Release, "Casio Announces Support for AvantGo: AvantGo to Deliver Enterprise Applications for Casio's Windows CE–Compatible Devices," 2 pages, Sep. 21, 1998, AvantGo, Inc.

AvantGo Desktop and AvantGo WebClient for the 3Com PalmPilot™ Connected Organizer, "Readme," 2 pages, Jan. 20, 1998, AvantGo, Inc.

Press Release, AvantGo Integrated Into Pocket Internet Explorer for Pocket PCs: AvantGo Available on New Pocket PC Devices from Casio, Compaq, Hp and Symbol Technologies, 3 pages, Apr. 19, 2000, AvantGo, Inc.

Press Release, "AvantGo Completes $31 Million Mezzanine Financing: Goldman Sachs, American Express, Ford Motor Company, McKessonHBOC and Research In Motion (RIM) Accelerate Growth of Business–to–Business Mobile Internet Company," 2 pages, Apr. 17, 2000, AvantGo, Inc.

Press Release, "AvantGo Empowers BG's Leading Lights with Mobile Intranet and Internet Access: Mobile Software gives International Energy Company an Advantage in Customer care and Business Management," 3 pages, Apr. 4, 2000, AvantGo, Inc.

Press Release, "AvantGo Embraces Macintosh Community: AvantGo Delivers Free Mobile Internet Service to Macintosh Users," 2 pages, Mar. 27, 2000, AvantGo, Inc.

Press Release, "AvantGo Joins GPRS Application Alliance: AvantGo Teams up with Ericsson to support Wireless Standards for Mobile Devices," 2 pages, Feb. 28, 2000, AvantGo, Inc.

Press Release, "AvantGo Integrated in Microsoft's Internet Explorer for the Pocket PC: Out of the Box, Mobile Users Gain Access to the Mobile Internet via Pocket Internet Explorer and AvantGo," 2 pages, Feb. 24, 2000, AvantGo, Inc.

Press Release, "AvantGo Joins Motorola Web w/o Wires Alliance Program: AvantGo Now Easily Accessible from Motorola Web Phones," 2 pages, Feb. 24, 2000, AvantGo, Inc.

Press Release, "AvantGo Optimizes User Experience On Palm IIIc™ Handheld Computers: With enhanced image support from AvantGo, Users Can View Web–Based Photos and Graphics in Color On New Devices," 2 pages, Feb. 24, 2000, AvantGo, Inc.

Press Release, "AvantGo.Com Bolsters Business Channels: New relationships with Business Week, Infonautics, The Economist, Fidelity Investments and The Financial News among the more than 80 Optimized AvantGo.com Business Channels for Mobile Device Users," 2 pages, Feb. 16, 2000, AvantGo, Inc.

Press Release, "Leading Labels and Music Sites Go Mobile With AvantGo.Com: Columbia Records, Universal's Interscope Geffen A&M, Ticketmaster Online–CitySearch's LiveDaily.com and Milor Entertainment Group join Amazon.com and mySimon.com to bring the Music Industry to Mobile Devices," 2 pages, Feb. 14, 2000, AvantGo, Inc.

Press Release, "AvantGo Names Head of Dell Online, Richard Owen, CEO: Mobile Computing Leader Bolsters Management Team With Key New Hires," Jan. 25, 2000, AvantGo, Inc.

Press Release, "AvantGo Expands Relationship with InfoSpace.com: AvantGo to offer InfoSpace.com's Mobile Private Label Portals to Users of Palm Computing Platform, Windows CE and Wireless PDAs," 2 pages, Jan. 18, 2000, AvantGo, Inc.

Press Release, "AvantGo.Com Available to Macintosh Users," Jan. 5, 2000, AvantGo, Inc.

Press Release, "Verian Technologies and AvantGo Team Up to Resell Mobile Procurement Application: Bundled Software Package from Verian Provides Improved Inventory Management for Mobile Professionals," 2 pages, Jan. 3, 2000, AvantGo, Inc.

Press Release, "AvantGo Drives Healthcare Market Adoption of Handheld Devices: CHW, Mass General, McKessonHBOC, US Surgical, Norton Healthcare, Handheldmed-.com, FitForAll.com and Asimba.com Select AvantGo to Deliver Critical Health Information to Mobile Devices," 3 pages, Dec. 14, 1999, AvantGo, Inc.

Press Release, "AvantGo Announces New AvantGo Enterprise Publisher: Mobile Leader Expands Enterprise Offerings to Extend Corporate Web Content to Mobile Devices," 2 pages, Dec. 6, 1999, AvantGo, Inc.

Press Release, "Go Network Delivers Mobile Solutions with AvantGo: Partnership to Give Wireless Users Access to GO Network Anytime, Anywhere," 2 pages, Nov. 11, 1999, AvantGo, Inc.

Press Release, "AvantGo Delivers Award–Winning Mobile Computing Software and Popular Consumer Internet Service to Europe: Company Expands into Europe: Phillip Hibberd to Head European Operations," 2 pages, Nov. 1, 1999, AvantGo, Inc.

Press Release, "AvantGo Mobile Unity Brings the Web to Wireless Devices: Mobile Computing Leader Brings the Web to Internet–enabled Phones and Wireless Handheld Devices; Integrates with Wireless Solutions," 4 pages, Oct. 25, 1999, AvantGo, Inc.

Press Release, Leading Mobile Computing Companies Form Industry Association: Puma, Aether Systems, Attachmate, AvantGo, Certicom, Globalware, Epocrates and the Windward Group Establish Mobile Application Link Forum to Advance and Promote Open Source Communications Protocol for Networked Applications, 3 pages, Oct. 18, 1999, AvantGo, Inc.

Press Release, "AvantGo Ships with New Special Edition Palm Vx™ Organizer," 2 pages, Oct. 13, 1999, AvantGo, Inc.

Press Release, "FT.Com and AvantGo Put the Latest International Business News in the Palm of Your Hand," 2 pages, Oct. 4, 1999, AvantGo, Inc.

Press Release, "Amazon.com First to Join AvantGo.com E–Commerce Initiative," 2 pages, Oct. 4, 1999, AvantGo, Inc.

Press Release, "AvantGo Teams With HP: AvantGo.com Now Available on the New HP Jornada 430se Palm–size PC," 2 pages, Sep. 27, 1999, AvantGo, Inc.

Press Release, "Sony Online Entertainment and AvantGo Announce Jeopardy! 2001 Online to be Delivered to Users of Handheld Devices: The Station @sony.com ventures beyond the Internet to extend distribution," 2 pages, Sep. 20, 1999, AvantGo, Inc.

Press Release, "AvantGo.com Scales to Showcase the Power of AvantGo Enterprise 3: Free Interactive Service Delivers More That 15 Million Web Pages Daily to Hundreds of Thousands of Users," 2 pages, Sep. 7, 1999, AvantGo, Inc.

Press Release, "AvantGo Enterprise 3 Breaks Barrier Between Enterprise and Handhelds: Attachmate Corporation and AvantGo enter Into Business Alliance," 3 pages, Sep. 7, 1999, AvantGo, Inc.

Press Release, "AvantGo Signs CFO Thomas Hunter: Former IBM and First Data Corp. Executive Joins Leading Handheld Software Provider," Aug. 23, 1999, AvantGo, Inc.

Press Release, Microsoft and AvantGo Deliver Personalized Content from Slate to AvantGo.com: Customized Information from Slate Now Available to Users of Palm OS–and Windows CE–Based Handheld Devices Through AvantGo.com, 2 pages, Aug. 9, 1999, AvantGo, Inc.

Press Release, "Salon.com to Provide Content for Palm Pilots and other Handheld Devices through AvantGo.com: News, Technology and other content from Salon.com now available to over 300,000 AvantGo.com subscribers," 2 pages, Jul. 26, 1999, AvantGo, Inc.

Press Release, "WisdomWare Partners with AvantGo to Provide Handheld Marketing and Sales Intelligence Solution: Reseller Agreement Enables Planned WisdomWare AnyWhere™ Service," 2 pages, Jul. 26, 1999, AvantGo, Inc.

Press Release, "Ontheroad.com Snapshots Double Every Two Weeks with AvantGo.com," 2 pages, Jul. 19, 1999, AvantGo, Inc.

Press Release, "AvantGo Partners with Vicinity to Provide Mapblast! Maps and directions to Handheld Device Users Through AvantGo.com," 2 pages, Jun. 28, 1999, AvantGo, Inc.

Press Release, "Microsoft and 3Com Invest in AvantGo: Mobile Computing Leader takes $14.7 Million in Third Round Funding from Microsoft, 3Com, Fayez Sarofim & Co., $21^{st}$ Century Internet Venture Partners, H & Q Venture Associates and Adobe Ventures," 3 pages, Jun. 18, 1999, AvantGo, Inc.

Press Release, "AvantGo Teams with The Wall Street Journal Interactive Edition to Introduce New Personalized Content for AvantGo.com: AvantGo.com Provides News Services to PalmOS and Windows CE handheld users," 2 pages, May 17, 1999, AvantGo, Inc.

Press Release, "AvantGo.com Bolstered by Name Brand Handheld Makers, Wireless Providers and Content Publishers: Microsoft, Phillips, Casio, IBM, AT&T Wireless, GoAmerica, Novatel Wireless and Others Endorse Interactive Service with 100 Optimized Channels from Leading Content Providers," 6 pages, May 10, 1999, AvantGo, Inc.

Press Release, "AvantGo Unleashes AvantGo.com, the First Free Interactive Service for Mobile Device Users: New Personalized Service Puts the Power of the Web in the Palm of Your Hand," 3 pages, May 10, 1999, AvantGo, Inc.

Press Release, "David Harris Joins AvantGo as Vice President of Worldwide Sales and Business Development: Former Member of Adobe Senior Management Signs on with Industry–Leading Mobile Computing Company," 2 pages, Apr. 19, 1999, AvantGo, Inc.

Press Release, "AvantGo Logo Created by 1185 Design Recognized as Outstanding: Design Receives Prestigious Communications Arts (CA) Magazine Award; Logo to Appear in CA and American Corporate Identity Publications," Mar. 29, 1999, AvantGo, Inc.

Press Release, "AvantGo Licenses Certicom's SSL Plus for Embedded Systems: Advanced Certicom security Technology now Available to Mobile Enterprise customers Using AvantGo with Windows CE and Palm Computing handhelds," 2 pages, Apr. 13, 1999, AvantGo, Inc.

Press Release, "AvantGo Integrates Seamlessly with New Minstrel III by Novatel Wireless: Interactive Wireless Data Capabilities Allow Real–time Access to Critical Information on Palm Computing Platform Devices," 2 pages, Apr. 6, 1999, AvantGo, Inc.

Press Release, "AvantGo and Microsoft Silicon Valley Developer Center to Offer Free Seminars to Enterprise Interested in Extending Applications to Windows CE–Based Devices: Attendees Can Register Today for Technical Sessions on Apr. 26–27 and May 24–25," 2 pages, Mar. 16, 1999, AvantGo, Inc.

Press Release, "AvantGo and the Windward Group Offer Free Seminars to Enterprises Interested in Extending Applications to Mobile Devices: Attendees Can Register Today for Bay Area Sessions on Apr. 28 & 29," 2 pages, Mar. 15, 1999, AvantGo, Inc.

Press Release, "AvantGo Recognized Again for Execllence in Mobile Computing: Mobile Insights Chooses AvantGo as Best Mobile Computing Solution in "Wireless Internet and Intranet" Category," 2 pages, Mar. 8, 1999, AvantGo, Inc.

Press Release, "AvantGo and Puma Deliver Open Source Code for Handheld–to–Server Connectivity: Microsoft, Sybase and Symbol Support Mobile Application Link as Key to Corporate Handheld Market Growth," 2 pages, Mar. 1, 1999, AvantGo, Inc.

Press Release, "AvantGo Takes Home Seven Leading Industry Awards: Hot Mobile Computing Software Company Recognized During 1998 for Creativity, Innovation and Candor," Feb. 8, 1999, AvantGo, Inc.

Press Release, "AvantGo Receives Two Awards from Tap Magazine," Feb. 26, 1999, AvantGo, Inc.

Press Release, "Symbol Technologies and AvantGo Announce Relationship To Provide Barcode Scanning Web Client on Symbol's New Palm Terminals," 2 pages, Feb. 1, 1999, AvantGo, Inc.

Press Release, "AvantGo Announces Support for the Latest Version of Windows CE for the Palm–Size PC: Leader in Managing Mobile Information Allows its Growing Number of Users to Take Advantage of More Windows CE Functionality, Including Color," 2 pages, Feb. 1, 1999, AvantGo, Inc.

Press Release, "InfoSpace.com and AvantGo Deliver New Optimized Channels of Web Content to Handheld Devices: Companies introduce a comprehensive offering of Web content for handhelds," 2 pages, Jan. 28, 1999, AvantGo, Inc.

Press Release, "CNNfn and AvantGo Team Up to Help Users Keep Track of Breaking Business News on their Handheld Devices," 2 pages, Jan. 26, 1999, AvantGo, Inc.

Press Release, "CommerceNet Awards Ecommerce Innovation: AvantGo, Brokat, DealTime, eBay, and General Magic Receive Awards," Dec. 16, 1998, AvantGo, Inc.

Press Release, "AvantGo and Puma Technology Join Forces on Open Industry Initiative for Mobile Device/Corporate Enterprise Application Connectivity: Mobile Application Link Initiative Lauded as Key to Market Growth," 3 pages, Dec. 2, 1998, AvantGo, Inc.

Press Release, "The Sporting News to Delivery News, Scores to Handheld Devices: The Sporting News Teams with AvantGo to Offer In–Depth News, Analysis and Scores to Portable Platforms," 2 pages, Nov. 20, 1998, AvantGo, Inc.

Press Release, "Knight Ridder Real Cities and AvantGo Team up to Provide City Sites, News and Information on Handheld Computers: Visitors to Sites Have a Chance to Win Free Palm III Organizers in Introductory Contest," 2 pages, Nov. 18, 1998, AvantGo, Inc.

Press Release, "AvantGo and Oracle Team up to Deliver Mobile Applications to Handheld Devices: Combination of AvantGo and Oracle Lite Enables Unique Mobile Device Access to Oracle8i," 2 pages, Nov. 9, 1998, AvantGo, Inc.

Press Release, "Ziff–Davis and AvantGo Bring Award Winning Content From ZDNet.com to Handlheld Devices," 2 pages, Oct. 26, 1998, AvantGo, Inc.

Press Release, "USA Today Online Partners with AvantGo to Deliver News, Sports & Money Briefs, Travel Tips and Dow Jones Charts to Users of Handheld Devices," 2 pages, Oct. 20, 1998, AvantGo, Inc.

Press Release, "IndustryWeek and AvantGo Team Up to Deliver Management Best Practices News and Information to Users of Handheld Devices," 2 pages, Oct. 6, 1998, AvantGo, Inc.

Press Release, "The Industry Standard and AvantGo Team Up to Deliver News to Portable Devices: New Business Publication Takes Advantage of Publishing Trend Toward New Delivery Formats," 2 pages, Aug. 24, 1998, AvantGo, Inc.

Press Release, "AT&T Executive Joins AvantGo Board of Directors: Robert J. Lesko Brings Global Services Expertise to Hot Start–Up," Aug. 10, 1998, AvantGo, Inc.

Press Release, "AvantGo Announces Agreement to Deliver News From The Wall Street Journal Interactive Edition to Handheld Computers," 2 pages, Aug. 3, 1998, AvantGo, Inc.

Press Release, "Get Your Five–Day Weather Forecast–On A Handheld: Weather24 and AvantGo Deliver "Market to Go" Content for Mobile Computer Users," 2 pages, Jun. 29, 1998, AvantGo, Inc.

Press Release, "News America Digital Publishing Teams with AvantGo to Provide News, Sports, Business and Entertainment Information to Mobile Users," 2 pages, Jun. 22, 1998, AvantGo, Inc.

Press Release, "AvantGo Secures $3.5 Million in Venture Capital: Hambrecht & Quist, Adobe Ventures and $21^{st}$ Century Internet Venture Partners Invest; Chris Hollenbeck Joins AvantGo Board of Directors," 2 pages, Jun. 8, 1998, AvantGo, Inc.

Press Release, "AvantGo Signs Stuart Read As Vice President of Marketing: Past Founder of Diba Joins Fast Growing Mobile Computing Company," May 26, 1998, AvantGo, Inc.

Press Release, "AvantGo Teams with Leading Publishers to Serve Up News for Mobile Users: Wired Digital, The New York Times, Mercury Center, InfoWorld and CNET Deliver Content for Handhelds," 3 pages, May 18, 1998, AvantGo, Inc.

Press Release, "AvantGo Wins DBMS Magazine Editor's Choice Award: Hot Mobile Computing Software Start–Up Recoginzed for Creativity and Innovation," Apr. 20, 1998, AvantGo, Inc.

Press Release, "AvantGo Licenses Java Technology to Palm Computing for the Conduit Development Kit, Java Edition: Technology Extends Enterprise Java Applications to the 3Com Palm Pilot Connected Organizer," 2 pages, Mar. 23, 1998, AvantGo, Inc.

"Shop for Everything: Store Your Online Bookmarks or Favorites on the Web," http://www.shop–for–everything.com/freestuff/bookmarks–favorites.html, last visited Jul. 13, 2000, 1 page.

Copy of Examination Report, From GB 0207917.6, Mailed Dec. 5, 2003, 3 pages.

Lei, H. et al., "DataX: An Approach to Ubiquitous Database Access," $2^{nd}$ IEEE Workshop on Mobile Computing Systems and Applications (WMCSA), 1999 Proceedings, New Orleans, LA, Feb. 25–26, 1999, IEEE Comput. Soc., Los Alamitos, CA, pp. 70–79.

Kalakota, R., "Information Supply–Chains and Webcasting: A Design Framework," Fourth International Workshop on Community Networking, Proceedings, 1997, Atlanta, GA, Sept. 11–12, 1997, IEEE, NY, NY, pp. 103–111.

Joshi A. et al., "On Disconnected Browsing of Distributed Information," Seventh International Workshop on Research Issues in Data Engineering, 1997 Proceedings, Birmingham, UK, Apr. 7–8, 1997, IEEE Comput. Soc., Los Alamitos, CA, pp. 101–107.

Copy of Invitation to Pay Additional Fees, From PCT/US00/11438, Mailed Jun. 5, 2003, 6 pages.

* cited by examiner

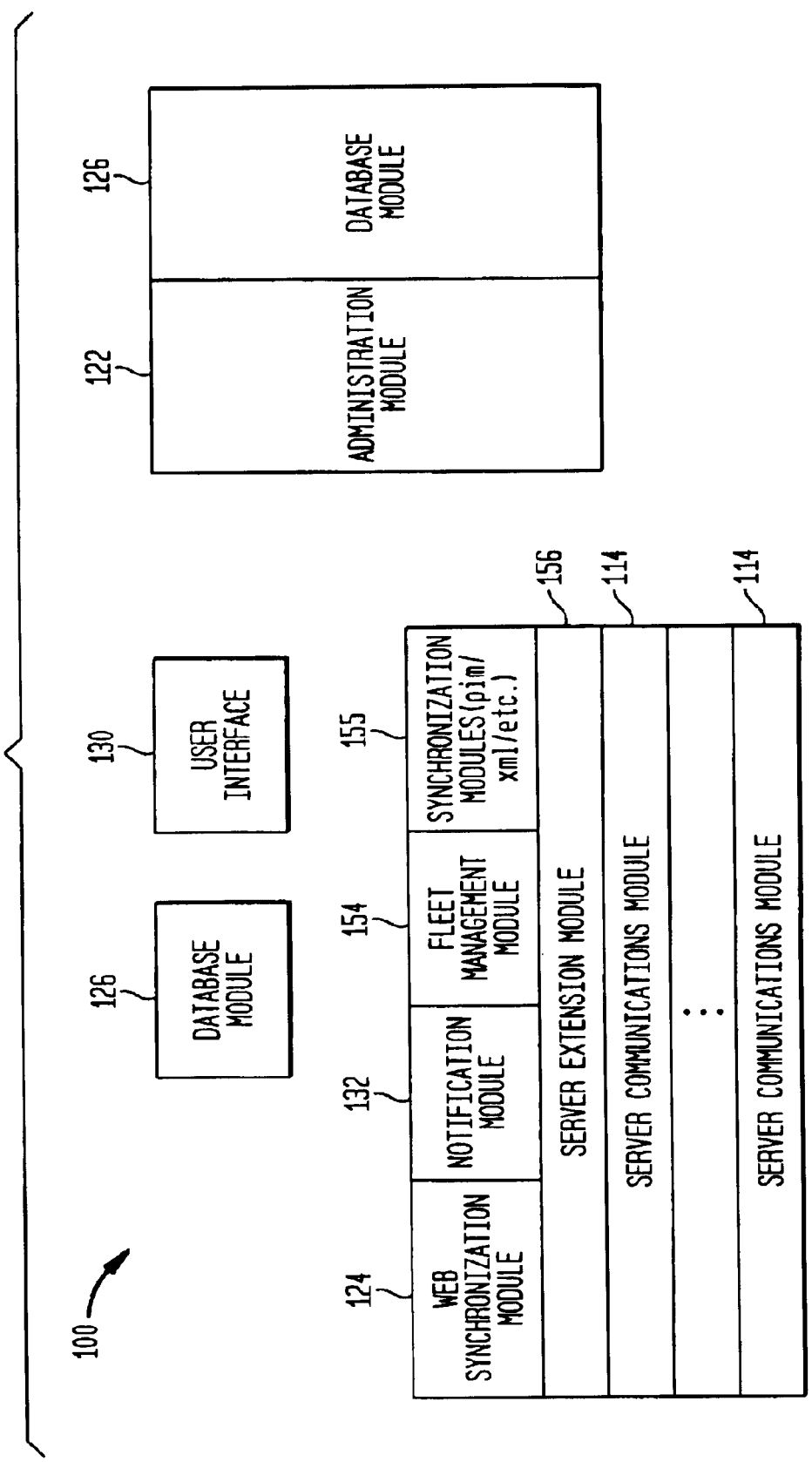

FIG. 1B1
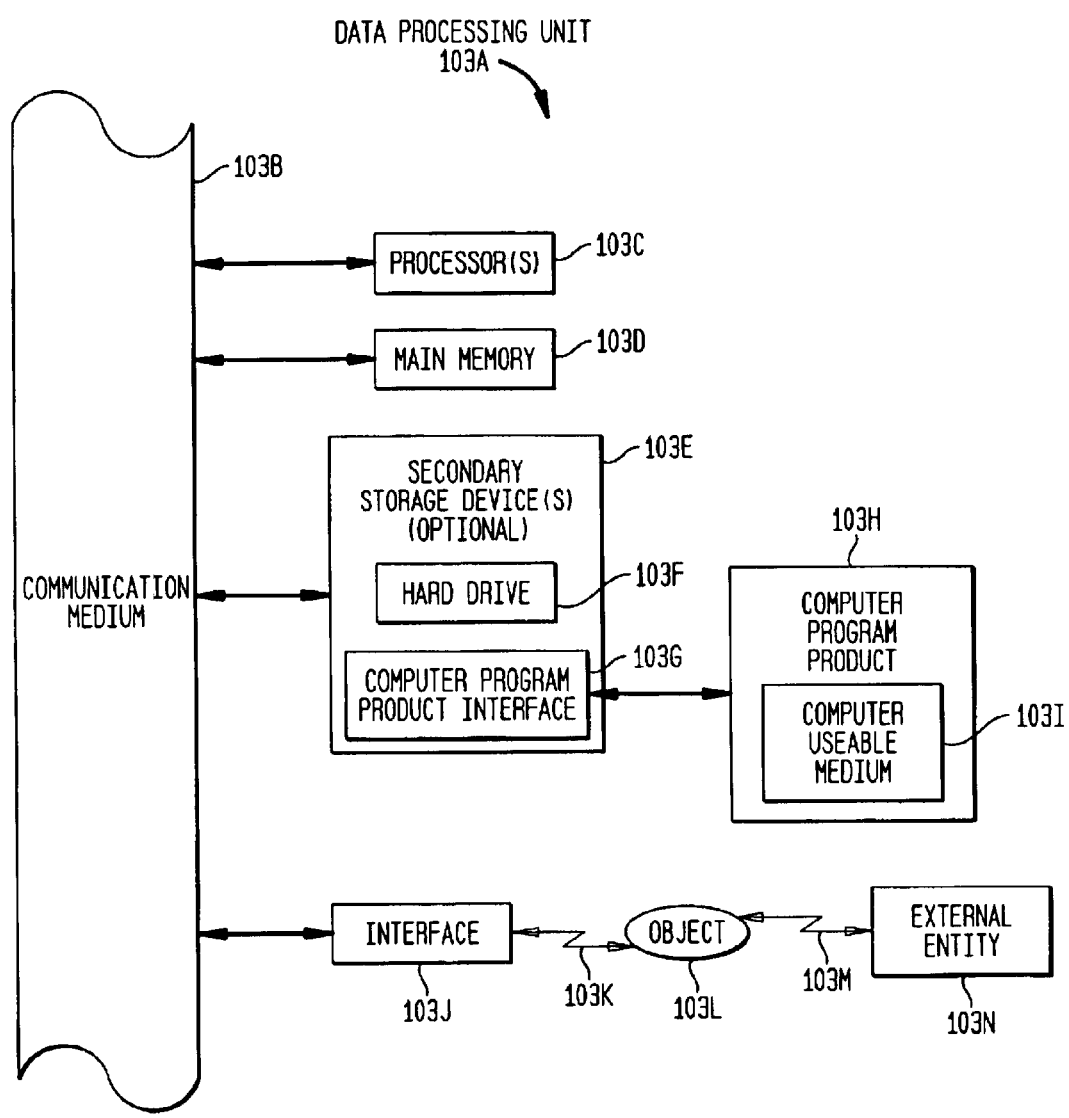

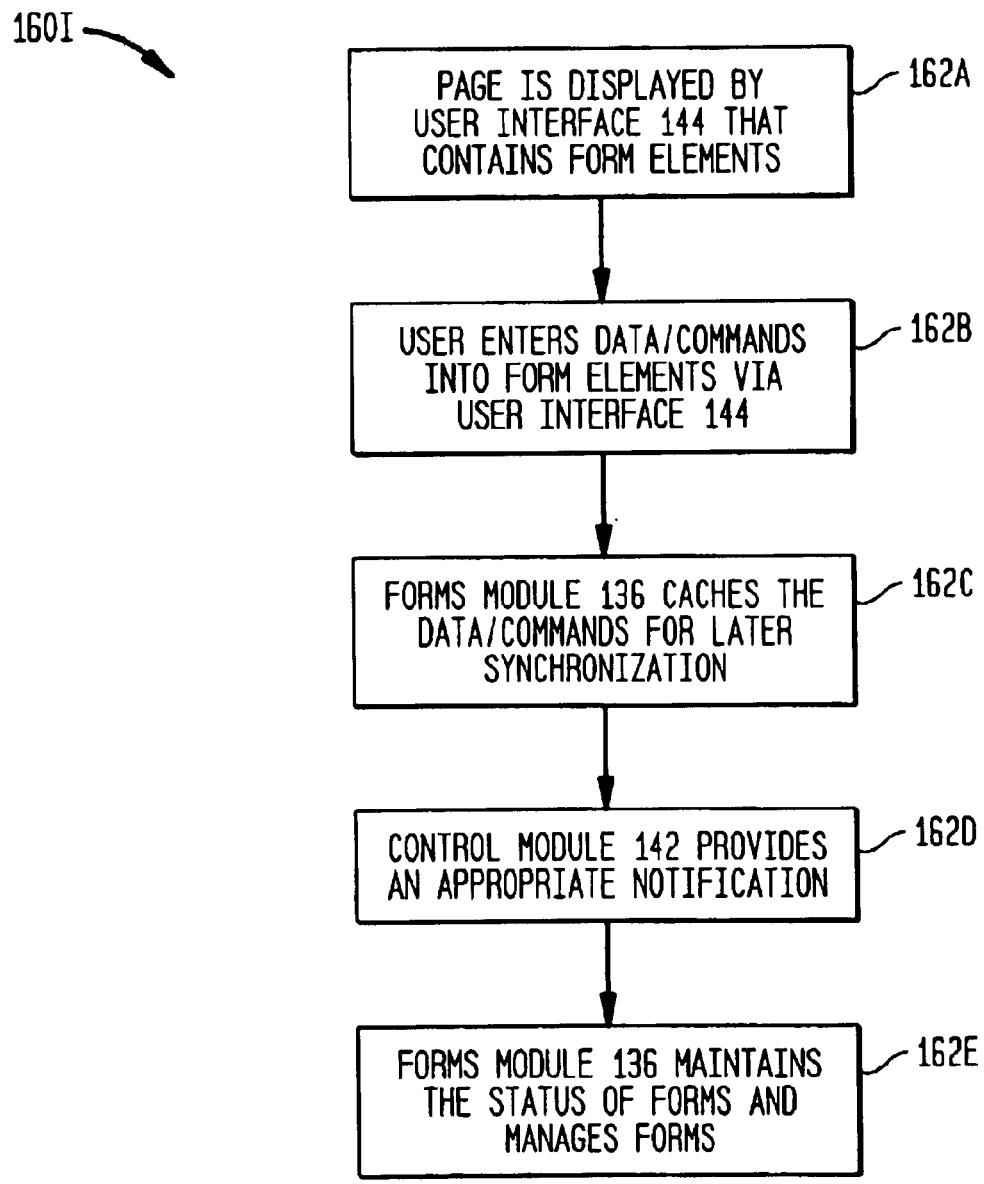

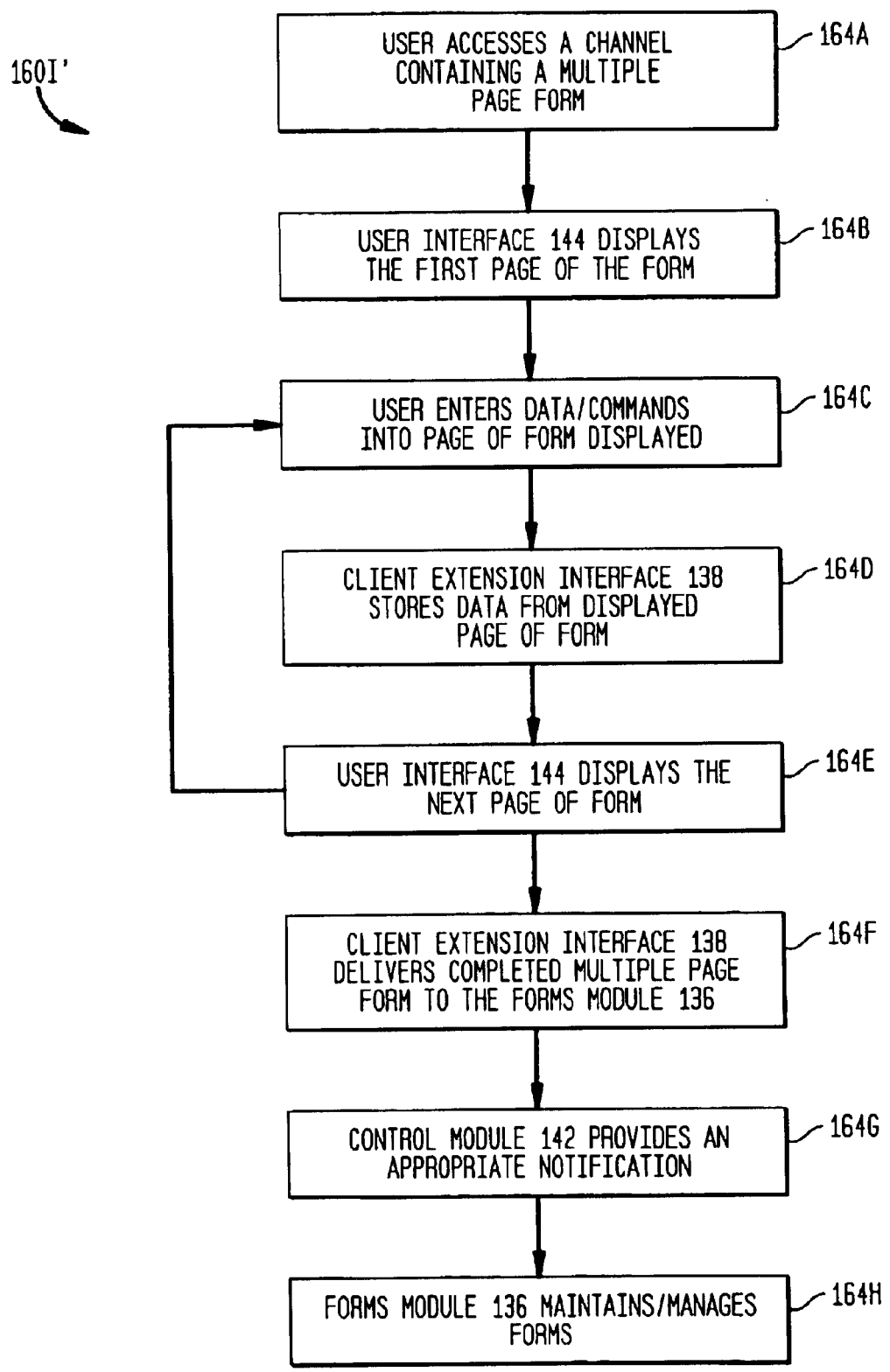

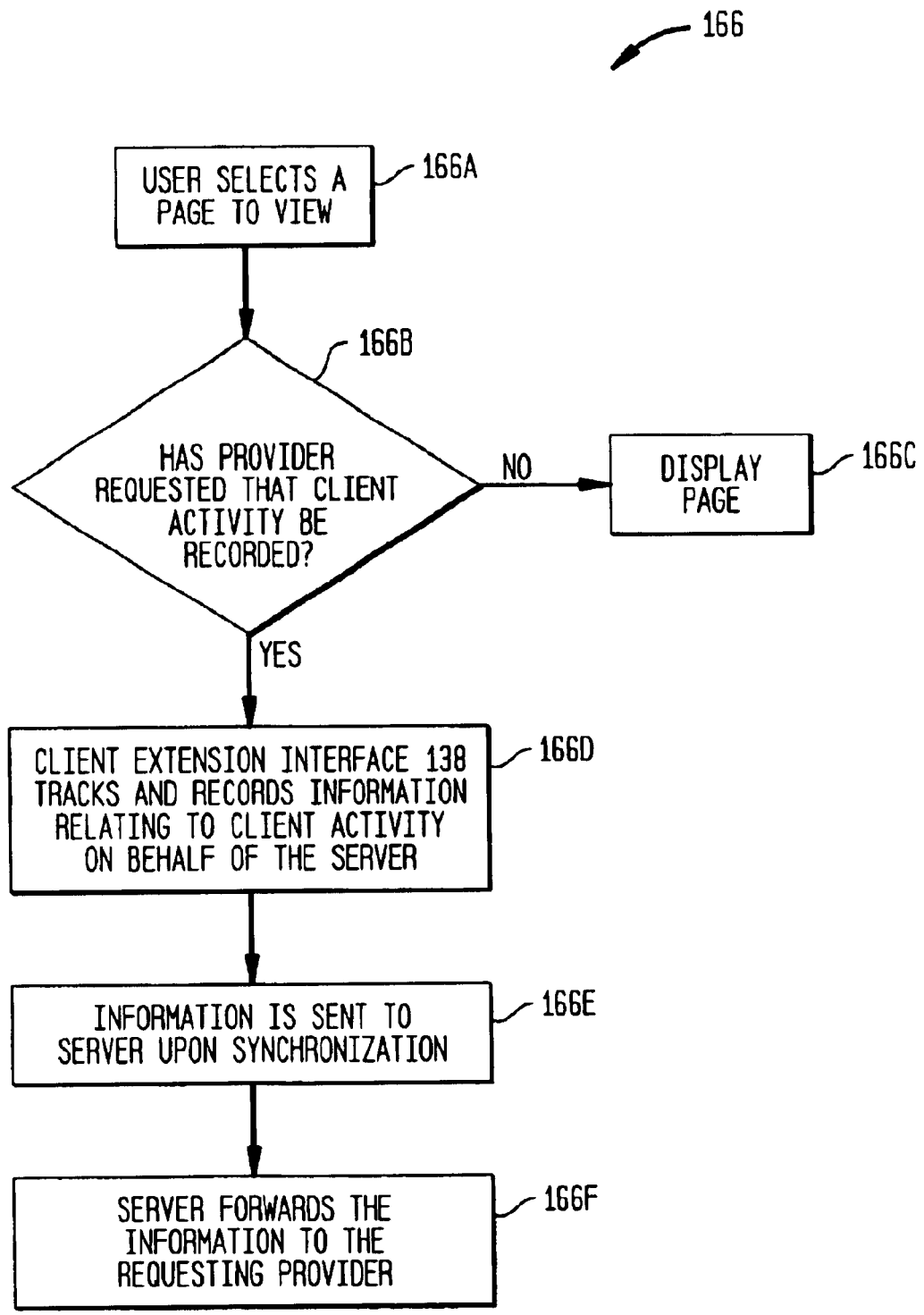
FIG. 1F1

FIG. 1F2
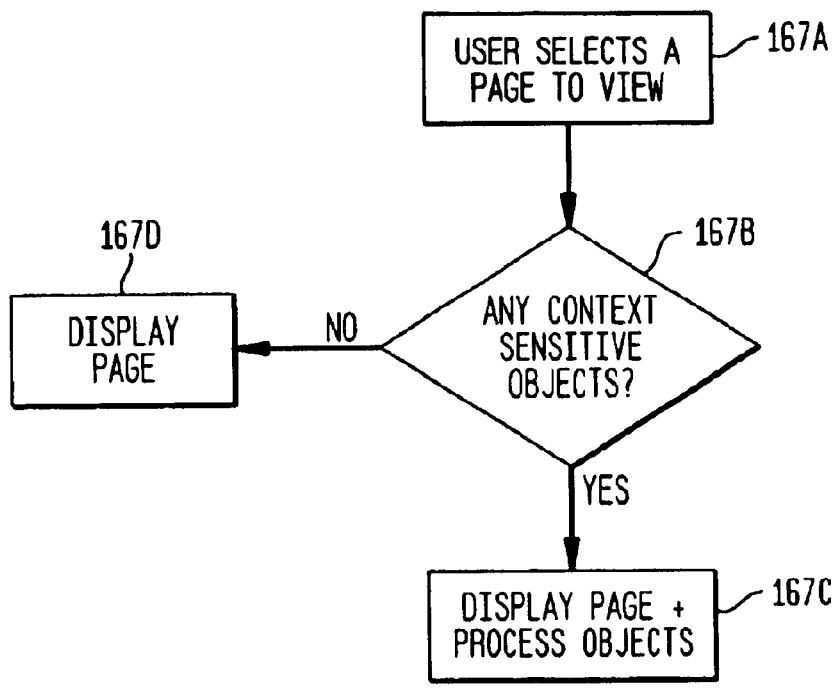
FIG. 1G
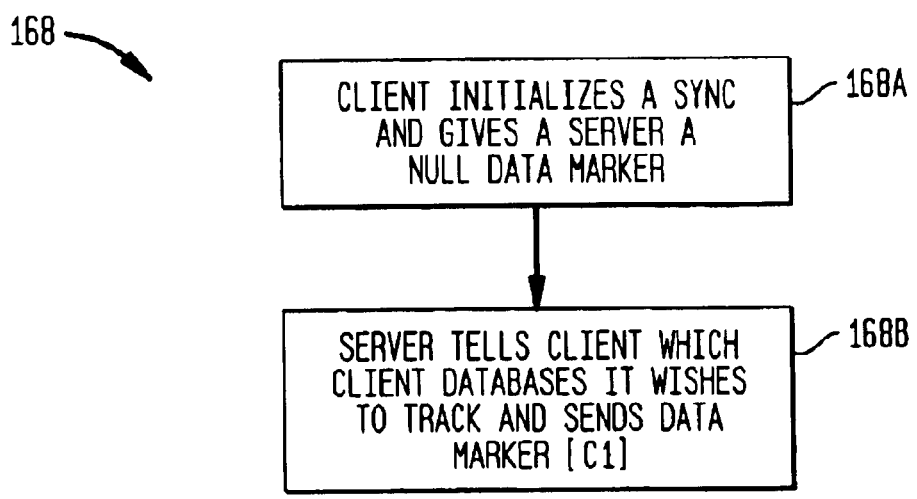

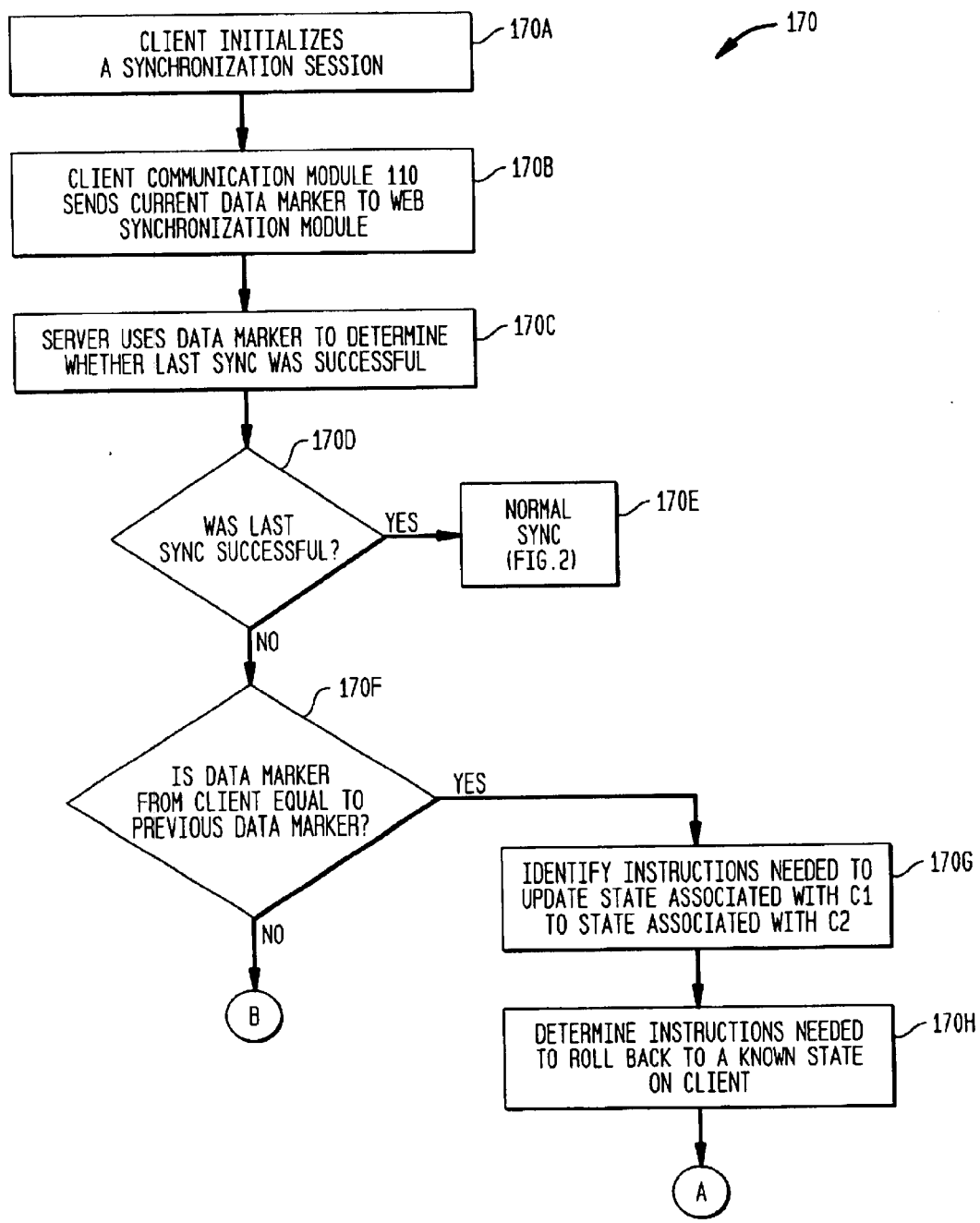
FIG. 1H1

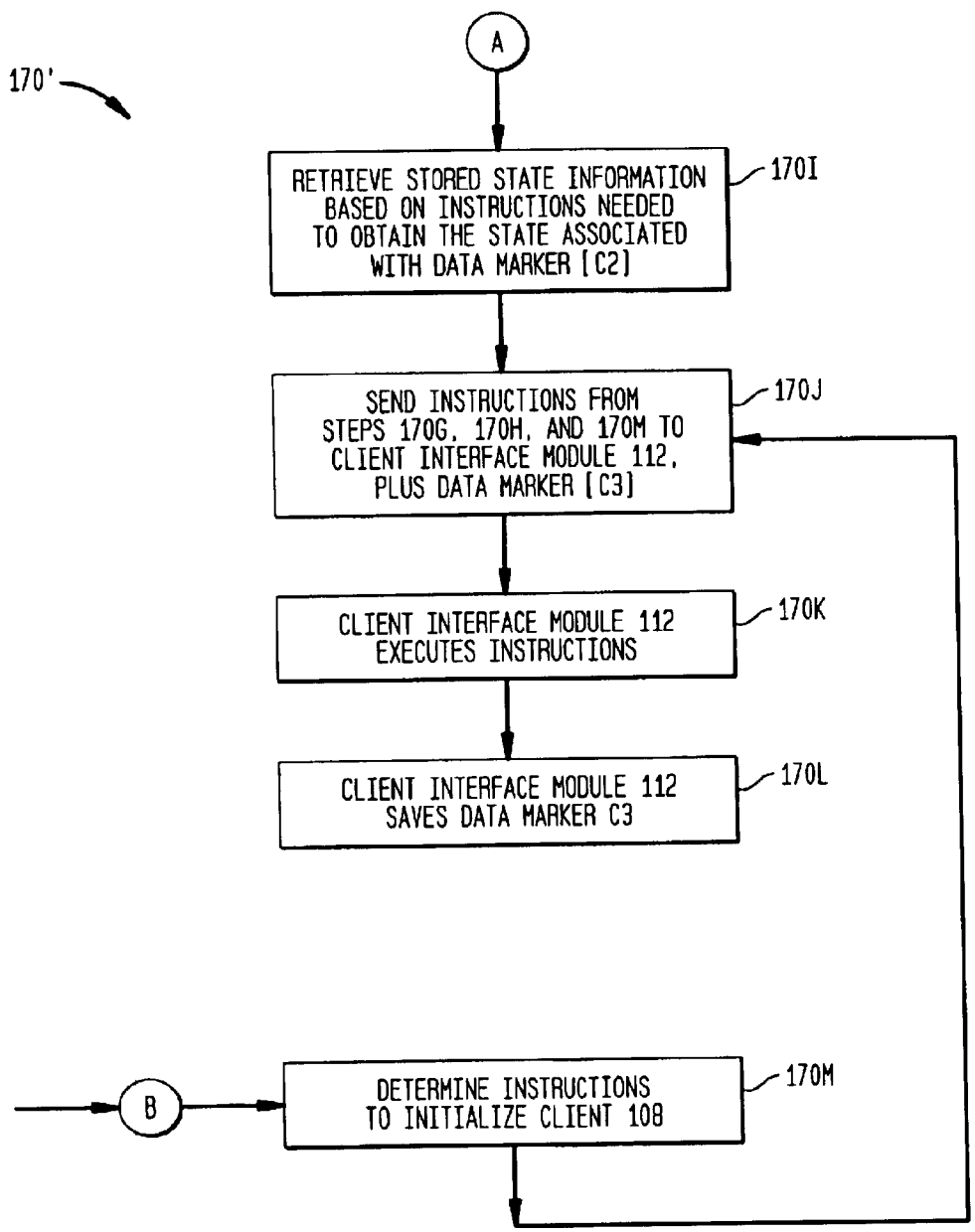
FIG. 1H2

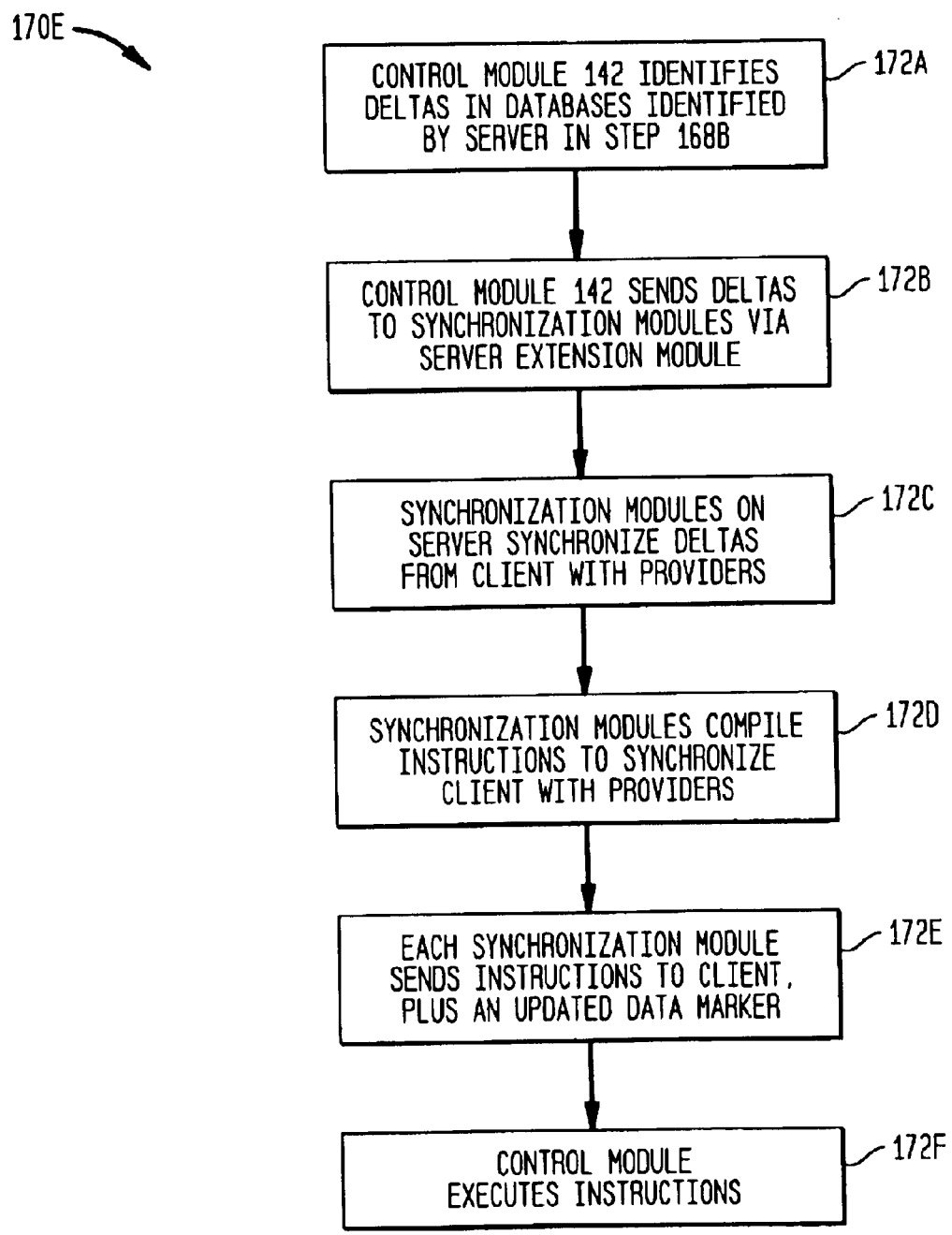
FIG. 1I1

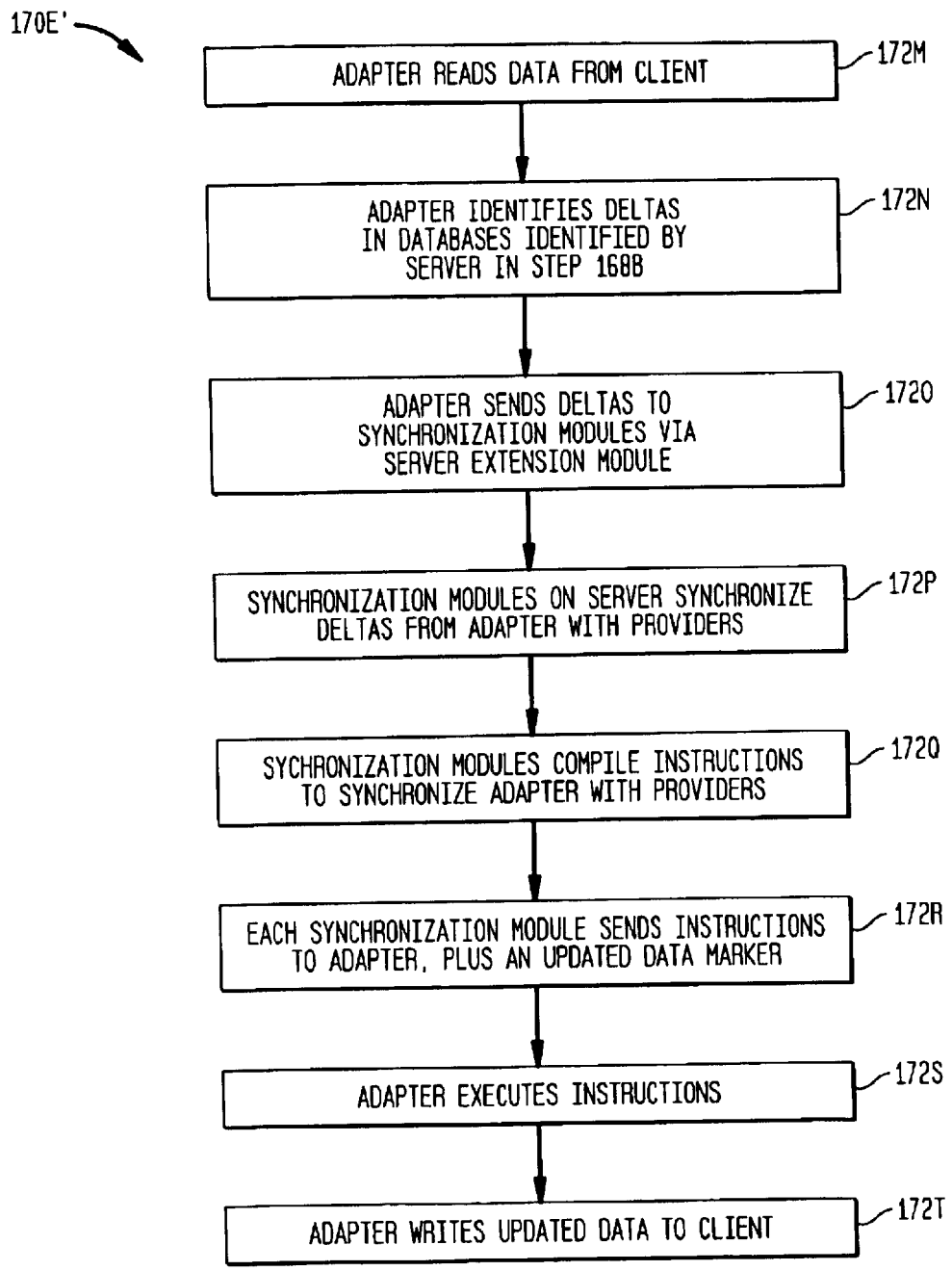
FIG. 1I2

- MUSIC
- PHOTO ALBUMS
- BOOKS
- MOVIES
- ETC.

CORE TECHNOLOGY: PLACING INTERNET/
INTRANET CONTENT ON MOBILE DEVICES

GRANULAR VARIABLE PROTOCOL

OPTIMIZATION: AN EXAMPLE

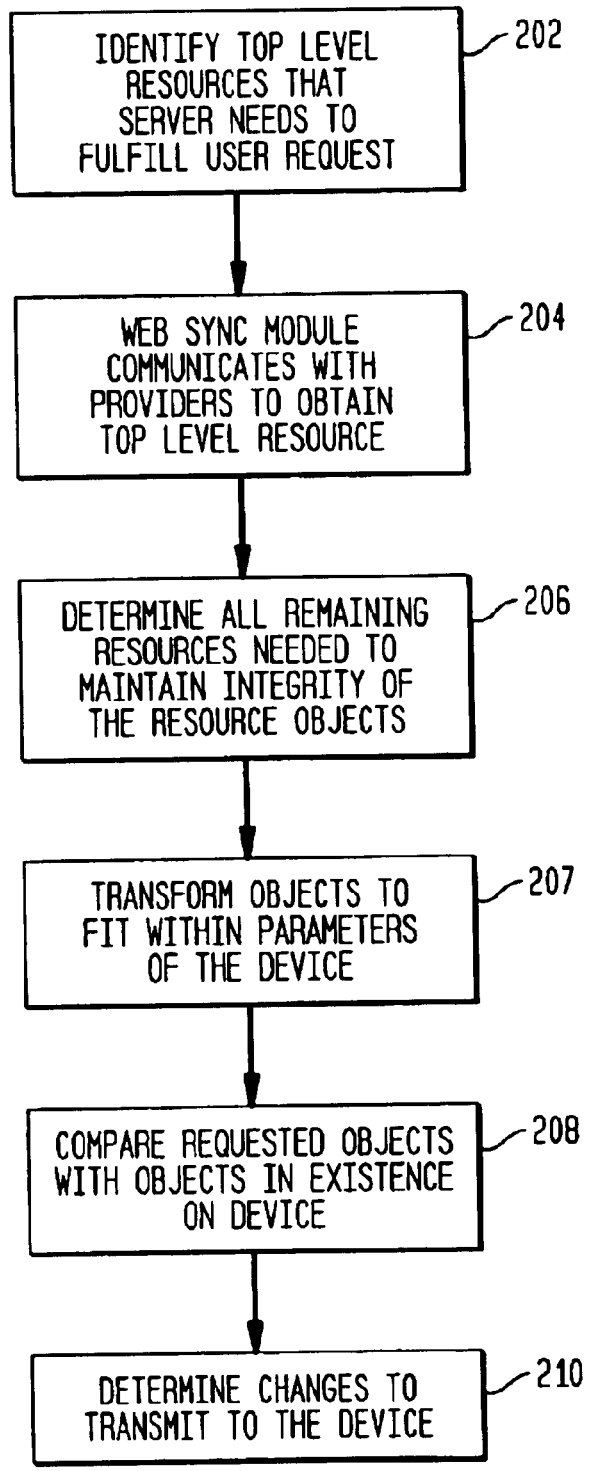

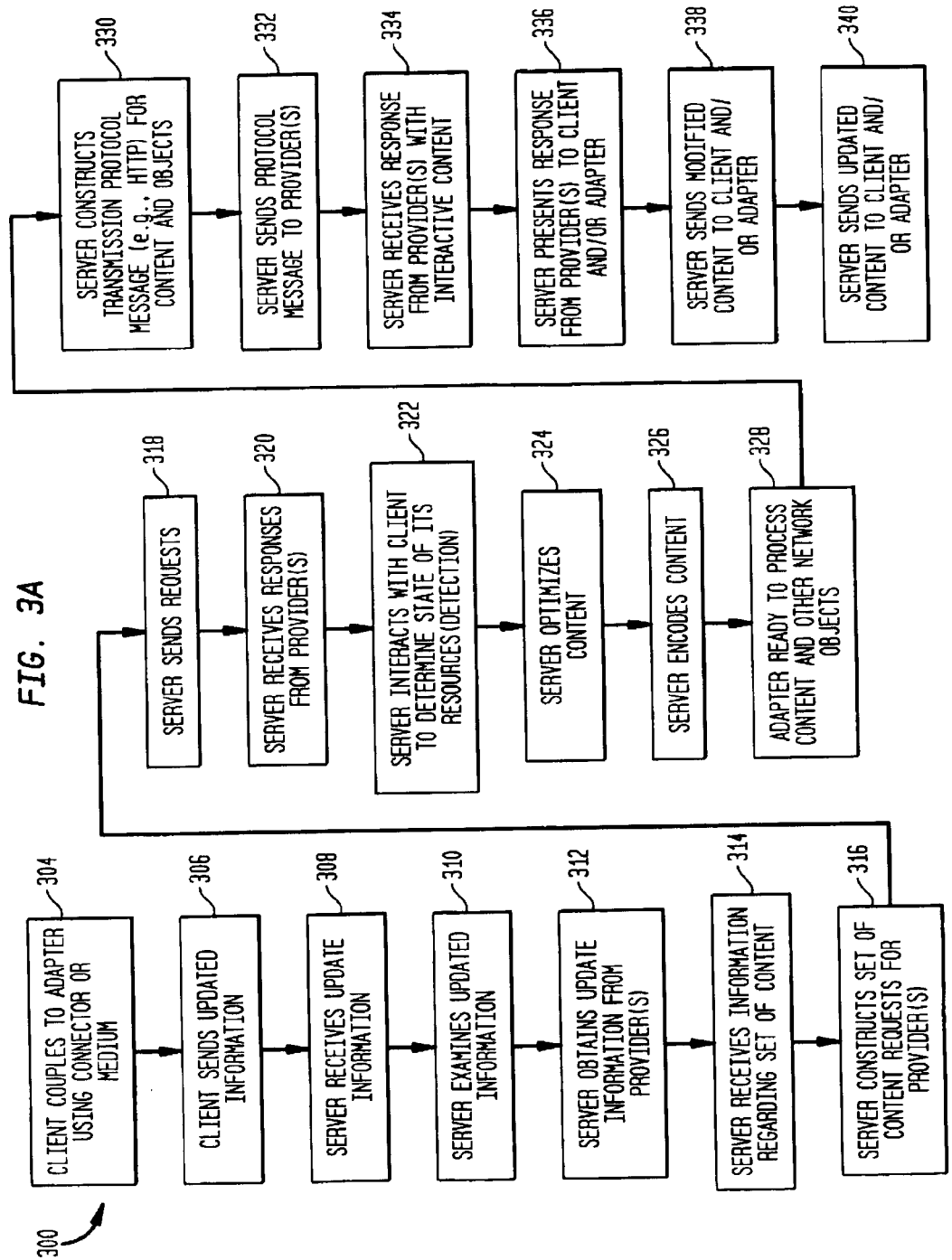

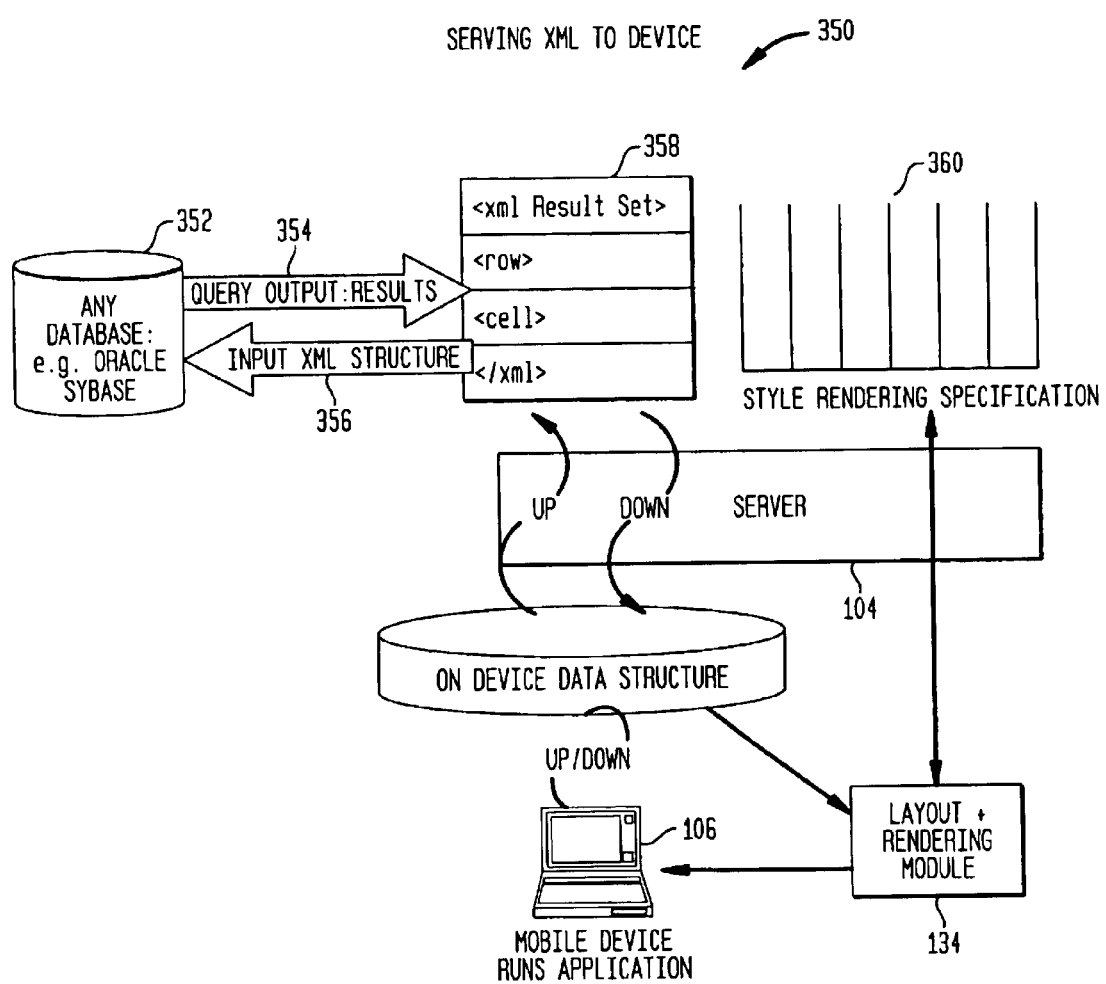

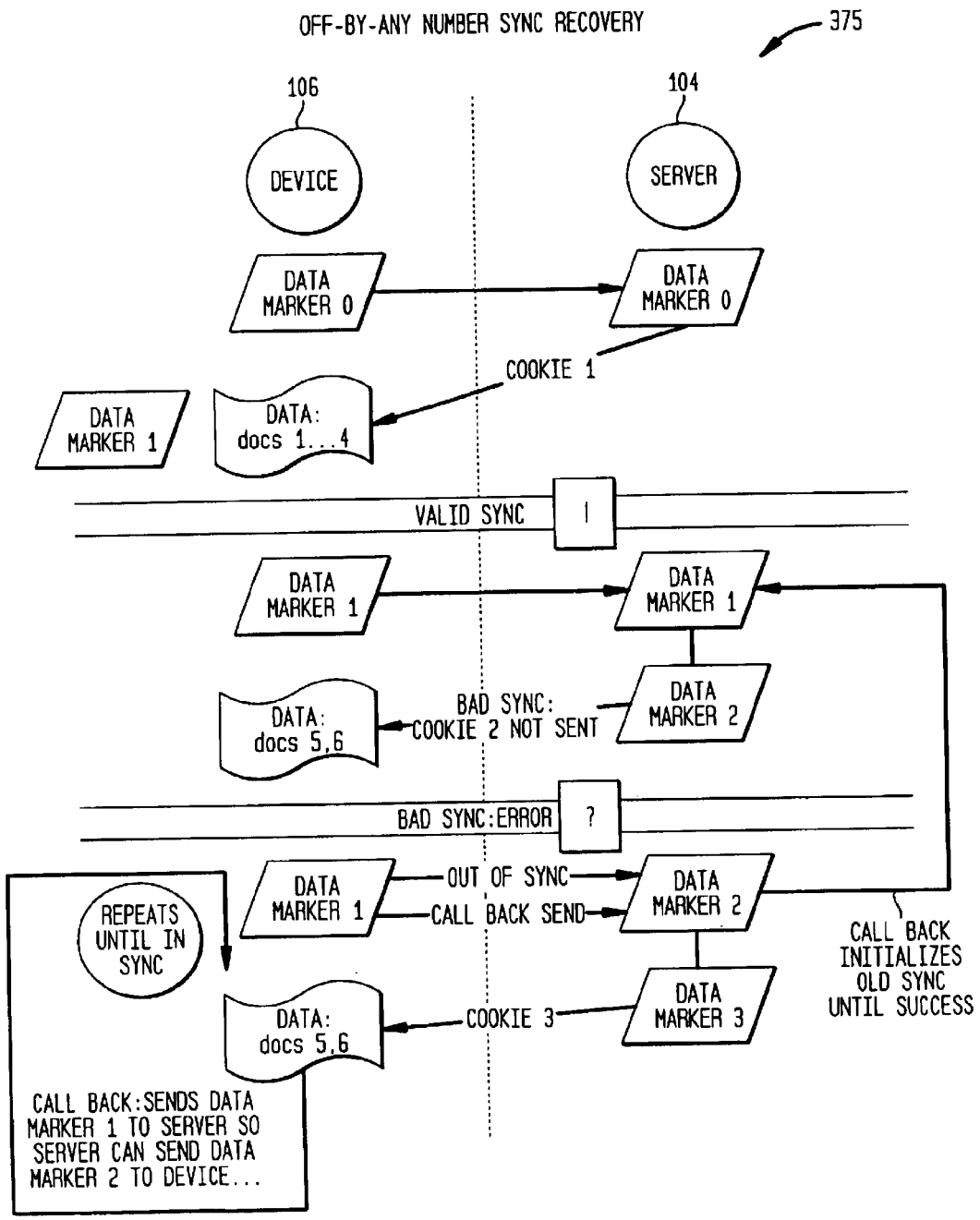

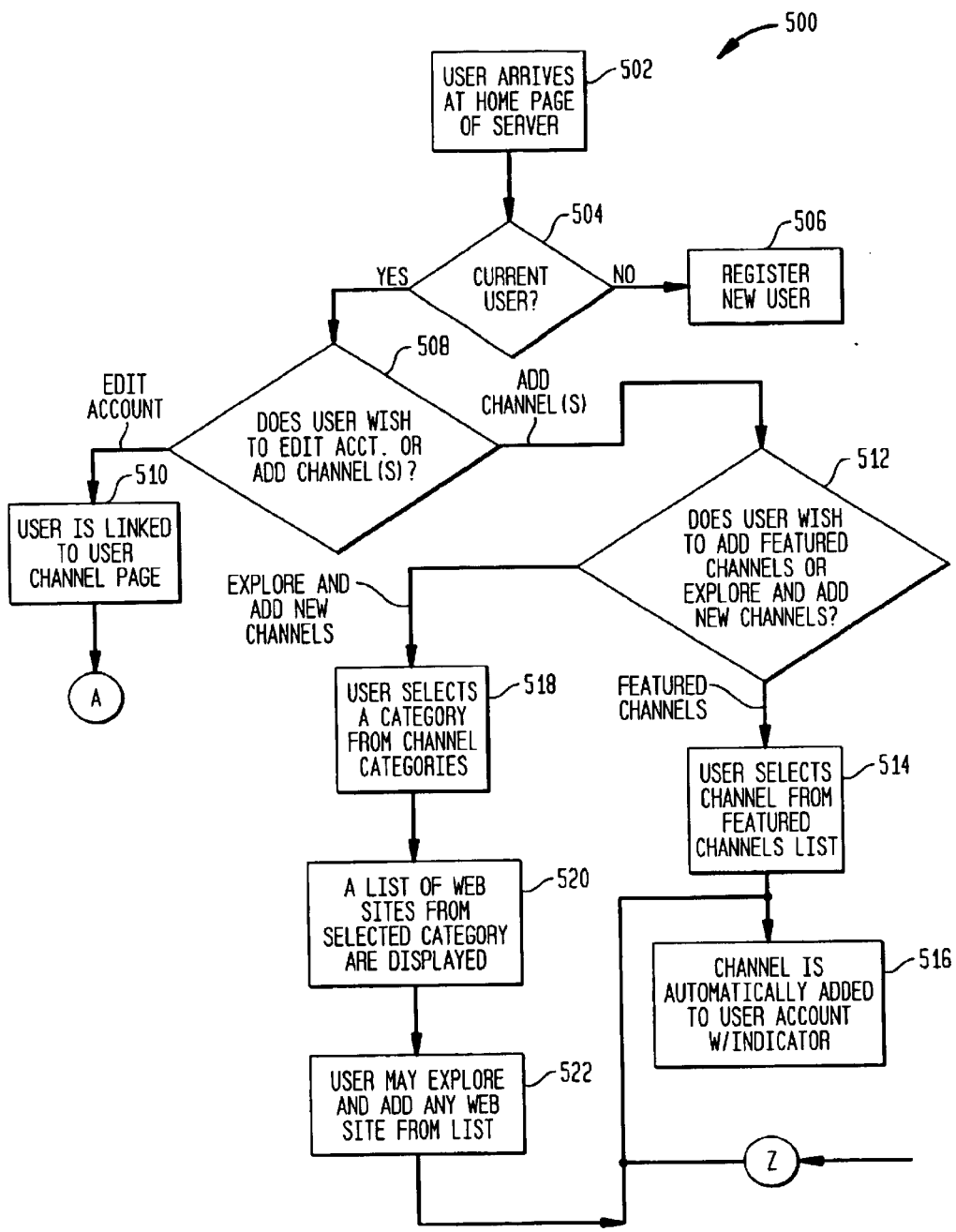

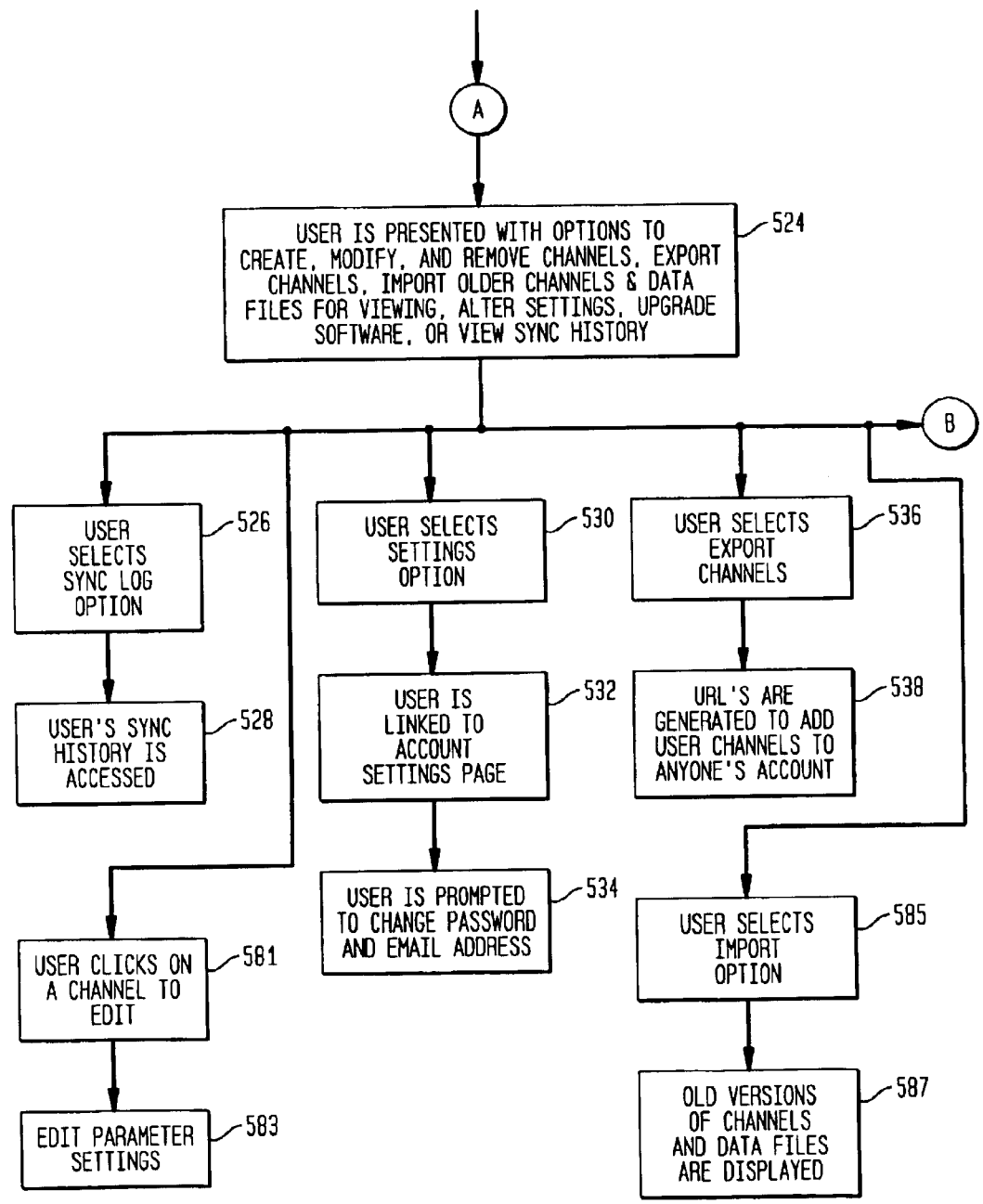

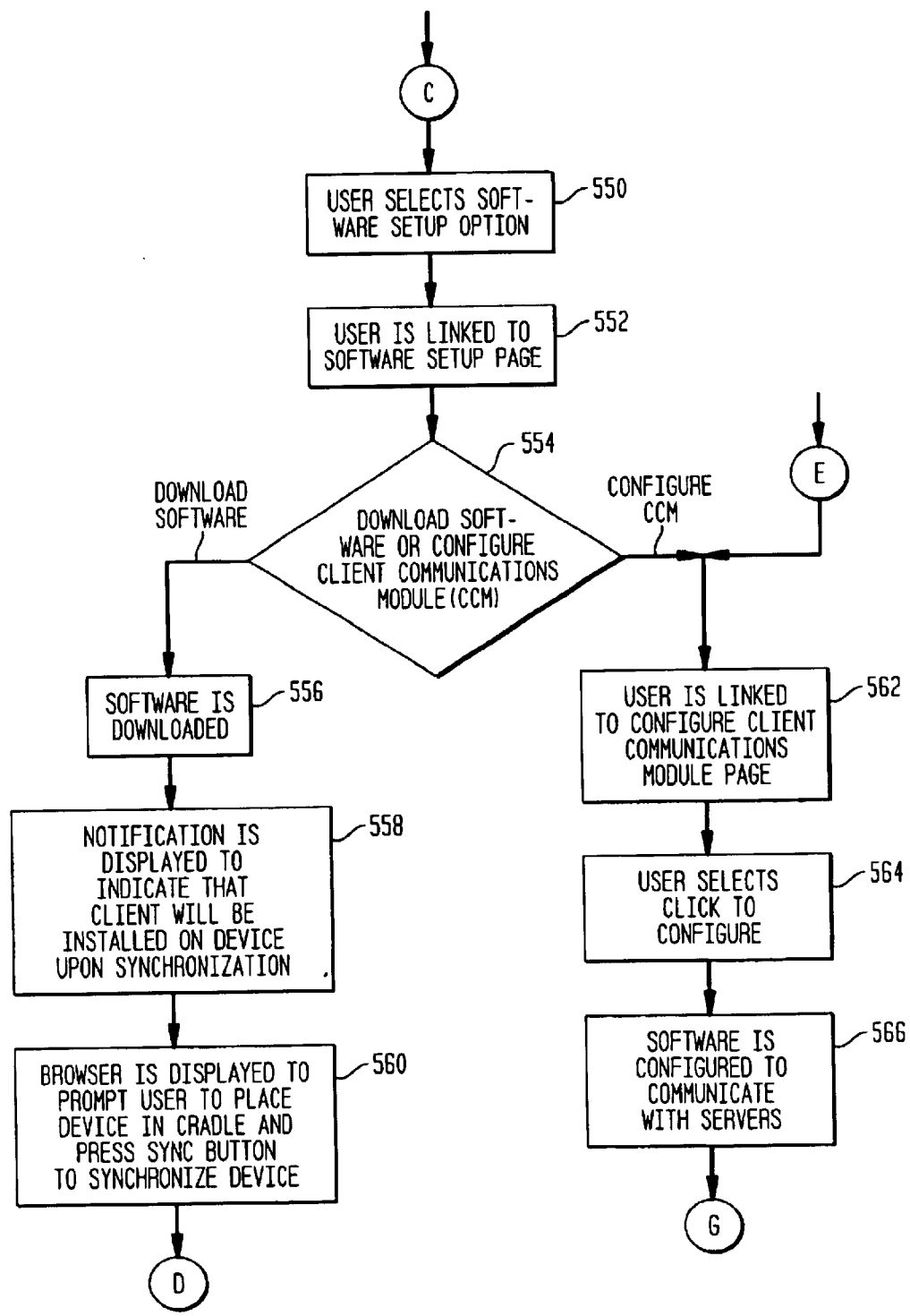

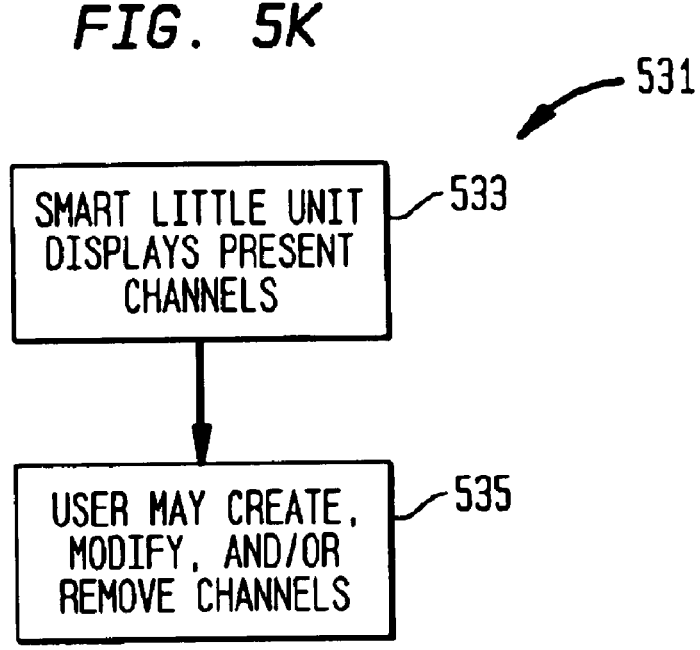

FIG. 6

| FORMS MANAGER | ◁ ⌂ |

☐ 2:11P MAINTENANCE LOG SUCCESS
☐ 2:12P MAINTENANCE LOG SUCCESS
☐ 2:15P SERVICE REQUEST PENDING ( DELETE )   ( DELETE ALL )

ENTER TEXT TO SEARCH FOR HERE.

CHOOSE IN CURRENT PAGE OR IN ALL PAGES HERE.

AvantGo OPENS, SHOWING YOUR CHANNELS. TAP A CHANNEL'S NAME TO DISPLAY IT.

FIG. 18
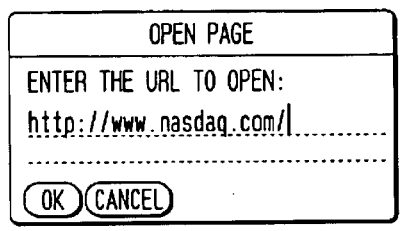
FIG. 19
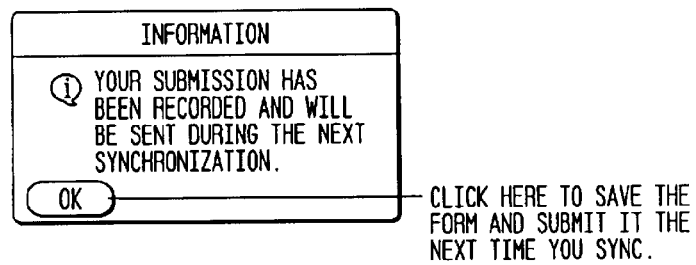
FIG. 20

INCREASE FONT

DECREASE FONT

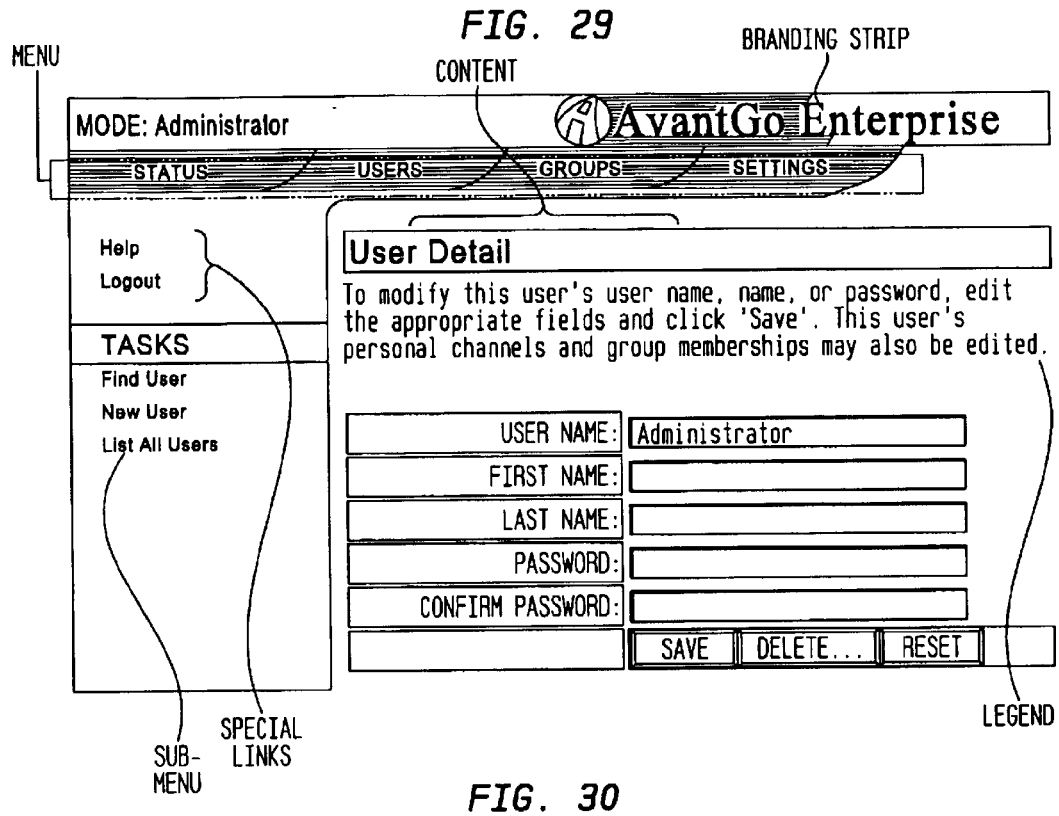

FIG. 31

ENTER:http://
syncdemo.avantgo.com/
sfa_3_1/

ENTER:TUTORIAL

CLICK VIEW TO VIEW/TEST THE
ADDRESS OF YOUR CHANNEL

New Channel for User MobileUser

| | |
|---|---|
| TITLE: | Untitled |
| LOCATION: | http:// [VIEW] |
| CHANNEL SIZE LIMIT: | 100 |
| LINK DEPTH: | 0 |
| INCLUDE IMAGES: | ☐ |
| FOLLOW OFF-SITE LINKS: | ☐ |
| ALLOW BINARY DISTRIBUTION | ☐ |
| HIDE FROM USERS | ☐ |
| SEND URLS | ☐ |
| REFRESH: | ○ only once |
| | ⊙ every sync |
| | ○ hourly every [0] hour(s) ☐ only |
| | ○ daily |
| | [12]▽:[00]▽ ⊙AM ○PM |
| | on days: |
| | ☑ Monday  ☑ Tuesday  ☑ Wednesday |
| | ☑ Friday  ☑ Saturday  ☑ Sunday |

ENTER:100 — CHANNEL SIZE LIMIT
ENTER:3 — LINK DEPTH

LEAVE THESE FIELDS UNCHECKED

CLICK THE ONLY ONCE OPTION

[CREATE] [RESET] [CANCEL]

CLICK THE CREATE BUTTON

FIG. 32

Refresh:
- ⊙ on every sync
- ○ every [0] hour(s)
- ○ only once
- ○ daily at [12▽]:[00▽][AM▽] on following days:
  - ☑ Monday ☑ Tuesday ☑ Wednesday ☑ Thursday
  - ☑ Friday ☑ Saturday ☑ Sunday When finished, click the "Save Channel" button: [Save Channel]

FIG. 33

| Update User Membership for Group Travel Itinerary |
|---|

Manage this group's user memberships by selecting/deselecting the user check boxes and clicking update. To view information about a particular user, click the hyperlink name of the user.

| USER NAME: | |
|---|---|
| FIRST NAME: | |
| LAST NAME: | |
| | [FIND USER] |

| Search Results | |
|---|---|
| USER NAME: | NAME: |
| ☐ Joja | John Jack |
| ☑ Natalie | Natalie Doe |
| ☐ new | new test |
| | [Update] [Reset] [Return to Group] |

FIG. 38

| MODE: Administrator | | | AvantGo Enterprise |
|---|---|---|---|
| STATUS | USERS | GROUPS | SETTINGS  3.4.152 N |

Help
Logout

TASKS
Find User
New User
List All Users

Users

To find a user, enter the user information that you know and click Search.

USER NAME: [          ]
FIRST NAME: [          ]
LAST NAME: [          ]

[ SEARCH ] [ RESET ]

Search Results

| USER NAME: | NAME: |
|---|---|
| aabernathy | Andrea Abernathy |
| acrossland | Adam Crossland |
| aculver | Ann Culver |

FIG. 39

| MODE: Administrator | | | AvantGo Enterprise |
|---|---|---|---|
| STATUS | USERS | GROUPS | SETTINGS  3.4.152 NT |

Help
Logout

TASKS
Find User
New User
List All Users

User Detail

To modify this user's user name, name, or password, edit the appropriate fields and click 'Save'. This user's personal channels and group memberships may also be edited.

Adam Crossland

USER NAME: [acrossland]
FIRST NAME: [Adam]
LAST NAME: [Crossland]
PASSWORD: [          ]
CONFIRM PASSWORD: [          ]

[ SAVE ] [ DELETE... ] [ RESET ]

FIG. 44

AvantGo™

WELCOME, dkoehn68
Log out

MY ACCOUNT
MY CHANNELS
SETTINGS
SOFTWARE SETUP
SYNC LOG

AUTOCHANNEL™

(BACK TO CHANNELS)

YOU CAN CREATE AVANTGO AUTOCHANNELS "ON THE FLY" FOR YOUR HANDHELD FROM A BUTTON OR A BOOKMARK ON YOUR WEB BROWSER.

INTERNET EXPLORER 4.0 OR HIGHER

CREATING A LINK BUTTON
With your links toolbar visible, drag the AvantGo AutoChannel™ link below to the toolbar. Clicking on the button while browsing a website will let you add that website to your handheld device.

Drag this link: AvantGo AutoChannel

CREATING A BOOKMARK
Right-click on AvantGo AutoChannel™ link below and select "Add to Favorites...". Choosing this in your favorites will let you add the website you are browsing as an AvantGo channel on your handheld.

Right-click this link: AvantGo AutoChannel

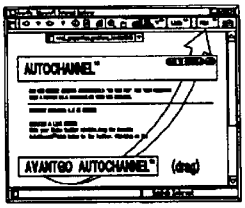

FIG. 48

| MY ACCOUNT |
| --- |
| MY CHANNELS |
| SETTINGS |
| SOFTWARE SETUP |
| SYNC LOG |

ACCOUNT SETTINGS (BACK TO CHANNELS)

CHANGE PASSWORD

YOU WILL BE ASKED TO UPDATE CHANGES TO YOUR DEVICE FROM THIS WEBSITE.
IF YOU'VE FORGOTTEN YOUR PASSWORD, YOU CAN REQUEST A PASSWORD RESET.

OLD PASSWORD: [ ]
NEW PASSWORD: [ ]
CONFIRM PASSWORD: [ ]

[CHANGE PASSWORD]

CHANGE EMAIL ADDRESS

THIS IS WHERE PASSWORD RESET MESSAGES WILL BE SENT IF YOU FORGET YOUR USERNAME OR PASSWORD.

PASSWORD: [ ]
NEW EMAIL ADDRESS: [dkoehn@avantgo.com]

[SUBMIT]

FIG. 49

AvantGo™

WELCOME, dkoehn68
Log out

| MY ACCOUNT |
| --- |
| MY CHANNELS |
| SETTINGS |
| SOFTWARE SETUP |
| SYNC LOG |

SOFTWARE SETUP (BACK TO CHANNELS)

▸ DOWNLOAD AvantGo PALM OS CLIENT (WINDOWS)

▸ DOWNLOAD AvantGo WINDOWS(R) CE CLIENT (WINDOWS)

▸ DOWNLOAD AvantGo CONNECT™ (MACINTOSH)

▸ CONFIGURE MOBILE APPLICATION LINK

TO CHECK YOUR AvantGo CLIENT VERSION:

TAP TOOLS > ABOUT AvantGo ON CE

OR

MENU > OPTIONS > ABOUT AvantGo ON PALM DEVICES.

THE ABOUT AvantGo PANEL APPEARS. ON THE BOTTOM LEFT IS YOUR VERSION NUMBER.

[UPDATE]

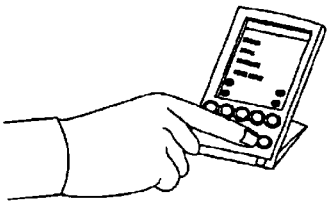

US 6,779,042 B1

SYSTEM, METHOD, AND COMPUTER PROGRAM PRODUCT FOR ENABLING ON-DEVICE SERVERS, OFFLINE FORMS, AND DYNAMIC AD TRACKING ON MOBILE DEVICES

This application is a continuation-in-part application of pending Ser. No. 09/393,390, "Interactive Applications for Handheld Computers," filed Sep. 10, 1999, and claims the benefit of U.S. Provisional Application No. 60/173,807, "Arrangements for Providing Improved Network Services to Wireless Handheld Devices," filed Dec. 30, 1999, and U.S. Provisional Application No. 60/189,969, "Arrangements for Providing Improved Network Services to Wireless Handheld Devices," filed Mar. 17, 2000, all of which are incorporated by reference herein in their entireties.

CROSS-REFERENCE TO RELATED APPLICATIONS

This patent application is potentially related to the following co-pending U.S. utility patent applications, which are all herein incorporated by reference in their entireties:

"System, Method, and Computer Program Product for Syncing to Mobile Devices," Ser. No. 09/560,965, filed concurrently herewith, now U.S. Pat. No. 6,341,316.

"System, Method, and Computer Program Product for Administering Channels, Content, and Data for Mobile Devices," Ser. No. 09/559,965, filed concurrently herewith.

"System, Method, and Computer Program Product for Customizing Channels, Content, and Data for Mobile Devices," Ser. No. 09/560,957, filed concurrently herewith, now U.S. Pat. No. 6,421,717.

"System, Method, and Computer Program Product for Web Content Aggregation and Development, and Web Content Delivery to Clients," Ser. No. 09/560,956, filed concurrently herewith, now U.S. Pat. No. 6,553,412.

BACKGROUND OF THE INVENTION

1. Field of the Invention

The present invention relates generally to mobile communications, and more particularly relates to technology for using interactive applications while on-line and off-line on mobile devices.

2. Related Art

A variety of mobile devices (such as personal data assistants, or PDAs) exist. Such mobile devices include ones based on the Palm operating environment and the Windows CE operating environment.

A variety of software applications for those mobile devices also exist.

What does not exist prior to the invention are software applications for enabling web content (as well as other objects) to be loaded on mobile devices, and for users of mobile devices to operate with such web content on their mobile devices in an interactive manner while in an off-line mode.

SUMMARY OF THE INVENTION

Briefly stated, the invention includes systems, methods, computer program products, and combinations and subcombinations thereof for enabling web content (as well as other objects) to be loaded on mobile devices (as well as other types of devices), and for users of mobile devices to operate with such web content on their mobile devices in an interactive manner while in an off-line mode.

These and additional features and advantages of the present invention will become more apparent from the detailed description set forth below when taken in conjunction with the drawings in which like reference characters generally identify corresponding elements throughout.

BRIEF DESCRIPTION OF THE FIGURES

The accompanying drawings, which are incorporated herein and form part of the specification, illustrate embodiments of the present invention and, together with the description, further serve to explain the principles of embodiments of the invention.

FIG. 1B is an alternative block diagram of the invention according to an embodiment of the invention;

FIG. 1B1 is a block diagram of an example data processing unit useful for implementing items from FIGS. 1A and 1B;

FIG. 1D is an example flowchart of a process to interact with forms on a client according to an embodiment of the invention;

FIG. 1E is an example flowchart of a process to interact with multi-page forms on a client according to an embodiment of the invention;

FIG. 1F1 is an example flowchart of a process for tracking client activity according to an embodiment of the invention;

FIG. 1F2 is an example flowchart of a process for context sensitive processing (such as but not limited to processing relating to advertising) on a client according to an embodiment of the invention;

FIG. 1G is an example flowchart of an initialization process according to an embodiment of the invention;

FIGS. 1H1 and 1H2 collectively illustrate an example flowchart of an "off by N" synchronization process according to an embodiment of the invention;

FIG. 1I1 is an example flowchart of a synchronization process (where the client is connected directly to the server) according to an embodiment of the invention;

FIG. 1I2 is an example flowchart of a synchronization process (where the client is connected to the server via an adapter) according to an embodiment of the invention;

FIG. 1O is an example flowchart relating to automatically adding a channel to the server's collection of channels according to an embodiment of the invention;

FIGS. 1U, 1V, 1W, 1X, 1Y, 1Z, 1AA, and 1AB are used to generally describe embodiments of the invention;

FIG. 2 is an example flowchart of a process to obtain objects from providers according to an embodiment of the invention;

FIG. 3A is an alternative embodiment of a synchronization process;

FIG. 3B is an example block diagram illustrating how XML objects can be served to clients according to an embodiment of the invention;

FIGS. 3C and 4A are views of synchronization processes according to embodiments of the invention;

FIGS. 5A, 5B, 5C, 5D, 5E, 5F, 5G, 5H, 5I, 5J, 5K, 5L, and 5M relate to user interface functionality according to embodiments of the invention;

FIGS. 6–62 illustrate example screen shots according to embodiments of the invention.

It should be understood that these figures depict embodiments of the invention. Variations of these embodiments will be apparent to persons skilled in the relevant art(s) based on the teachings contained herein. For example, the flow charts contained in these figures depict particular operational flows. However, the functions and steps contained in these flow charts can be performed in other sequences, as will be apparent to persons skilled in the relevant art(s) based on the teachings contained herein.

DETAILED DESCRIPTION OF THE PREFERRED EMBODIMENTS

1. Overview of Embodiments of the Present Invention

Embodiments of the present invention are briefly described in this section.

Briefly stated, the invention is directed to placing objects such as, but not limited to, Internet or Web content on data processing devices, such as but not limited to mobile devices. Table 1 lists examples of such Internet content, although the invention is not limited to these examples.

TABLE 1

Internet Content
Internet content includes but is not limited to:

HTML
JavaScript ™
Channels
Java ™
ActiveX
Multimedia:
Images (e.g., JPEG, GIF, PNG, vector graphics, etc.)
Audio Files (e.g. MP3)
Video (e.g. AVI)
Streaming Content: Voice/Data/Video
Binary files
XML
Applications
Data Objects
Documents
Anything that can be delivered via a "browser"

Table 2 lists examples of mobile devices, although the invention is not limited to these examples.

TABLE 2

Mobile Devices
Mobile devices include but are not limited to:

Handheld Computers
Cellular Phones
Internet-enabled Phones
Pagers
Radios
TVs
Audio Devices
Car Audio Systems
Recorders
Text-to-Speech Devices
Bar-code Scanners
Net Appliances
Mini-browsers
Personal Data Assistants (PDAs)

Figure 1A:
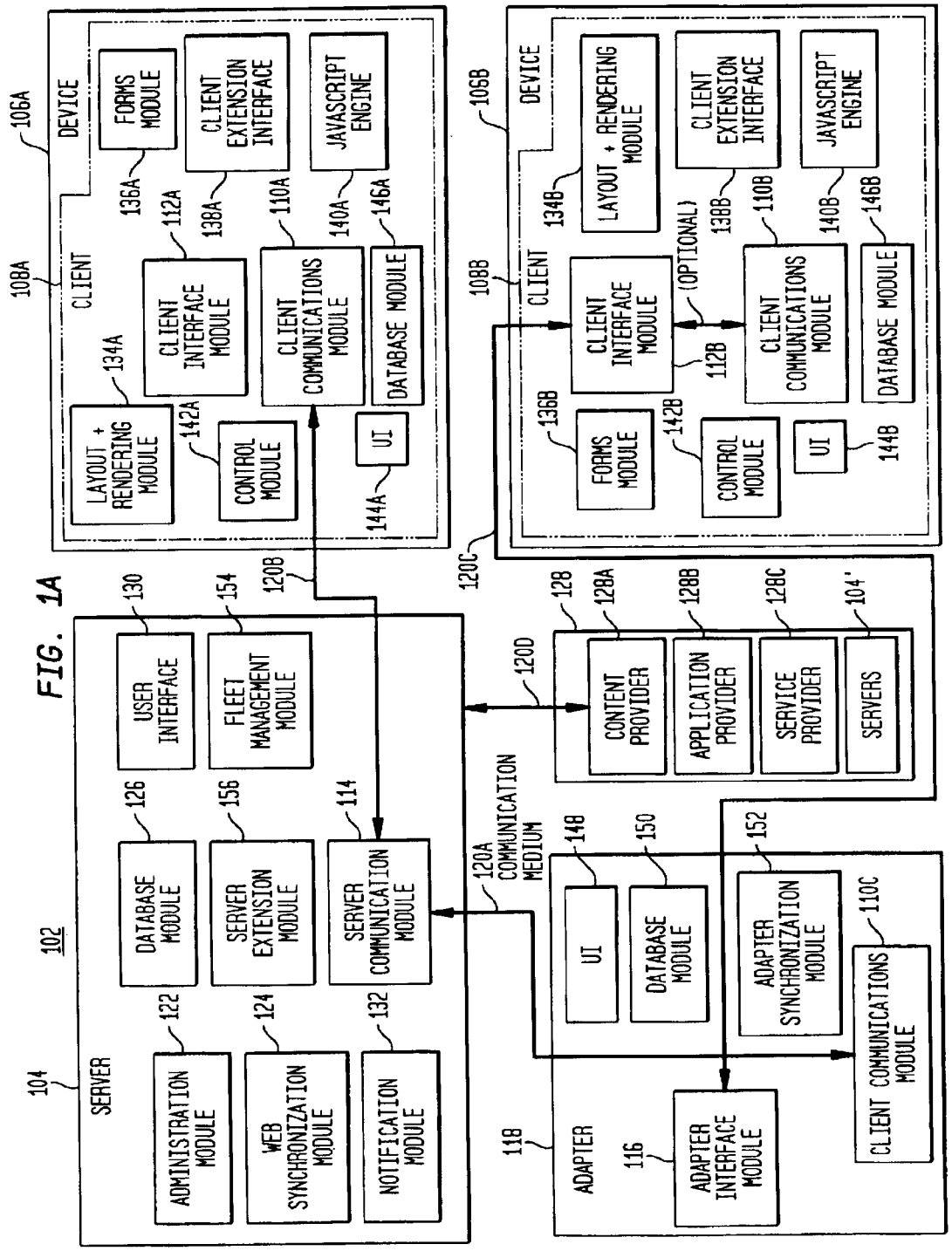
FIG. 1A is a block diagram of the invention according to an embodiment of the invention.
Figure 1C:
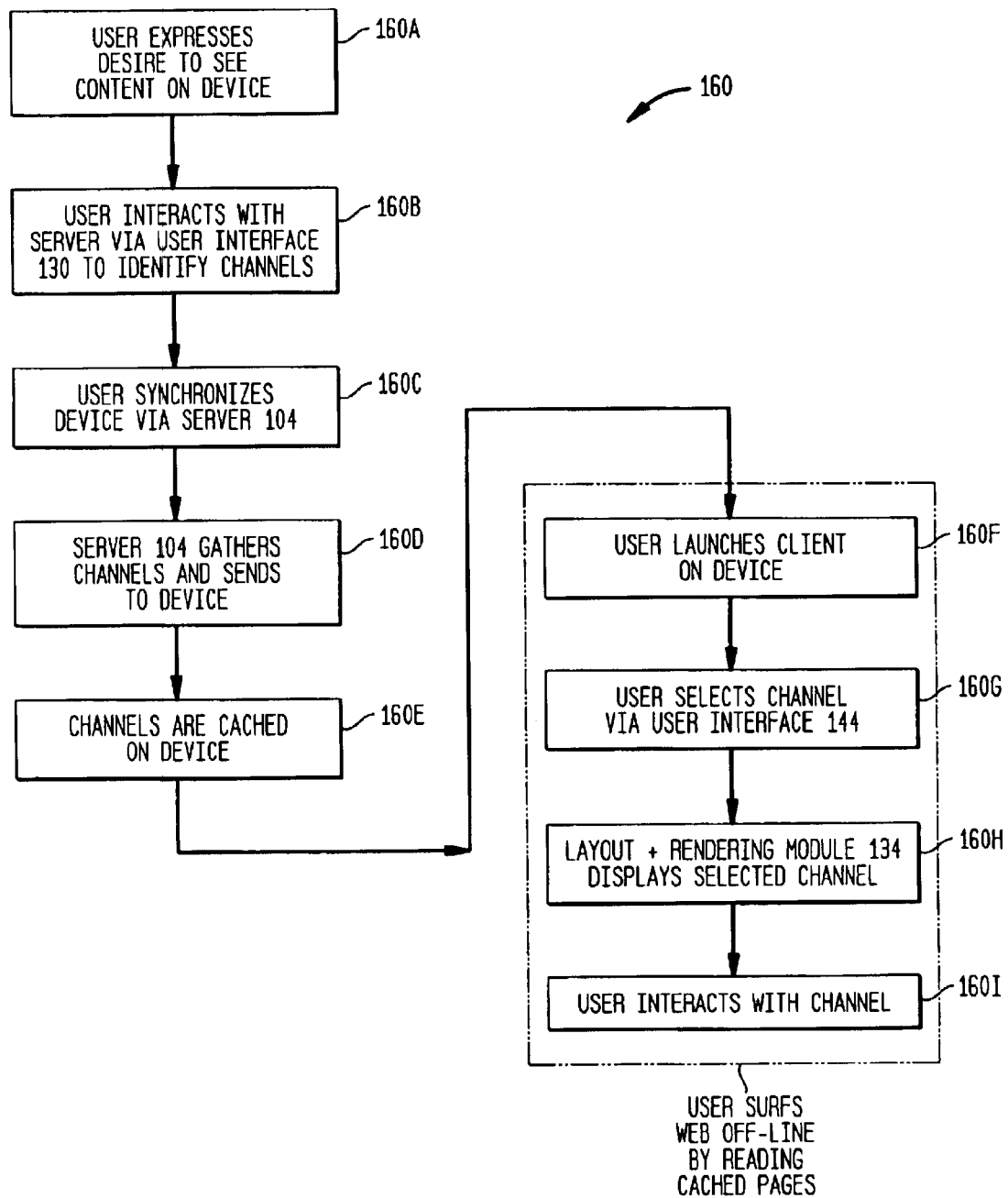
FIG. 1C is an example flowchart of a process to interact with objects on a client in an off-line mode according to an embodiment of the invention.
Figure 1J:
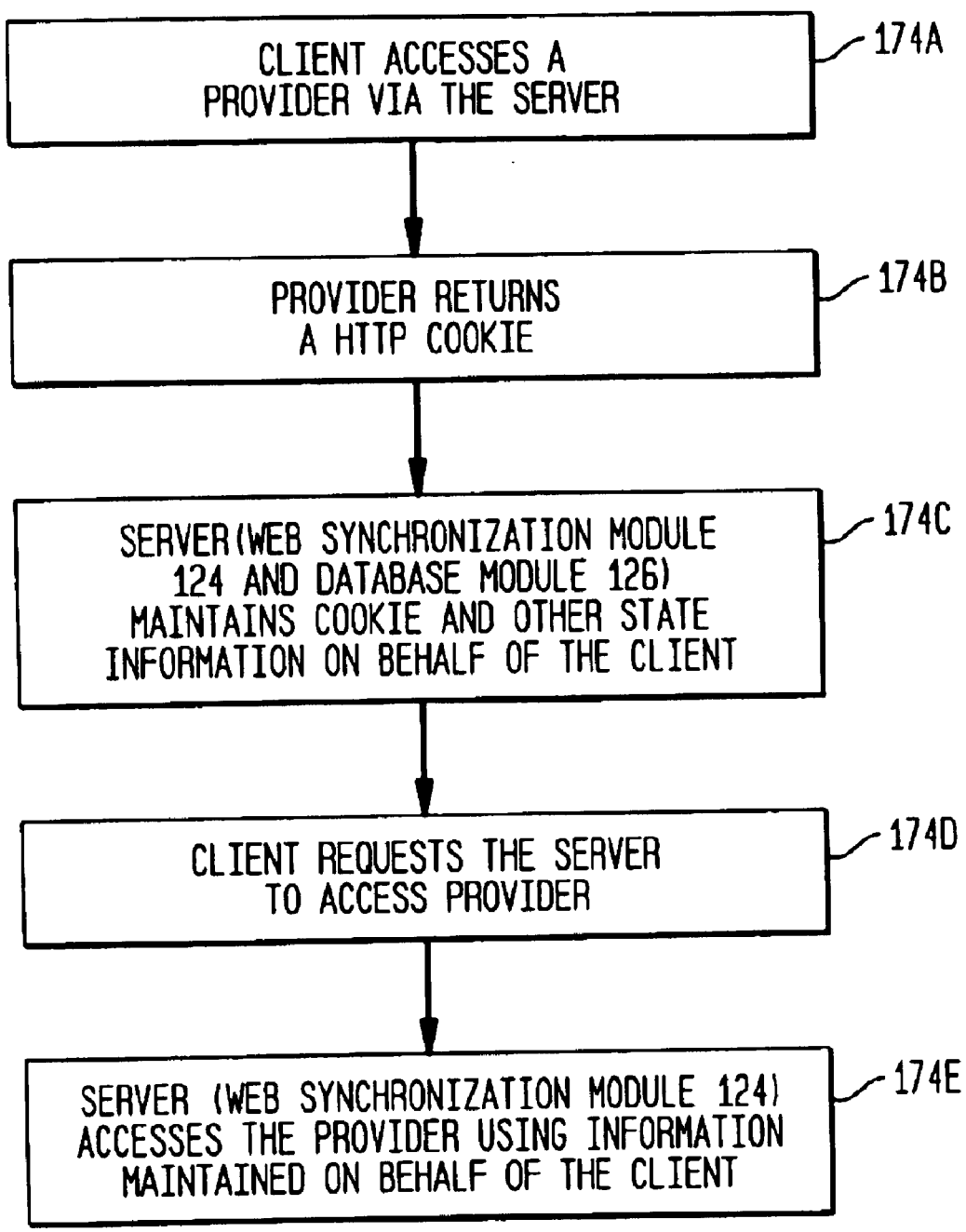
FIG. 1J is an example flowchart relating to server side maintenance of client status information according to an embodiment of the invention.
Figure 1K:
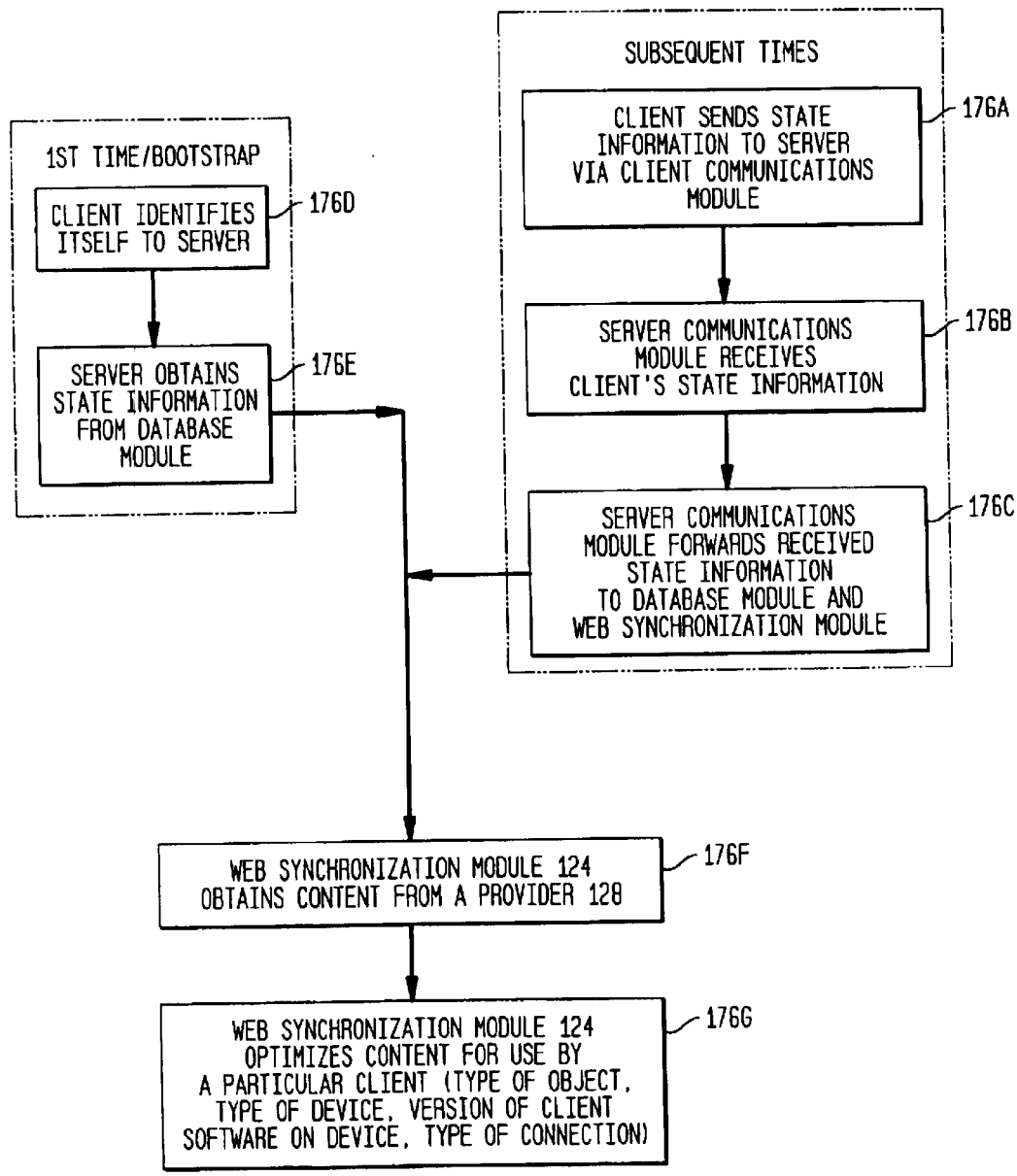
FIG. 1K is an example flowchart relating to optimizing content for a particular client according to an embodiment of the invention.
Figure 1L:
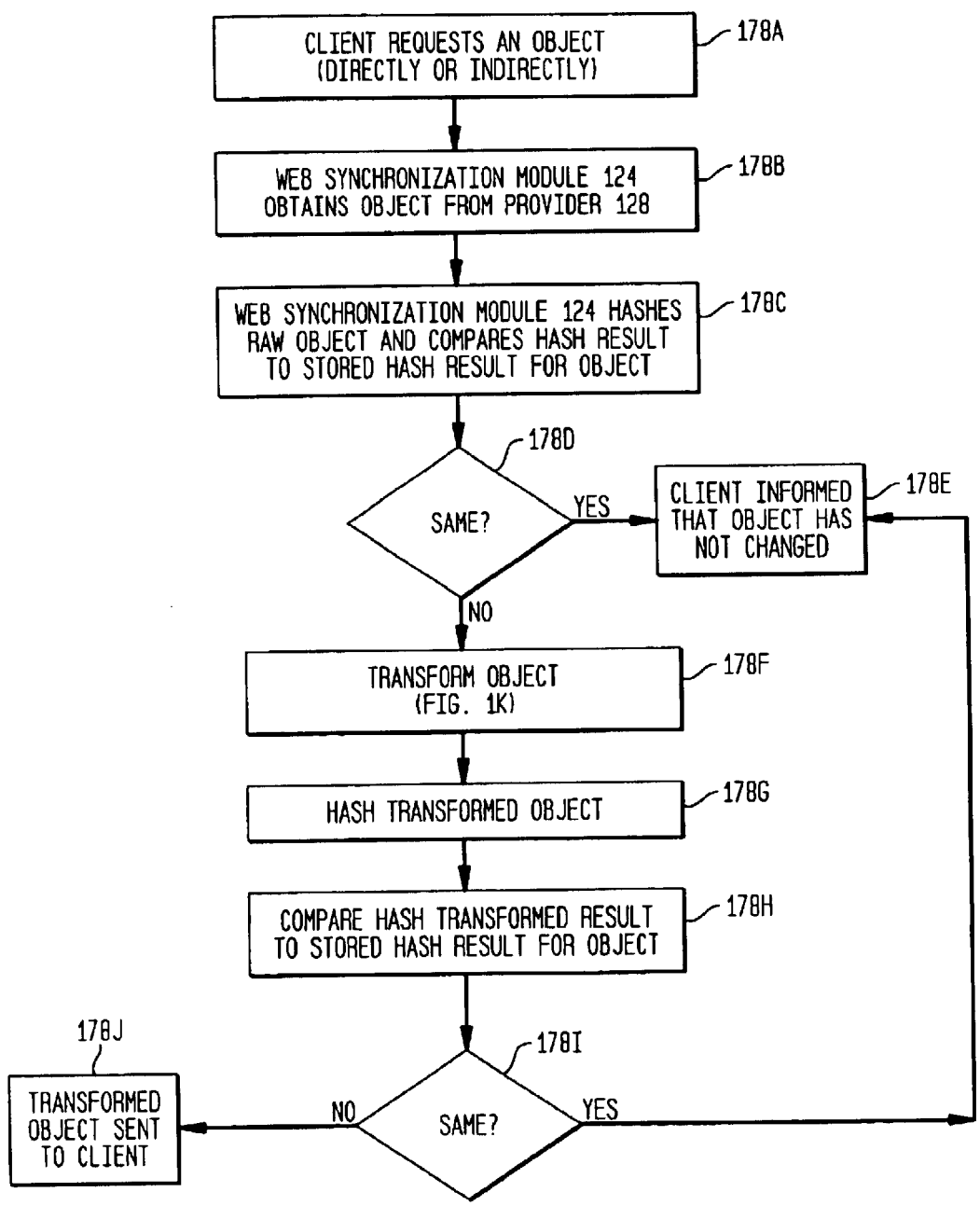
FIG. 1L is an example flowchart relating to selectively sending objects to a client depending on whether the client already has the objects according to an embodiment of the invention.
Figure 1M:
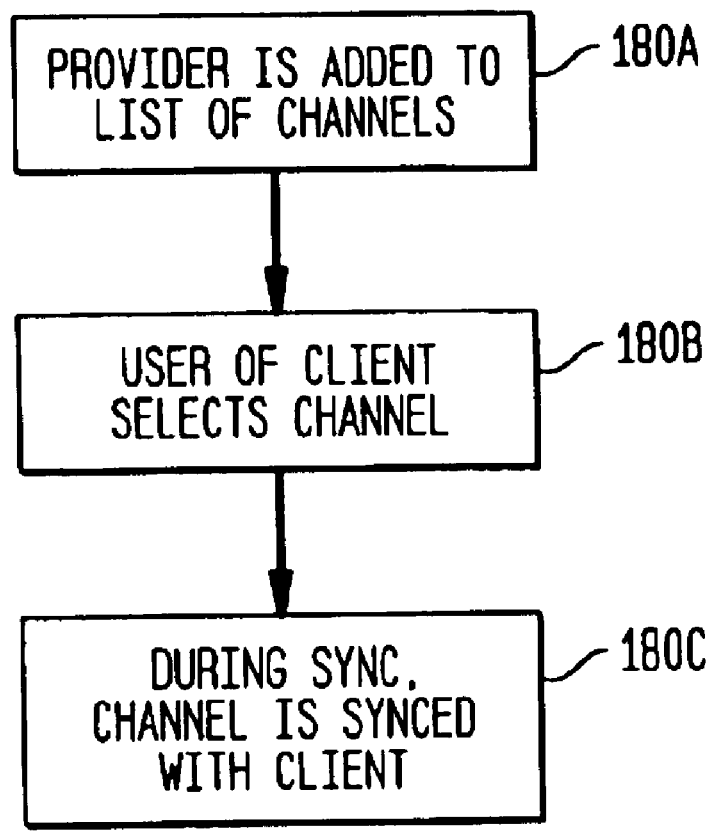
FIG. 1M is an example flowchart relating to syncing channels having collections of objects according to an embodiment of the invention.
Figure 1N:
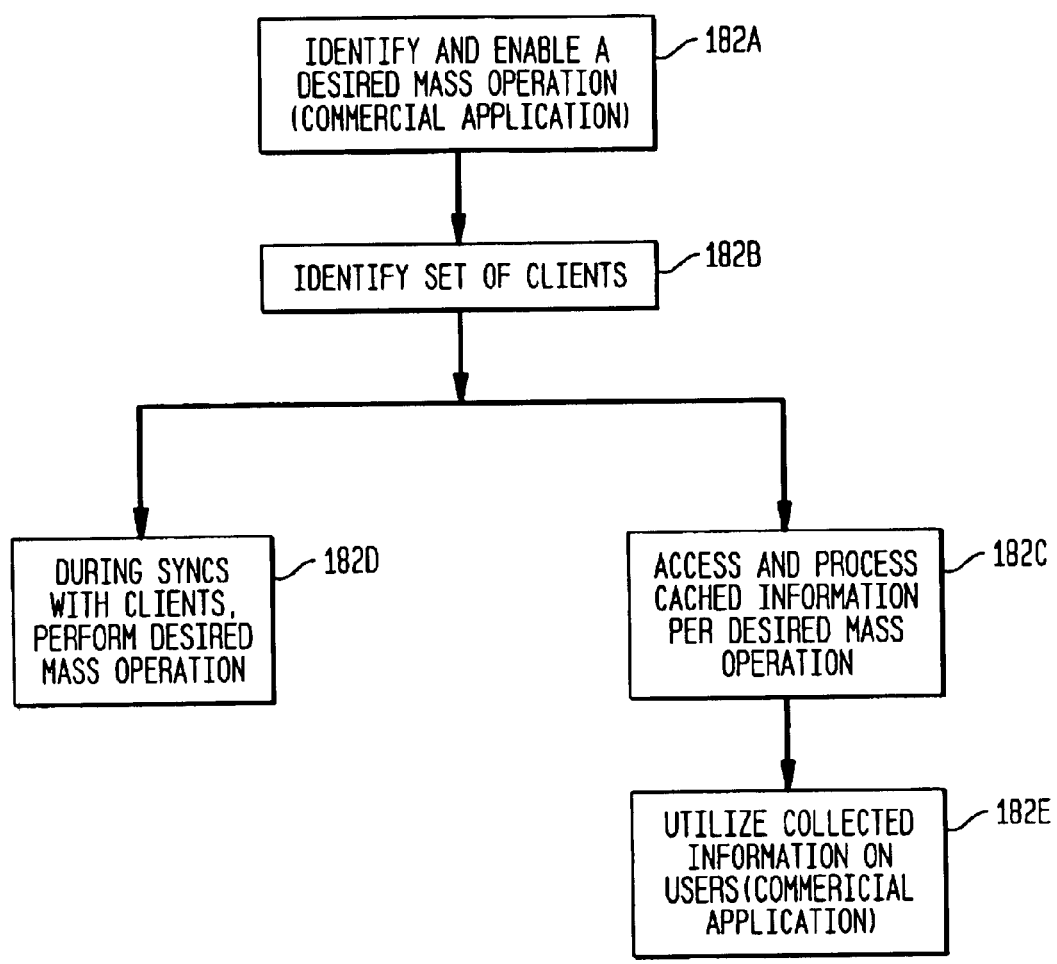
FIG. 1N is an example flowchart relating to fleet management according to an embodiment of the invention.
Figure 1P:
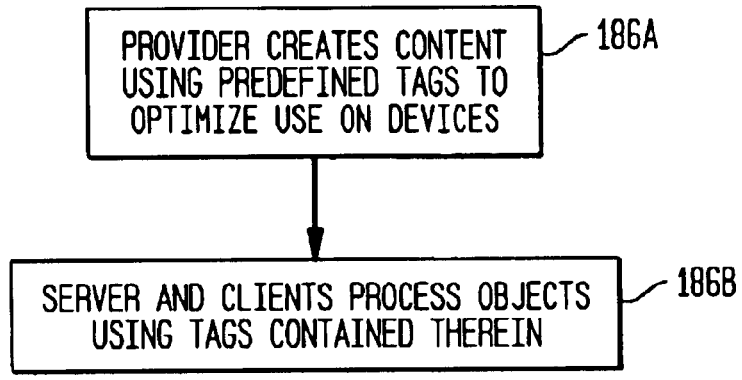
FIG. 1P is an example flowchart relating to enabling providers to optimize their objects for use on clients by using predefined meta tags according to an embodiment of the invention.
Figure 1Q:
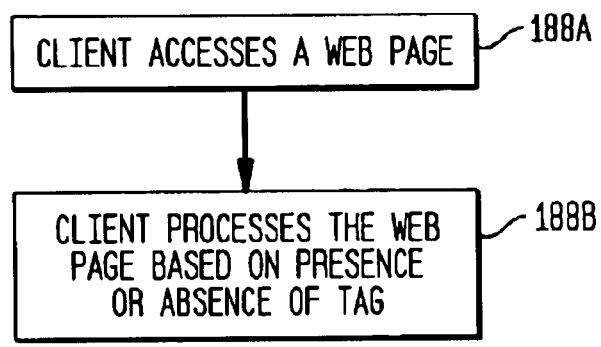
FIG. 1Q is an example flowchart relating to client side processing of objects based on meta tags contained in the objects according to an embodiment of the invention.
Figure 1R:
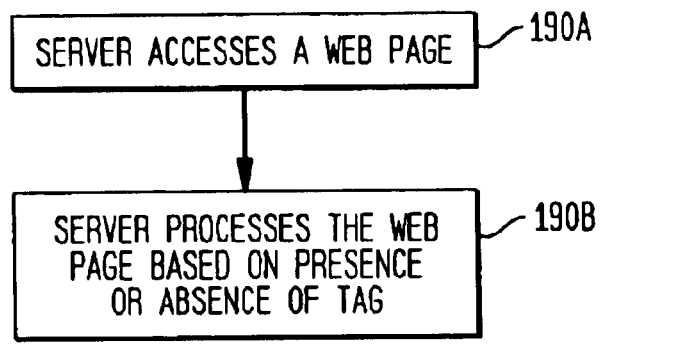
FIG. 1R is an example flowchart relating to server side processing of objects based on meta tags contained in the objects according to an embodiment of the invention.
Figure 1S:
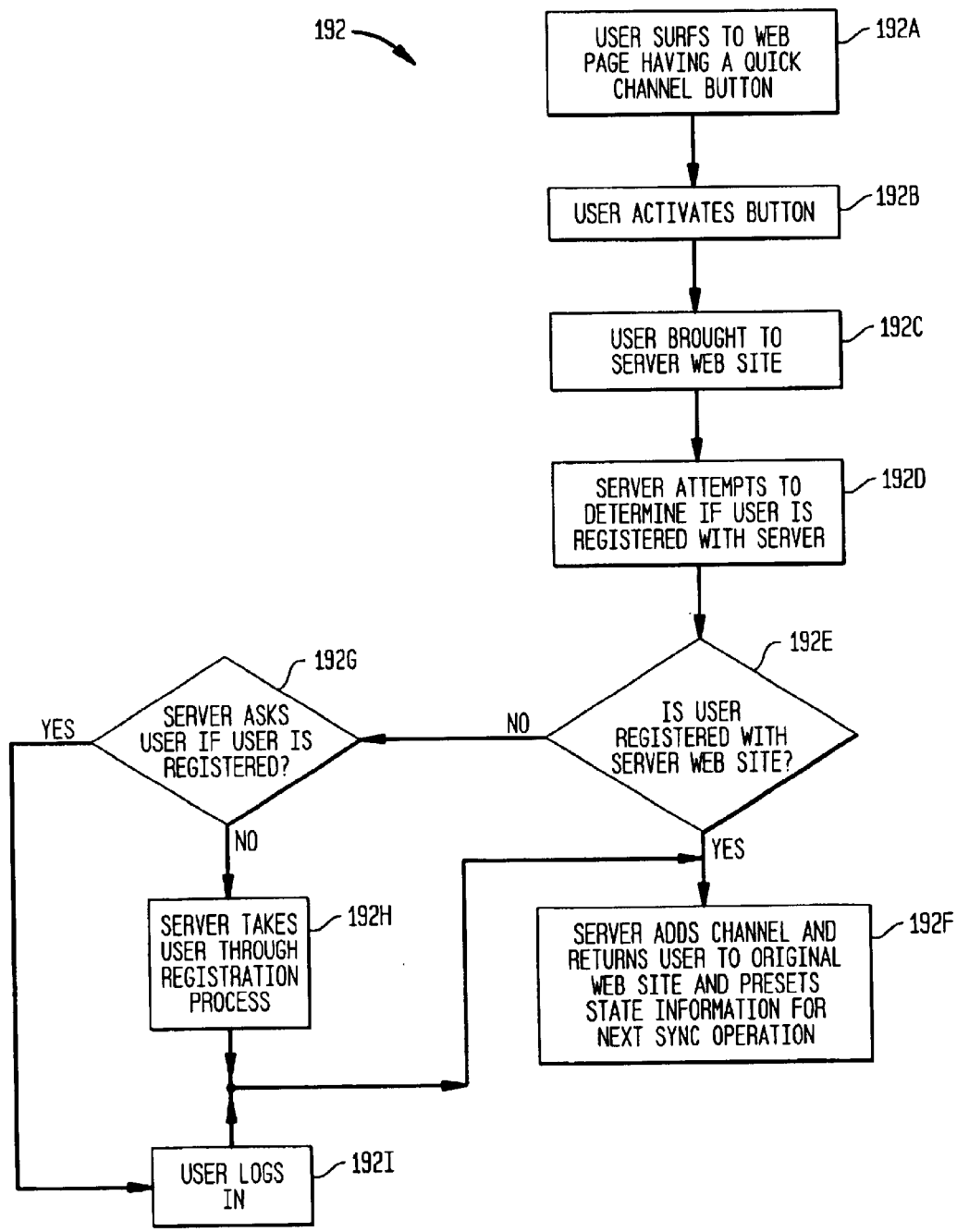
FIG. 1S is an example flowchart relating to selecting a channel and registering a client, if necessary, according to an embodiment of the invention.
Figure 1T:
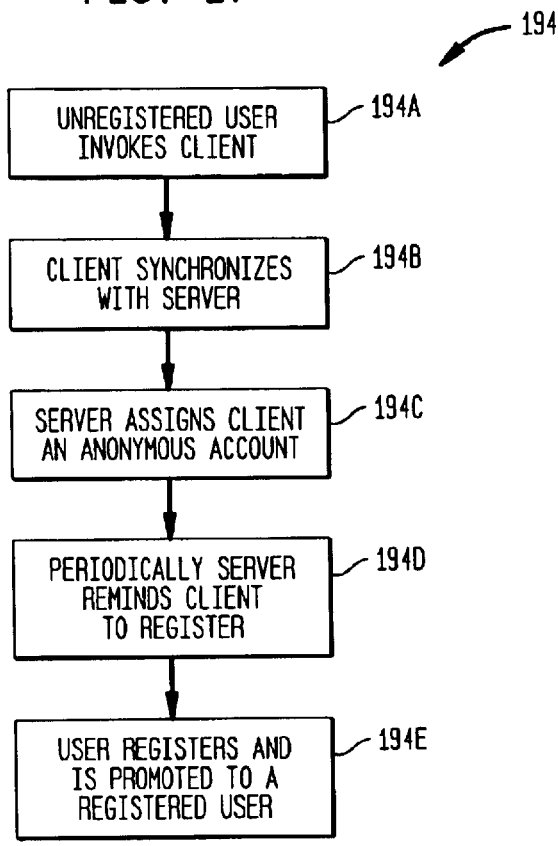
FIG. 1T is an example flowchart relating to processing an anonymous account according to an embodiment of the invention.
Figure 1U:
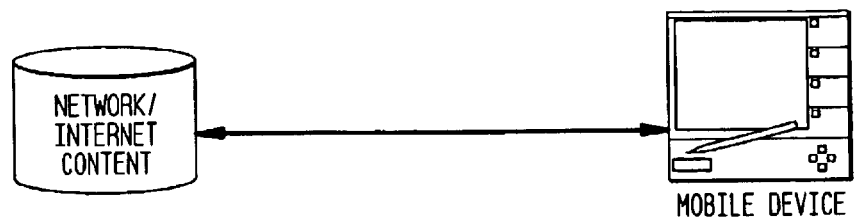

FIG. 1U illustrates the concept of the invention of placing objects on data processing devices, such as mobile devices.
1.1. Enabling Mobile Devices to Interact with Networked Applications The invention includes technology for using applications on mobile devices that interact with the Internet or with intranets. The invention enables applications available via a network or via an Internet/intranet to download and to run on mobile devices. Consequently, the invention includes software and methods for administering a server that manages the variables relevant to a mobile device/server environment.

The invention enables:

Mobile devices to operate in conjunction with a Web server, even when the mobile devices are not coupled directly to the PC using portable on-device servers: Web pages are loaded, viewed, cached, and deleted even when the device is not coupled to any network.

Mobile devices to operate in conjunction with the Web, Internet, or intranet via a connection mechanism and then in disconnected mode or with the Web, Internet, or intranet in wireless mode with a continuous or a discontinuous connection mechanism.

A technique for interactive connectivity between handheld computers and computer networks.

Fleet management for centrally administering information in a handheld network environment that includes, but is not limited to, user data, user groups, group channels, channel data, personal channels, commercial channels, user accounts, corporate account, software groupings, personal information management, form delivery, form management, device configuration, device databases, device contents, and devices parameters.

Obtaining updated Web pages and other network objects, for use when the mobile device is not communicating with the PC.

Figure 1V:
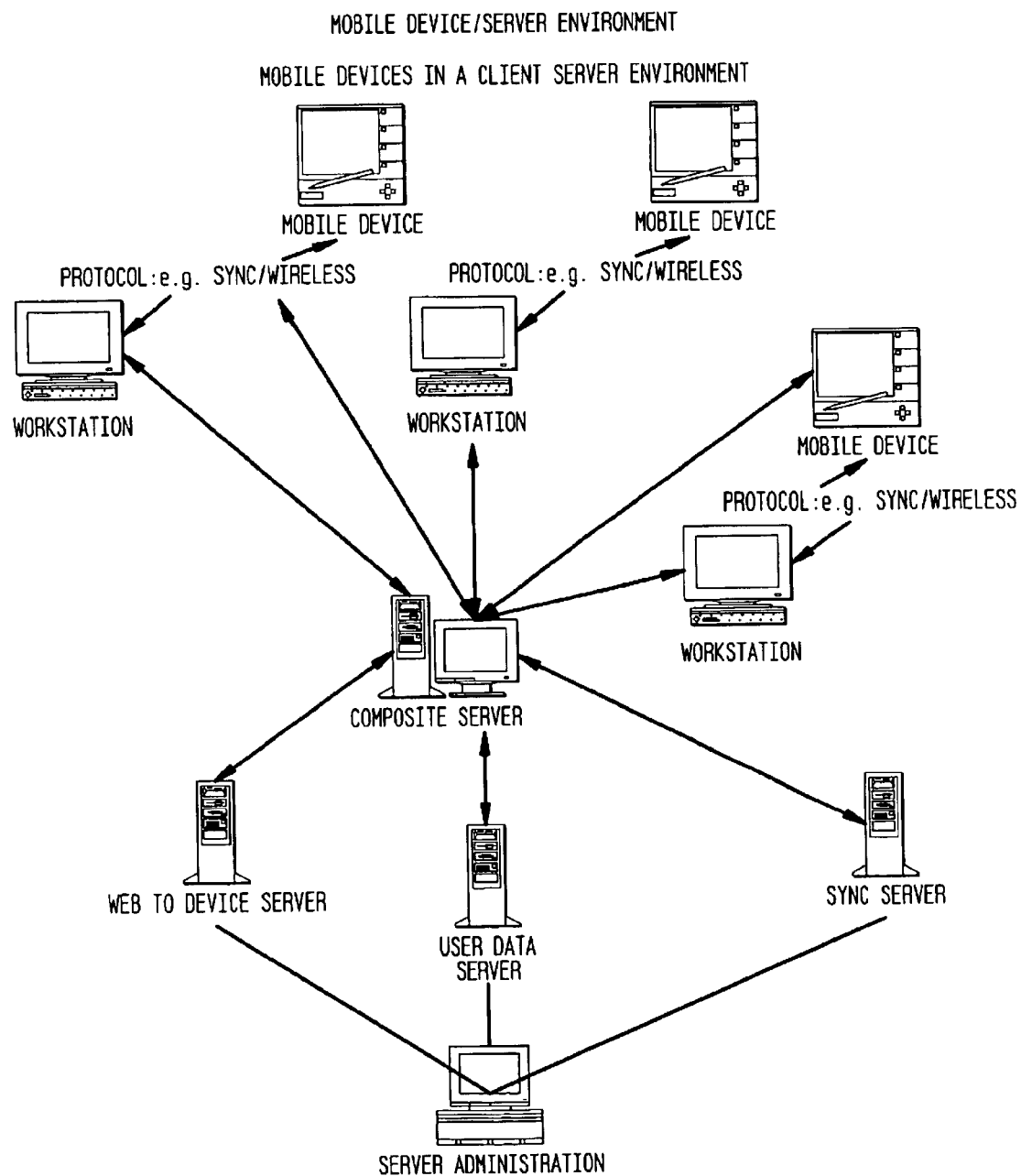

An example mobile device/server environment is shown in FIG. 1V.

1.2. Rapid Transfer of Web Pages to Mobile Devices

To improve efficiency of data exchange between mobile devices and networked content, the invention includes an improved communication protocol that collects requests and responses for network objects into a smaller number of protocol (such as HTTP) requests and responses. The server also determines the nature and the resources of the mobile device. This protocol is represented, for example, in FIG. 1W.

Downstream, the data is encoded in a data format called ABC (tokenized version of the data) and sent to the device. Already Been Chewed (ABC) format creates a tokenized codification of HTML pages that is sent to the device. (The device receives the ABC and presents the material on the device.)

The HTML page is encoded into ABC and sent to the device. The encoding is a mapping of parent and child HTML elements and/or resources to alphanumeric values.

The sync operation of the invention includes various synchronization processes that can collect information from the Internet to a server, and to the client. The usage of the term "sync," as described herein, refers to the overall operation of connecting a client to a server for the exchange, interaction, creation, and removal of data.

In one embodiment, syncing can be defined as mirroring data on a client and a server, such that the data is the same on client and server. In other embodiments, syncing can be defined as overwriting data on a client or on a server, such that the data on either a client replaces the data on a server, and vice versa.

In one embodiment, a sync operation involves a user placing a mobile device into an adapter that includes a sync button. The adapter is connected to a server. Upon pressing the sync button, the user initiates the sync operations of the present invention, which include various synchronization processes (specific delivery modes). Thus, the term sync is meant to refer to the overall operation of linking a client to a server. Synchronization is meant to refer to the specific process of copying, adding, filtering, removing, updating and merging the information between a client and a server. Any number of synchronization processes can be executed during a sync.

Figure 1W:
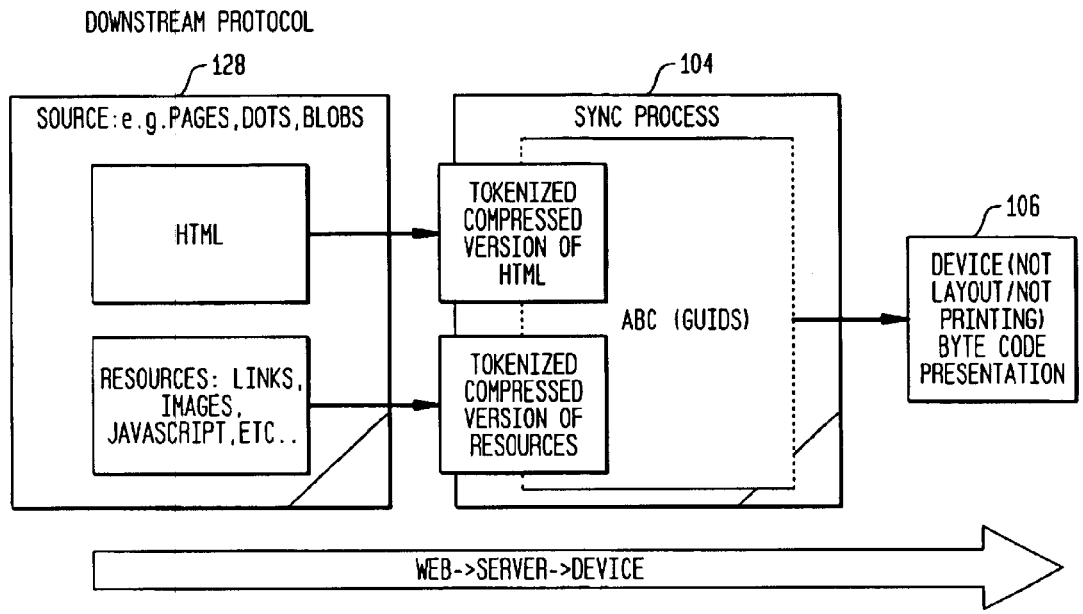
Figure 1X:
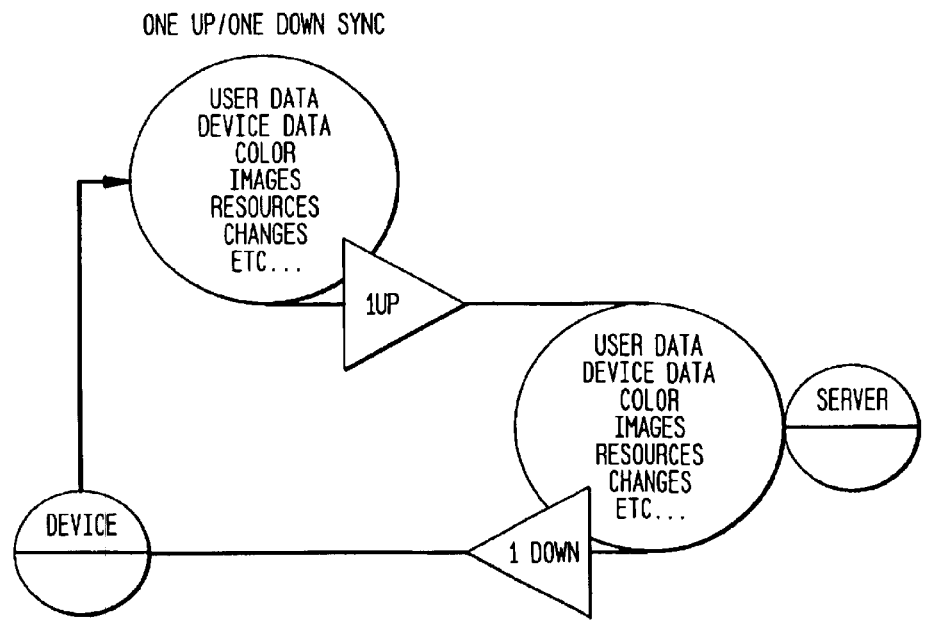
Figure 1Y:
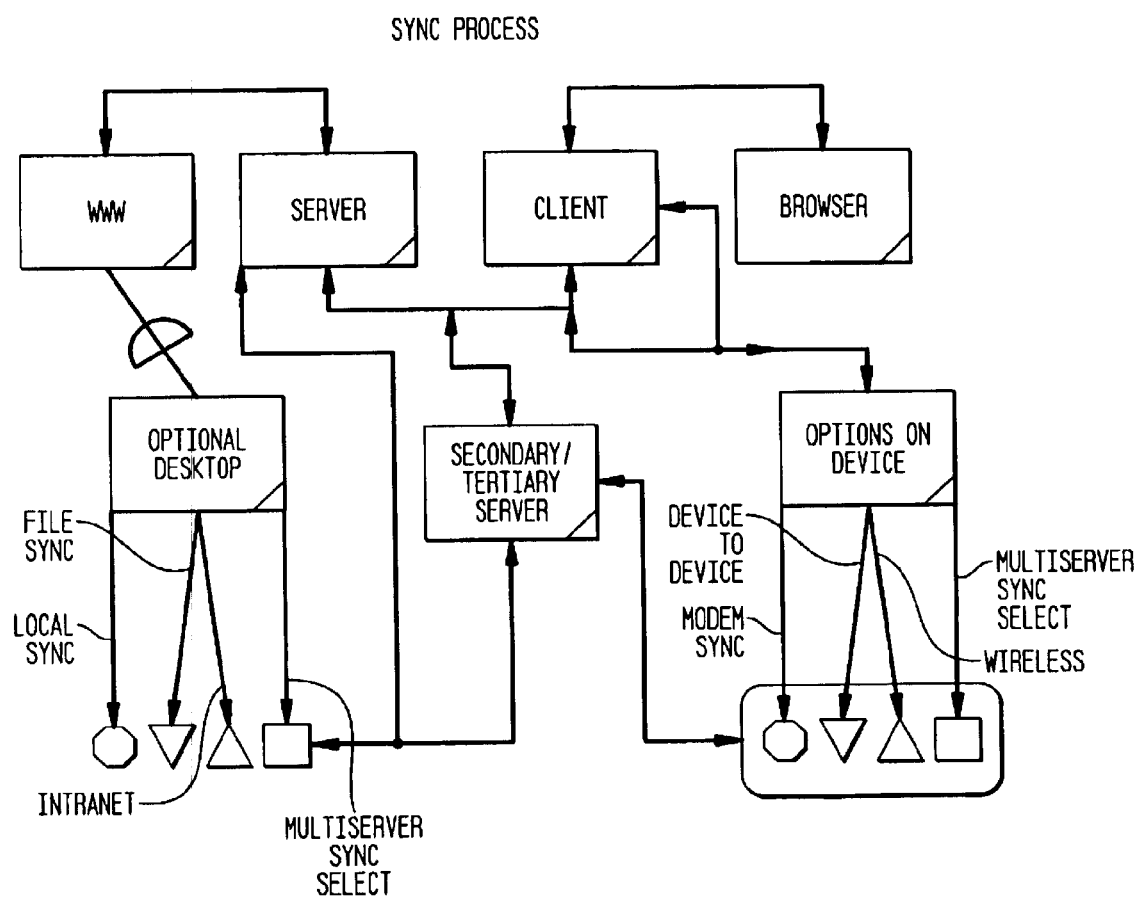
Figure 1Z:
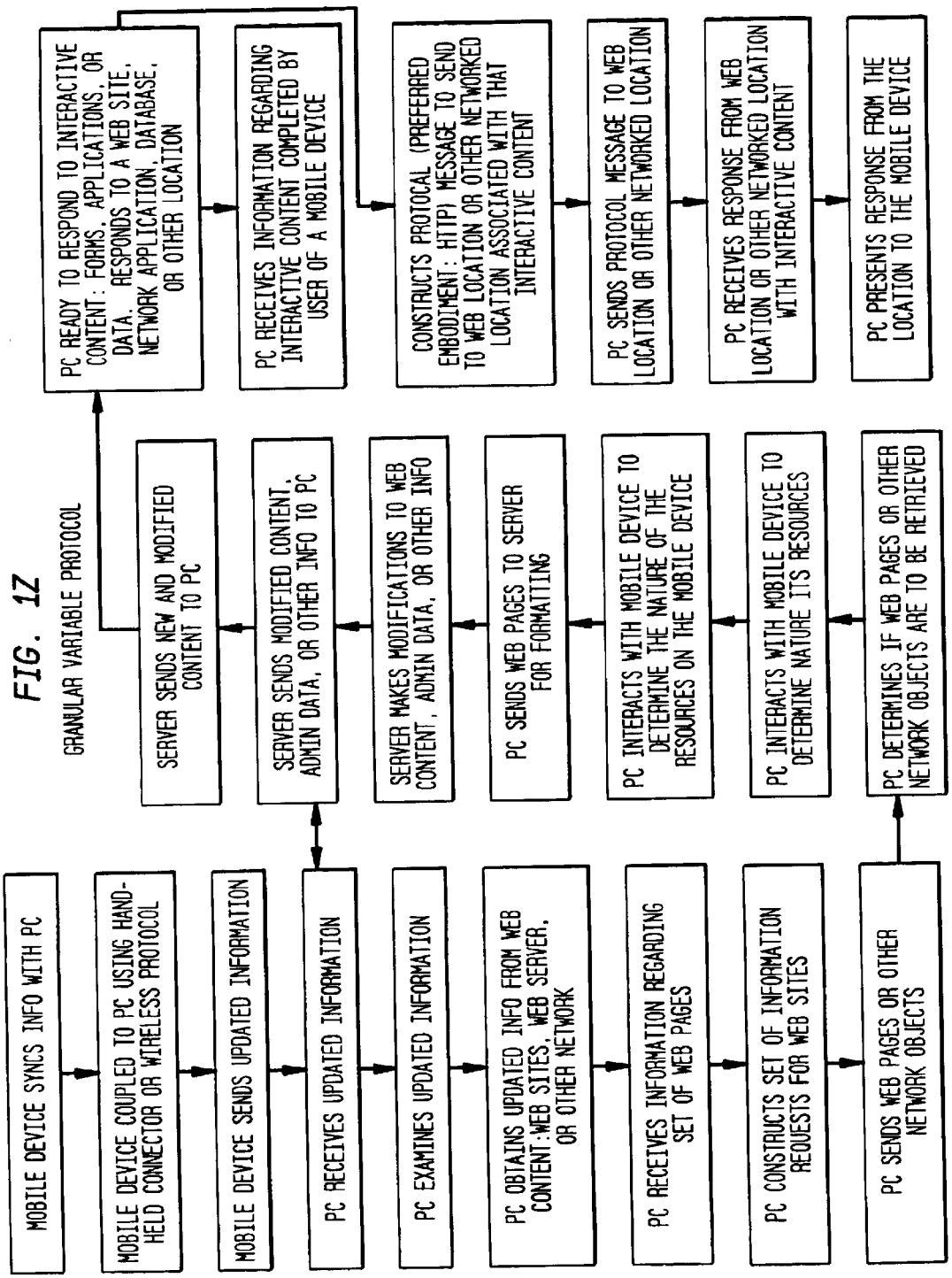
Figure 1A:
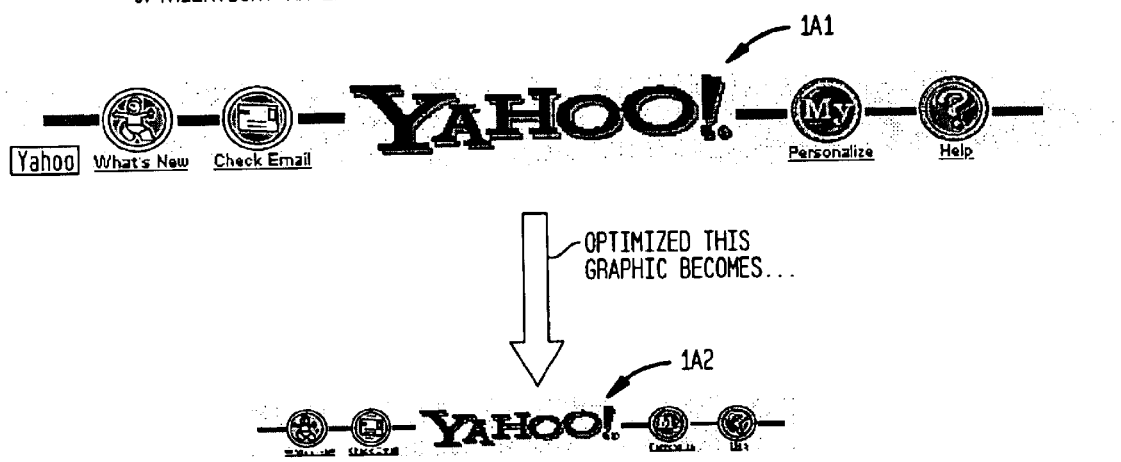
Figure 1A:
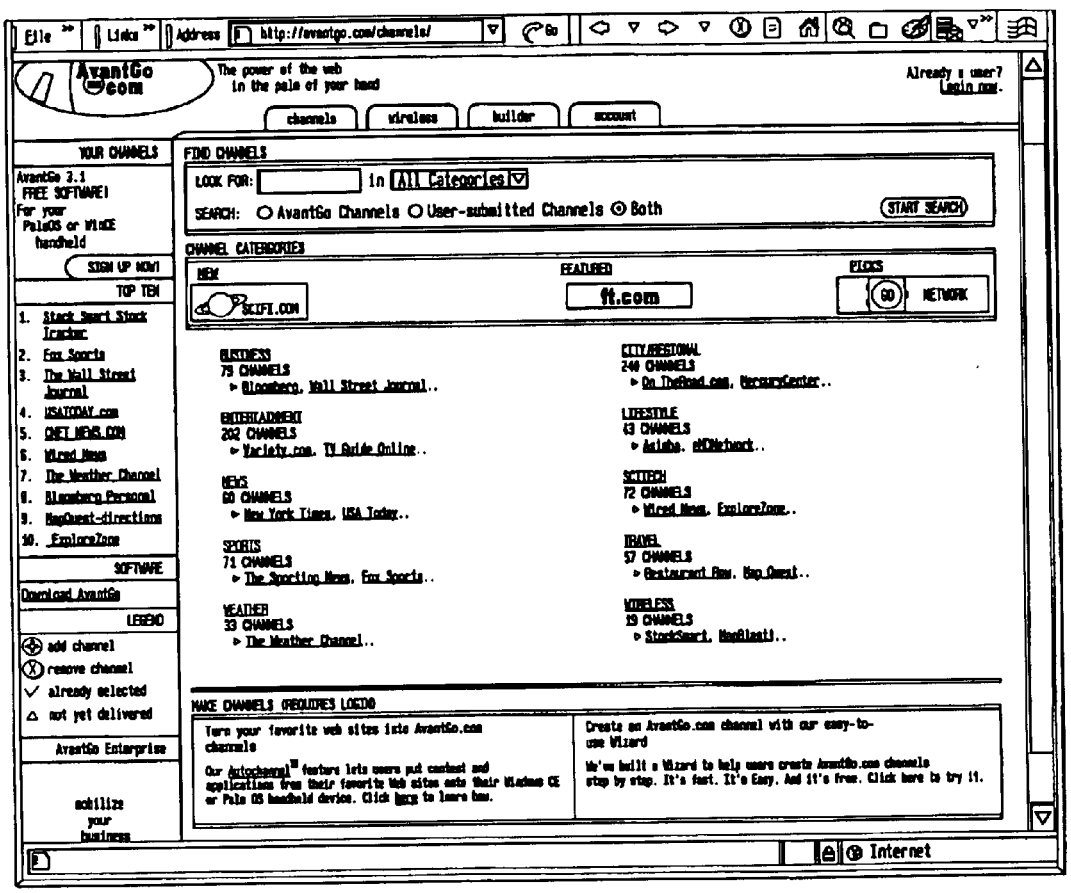

Before being sent downstream the data is compared to the data that is known to be on the client and then the client is updated all at once in a one-up/one-down synchronization method, which is represented in FIG. 1X. The server sets the client to preemptively prepare all device information necessary during the sync. Then the server receives the set of information in a one-up fashion. The server collates the information and sends the information in a one-down fashion. This optimizes the sync's efficiency and speed. The sync process is represented in FIGS. 1Y and 1Z.

1.3. Optimizing Content of Web Pages for Mobile Devices

When Web content and other network objects pass through the server they are processed to minimize their size and to optimize their delivery to mobile devices: for presentation, for ease of use, for efficiency, for size, etc.

The invention uses server logic to optimize content. The server assesses the mobile device to optimize web content for the device. Factors that the server logic considers when performing this optimization include, but are not limited to:

Dynamic memory specifications
High memory specifications
Protected Memory
Storage Memory
Database Memory
Available storage space
Screen size
User profile(s)
Color depth
Applications on device
Buttons on-device
Data markers (e.g., cookies, tokens)
Preferences
Fonts
Font specifications
Sync type
Synchronization types
Supported data types
Supported mime types
Connection/Network profile An example optimization process is shown in FIG. 1AA.

On the server, the graphic is optimized per the state information of the device. If the device sends down the need for the graphic on a page for a device with a display that is 27 cm wide and in grayscale, the server sends its best version of a graphic optimized for that environment.

The technology of the invention is extended by tags on HTML pages that identify content that is designed for additional modifications. Any and all bytes processed by the server are potentially examined for compression/optimization. The server detects the tag and executes the necessary logic.

Table 3 illustrates example tags (the invention is not limited to the tags shown in Table 3).

TABLE 3

Sample Markup Language

| Tag | Effect |
|---|---|
| <META NAME="Handheld-Friendly" content="True"> | This tag enables several HTML features that are normally turned off. Most notably, The invention does not try to display TABLE tags or the HSPACE and VSPACE attributes of IMG tags unless the page is marked as "HandheldFriendly". Most TABLEs or H/VSPACES are designed for much larger screens. |
| <AGIGNORE></AGIGNORE> | Used in a wireless channel. Use the AGIGNORE tag to surround content within an HTML page that may be inappropriate or unattractive on Internet-enabled phones. |
| <AGPAGEBREAK TITLE="your title"> | Used in a wireless channel. Breaks up pages on request. When processing pages for devices other than WAP phones, the server ignores the AGPAGEBREAK tag. |

Web Content Aggregation, Web Channel Development, and Web Content Delivery for Users of the Internet and of Mobile Devices The invention is extended by the coupling of devices to the content available at the server web site (see the example shown in FIG. 1AB).

These and other embodiments of the present invention are described in greater detail below.

Structural Embodiments of the Present Invention

FIG. 1A is a block diagram of a data processing environment 102 according to an embodiment of the invention. The data processing environment 102 includes a server 104 (although only one server 104 is shown, in practice the data processing environment 102 may include a plurality of servers), one or more devices 106, one or more adapters 118, and one or more providers 128.

Generally, the server 104 maintains a collection of channels. In an embodiment, a channel comprises a collection of objects. An object is any entity that can be transferred to a client 108, such as but not limited to content, applications, services, images, movies, music, links, etc.

A channel includes a number of properties. At least some of these properties define the objects that the channel includes. Such properties include, but are not limited to, the following:

A name of the channel.

A location of a root object (such as but not limited to a URL). In an embodiment, this root object is included in the channel. An indication of the number of levels below the root object, for which to include objects in the channel. For example, in an embodiment, if this property is equal to "1 level," then all objects that are 1 level down from the root object (reached by traversing links in the root object), are included in the channel. If this property is equal to "2 levels," then all objects that are 1 level down from the root object (reached by traversing links in the root object), and all objects that are 1 level down from those objects (reached by traversing links in those objects), are included in the channel. Embodiments of the invention allow "uneven" trees, where some branches of the tree extent to a greater number of levels than other branches of the tree. In other embodiments, the trees are even or balanced.

A maximum size of the channel. For example, if this is set to 500 Kbytes, then the aggregate size of the objects in the channel cannot be greater than 500 Kbytes. If the aggregate size of the objects in the channel is greater than this value, then embodiments of the invention may delete objects from the channel and/or delete portions of objects in the channel.

An indication of which resource objects are enabled for the channel:

An indication of whether or not images are to be included in or excluded from objects in the channel; and An indication of whether or not scripts are enabled in objects in the channel.

A refresh methodology.

It is noted that the properties associated with channels may vary from implementation to implementation. Also, implementations may employ combinations of the above properties, and/or properties in addition to the following, as will be appreciated by persons skilled in the relevant art(s).

The invention includes processes for managing channels, including but not limited to adding channels to the collection of channels maintained by the server 104.

The server 104 offers channels to clients 108. A client 108 may access the server 104 and view the collection of channels. The client 108 may then select any combination of the channels in the collection. The server 104 maintains a list of the channels associated with each of the clients 108.

During a synchronization process, the server 104 loads a device 108 with the channels associated with the client 108. Generally, the server 104 does this by obtaining from providers 128 the objects defined by the channels, and causing those objects to be stored on the client 108. Thus, during the synchronization process, the server 104 will load the client 108 with the selected channels. More particularly, the server 104 will load the client 108 with the objects associated with the channels.

The client 108 may process and use those objects when not connected to the server 104. The invention enables the client 108 to actively interact with the objects and channels.

In one embodiment, the client 108A directly interacts with the server 104 via some transmission medium 120B, which may be any wired or wireless medium using any communication protocol.

In another embodiment, the client 108B indirectly interacts with the server 104 via an adapter 118. For example, the client 108B may be a mobile device (such as a Palm device) and the adapter 118 may be a cradle and a computer coupled to the cradle (the mobile device is inserted into the cradle). In this instance, the adapter 118 presents itself to the server 104 as a client 108B (via client communications module 110C). When the server 104 sends objects to the adapter 118, the adapter interface module 116 writes those objects to client 108B. In embodiments, adapter interface module 116 can be a Hot Sync™ Manager, an Active Sync™, etc. It is noted that the invention is not limited to any of the implementation examples discussed herein.

The components shown in FIG. 1A shall now be described in greater detail.

The server 104 includes an administration module 122, a database module 126, a user interface 130, a web synchronization module 124, a server extension module 156, a fleet management module 154, a notification module 132, and a server communication module 114. Other embodiments of server 104 may include a subset of these modules, and/or may include additional modules.

The administration module 122 controls and manages the states of the server 104 and the clients 108. For example, the administration module 122 manages and controls groups of clients 108, permissions assigned to clients 108, groups, and channels. For example, the administration module 122 administers the users/clients 108 assigned to groups, and the channels associated with users. These and additional functions performed by the administration module 122 are described herein.

The database module 126 controls access to databases associated with the server 104. The database module 126 maintains information relevant to the clients 108, as well as information relevant to the modules contained in the server 104. The database module 126 manages information on the collection of channels maintained by server 104. These and additional functions performed by the database module 126 are described herein.

The user interface 130 is, in an embodiment, a graphical user interface (GUI) that enables users and clients 108 to access functions and modules offered by the server 104. More generally, the user interface 130 within server 104 provides access to server 104 and the modules and resources contained therein.

The invention supports various server web sites that are available through any communication medium, such as but not limited to the Internet, intranets, direct dial up links, etc. The UI 130 enables such web sites.

These and additional functions performed by the user interface 130 are described herein.

The web synchronization module 124 is an application/instance of server extension module 156, and controls synchronization of web content to client 108. The invention may include other synchronization modules (which are application/instances of server extension module 156) that control synchronization of other types of objects to clients 108. For example, the server 104 may administer a calendar that may be installed on clients 108. The synchronization of appointments, events and/or dates on this calendar between clients 108 and the server 104 may be performed by a calendar synchronization module. These and additional functions performed by the server extension module 156 are described herein.

The fleet management module 154 performs functions associated with fleets of clients 108, which are groups of clients 108. For example, fleet management module 154 may perform global or mass operations on groups (fleets) of clients 108, such as loading or updating an application on groups (fleets) of clients 108. Another example of a mass operation is retrieval of information on clients 108 in a fleet, such as the free memory in clients 108 in a fleet (this would help an organization determine if its clients 108 need a memory upgrade). These and additional functions performed by the fleet management module 154 are described herein.

The server extension interface/module 156 enables modules, such as third party modules, to operate in or work with the server 104 (and modules contained in the server 104). The server extension module 156 presents an API (application programming interface). Modules in the server 104 may operate with other devices in the server 104 by conforming to the server API.

For example, the web synchronization module 124 and the fleet management module 154 (as well as other types of synchronization modules, not shown in FIG. 1A) may interact with databases on the server 104 via the database module 126 by going through the server extension module 156. The web synchronization module 124 and the fleet management module 154 may not be able to interact directly with the database module 126 for a number of reasons. For example, they may support different data formats, or simply "speak different languages." However, they can interact via the server extension module 156 as well as other server modules as long as they conform to the API of the server extension module 156. This is true of any modules in the server 104, or that interact with the server 104.

Server communication module 114 enables communication between the server 104 and entities external to the server 104, such as clients 108, adapters 118, providers 128, work stations, etc. The server 104 communicates with these entities via communication mediums 120, which may be any type of wireless or wired communication using any protocol. It is noted that multiple server communication modules 114 may execute in a single server 104. For example, in one embodiment, server communication module 114 is a TCP/IP stack. In another embodiment, server communication module 114 is a secure socket layer stack or a compression stack. The invention is not limited to any implementation examples discussed herein. These and additional functions performed by the server communication module 114 arc described herein.

The notification module 132 sends objects to clients 108 beyond objects related to channels associated with clients 108. Such objects could be requested by client 108 in advance. For example, a client 108 could ask for a notification when an event happens, such as when a stock reaches a target price. When the event occurs, the notification module 132 would cause an appropriate notification(s)/object(s) to be sent to the client 108. Alternatively, the notification module 132 may send objects to clients 108 without any prior explicit request from the client 108. For example, the notification module 132 might send channels to clients 108 when such channels are identified to be similar to those already selected by the clients 108. Also, the notification module 132 might send appropriate notifications/objects to the clients 108 when such clients 108 receive email or faxes at the server 104. In embodiments, the notification module 132 transmits such objects to the client 108 immediately when the event occurs, during the next synchronization with the client 108, or at some other future synchronization.

An alternative representation of server 104 is shown in FIG. 1B. FIG. 1B illustrates, for example, that messages from entities outside of server 104 are received by server extension interface/module 156 via server communications modules 114. Generally, such messages represent requests for the server 104 to perform various functions. The server extension module 156 conceptually operates as a dispatcher who routes such messages to other modules contained in the server 104, such as web synchronization module 124 (who handles requests to synchronize with web content), notification module 132, fleet management module 154 (who handles fleet related requests), and/or third party modules 155 (such as other synchronization modules). Thus, the invention supports modules 155 generated by third parties to perform various functions. Such modules 155 "plug-in" to the server 104 via the server extension module 156.

Referring again to FIG. 1, the devices 106 may be any type of data processing device. In embodiments of the invention, the devices 106 are mobile computing devices, although the invention is not limited to these embodiments. In such example embodiments, the devices 106 may include, but are not limited to, handheld computers, cellular phones, internet-enabled phones, pagers, radios, tvs, audio devices, car audio systems, recorders, text-to-speech devices, barcode scanners, net appliances, mini-browsers, personal data assistants (PDAs), etc.

In embodiments of the invention, the devices 106 include software, hardware, and/or combinations thereof related to client functionality (such client functionality is described herein). When a device 106 includes such software, hardware, and/or combinations thereof, the device 106 is referred to herein as a client 108. Accordingly, it can be said that the data processing environment 102 includes one or more clients 108.

Clients 108 each may include a layout and rendering module 134, a forms module 136, a control module 142, a user interface 144, a client extension interface. 138, a client interface module 112, a client communications module 110, a JavaScript™ engine 140, and a database module 146. Other embodiments of clients 108 may include a subset of these modules, and/or may include additional modules.

Layout and rendering module 134 controls the processing of data objects on client 108, such as the layout and rendering of data objects on client 108. For example, the layout portion of module 134 obtains information from databases of the client 108 (via the database manager 146) and determines where such information should be rendered on the display of the client 108. Such information may include anything that can be rendered, such as but not limited to images, text, links, etc. The rendering portion of module 134 is responsible for drawing items on the display (drawing bits to the screen). These and additional functions performed by the layout and rendering module 134 are described herein.

The forms module 136 controls and manages forms. For example, in embodiments the forms module 136 manages aspects of off-line forms, such as HTML forms and/or multi-page forms. The forms module 136 enables access to and user interaction with forms (in some embodiments, the forms module 136 via UI 144 enables users of client 108 to directly access forms). The forms module 136 maintains the status of forms. Forms module 136 can also include a forms manager (not shown) to provide added functionality. These and additional functions performed by the forms module 136 are described herein.

The user interface 144 is preferably a graphical user interface that enables users to interact with client 108 and functions and modules provided by the client 108. More generally, UI 144 controls how functions presented by modules of the client 108 are presented to users. The UI 144 controls how users interact with such functions and modules. It is noted that the functionality of the UI 144 may be distributed. For example, portions of the UI 144 may reside in the forms module 136, as well as other modules of client 108. These and additional functions performed by the user interface 144 are described herein.

The client extension interface 138 enables modules, such as third party modules, to operate in or work with the client 108 (and modules contained in the client 108). The client extension interface 138, also known as an on-device server, presents an API (application programming interface) that is, in embodiments, common to clients 108 on many architectures.

Modules in the client 108 can work together via the client extension interface 138. For example, the JavaScript™ engine 140 may decide that it wishes to display a message to the user. To do this, the JavaScript™ engine 140 would work through the client extension interface 138 to cause the UI 144 to display the message to the user. The JavaScript™ engine 140 may not know how to directly interact with the UI 144. However, as long as both the JavaScript™ engine 140 and the UI 144 conform to the API of the client extension interface 138, then they can operate together.

Similarly, the control module 142 may decide that it needs to store some data in a database. The control module 142 would do this by working with the client extension interface 138 to access the database module 146 to effect such a modification to the databases in the client 108. These and additional functions performed by the client extension interface 138 are described herein.

The JavaScript™ engine 140 executes objects written in the JavaScript™ language that operate on client 108. As noted, the JavaScript™ engine 140 conforms to the API of the client extension interface 138, and works with the client extension interface 138 to work with other modules in client 108. These and additional functions performed by the JavaScript™ engine 140 are described herein.

Although not shown in FIG. 1A, embodiments of the invention include other engines for executing other types of scripts on client 108. These other engines can interact with other modules on client 108 as long as the engines conform to the API of the client extension interface 138.

The database module 146 controls access to databases associated with client 108. More generally, the database manager 146 controls access to resources on the client 108. For example, the control module 142 may interact with the database manager 146 to open an address book in the databases, and to write a record to the address book. Alternatively, the forms module 136 can interact with the database module 146 to access forms that are stored in the databases. These and additional functions performed by the database module 146 are described herein.

Client communications module 110 enables the client 108 to interact with external entities, such as server 104. In embodiments, the client communications module 110 enables TCP/IP traffic, although the invention is not limited to this example. More generally, the client communications module 110 enables communication over any type of communication medium 120, such as wireless, wired, etc., using any communication protocol, such as a pager protocol. These and additional functions performed by the client communications module 110 are described herein. The client interface module 112 enables the client 108 to communicate with adapters 118. Client interface module 112 optionally links to client communications module 110 in some embodiments to provide functionality (for example, when the client communications module 110 uses a wireless modem's drivers, which are accessed via client interface module 112). In embodiments, the client interface module 112 may be Hot Sync™ Manager in the Palm operating environment, or Active Sync™ in the Windows CE™ operating environment, or Pilot Link™ in the Unix operating environment. It is noted that these implementation examples are provided for illustrative purposes only. The invention is not limited to these examples. These and additional functions performed by the client interface module 112 are described herein.

The control module 142 coordinates the activities of the other modules in client 108 so that all the modules share resources properly. For instance, control module 142 can determine priorities for shared resources such as processing time, accessing memory, etc.

Providers 128 are sources of various types of objects, such as but not limited to content (content providers 128A), applications (application providers 128B), services (service providers 128C), etc. Providers 128 may also include servers 104' (similar to server 104), which may provide objects such as but not limited to content, applications, services, etc. For example, and without limitation, the application providers 128B may provide objects relating to (without limitation) operating system updates/changes, system upgrades, application updates/changes, etc.

Adapters 118 include an adapter interface module 116, a user interface 148, a database module 150, an adapter synchronization module 152, and a client communications module 110. Other embodiments of adapters 118 may include a subset of these modules, and/or may include additional modules.

Client communications module 110 is the same as similarly named modules in clients 108.

The adapter interface module 116 enables the adapter 118 to communicate with clients 108.

The adapter synchronization module 152 is involved with synchronization operations between server 104 and clients 108.

The UI 148 enables users to interact with modules and functions of adapter 118.

The database module 150 controls access to databases associated with adapter 118. The database module 150 manages information needed for clients 108 to remain in sync with server 104. In some embodiments, the adapter 118 does not include the database module 150 or the UI 148 (i.e., in embodiments where the adapter 118 operates essentially as a pipe, as in some embodiments on Unix).

These and additional functions performed by modules of the adapter 118 are described herein.

2.1. Example Implementation Embodiments

FIG. 1B1 illustrates a block diagram of a data processing unit 103A that can be used to implement the entities shown in FIGS. 1A and 1B. It is noted that the entities shown in FIGS. 1A and 1B may be implemented using any number of data processing units 103A, and the configuration actually used is implementation specific.

Data processing unit 103A may represent laptop computers, hand held computers, lap top computers, and/or any other type of data processing devices. Which type of data processing device used to implement entities shown in FIGS. 1A and 1B is implementation specific.

Data processing unit 103A includes a communication medium 103B (such as a bus, for example) to which other modules are attached.

Data processing unit 103A includes one or more processor(s) 103C, and a main memory 103D. Main memory 103D may be RAM, ROM, or any other memory type, or combinations thereof.

Data processing unit 103A may include secondary storage devices 103E, such as but not limited to hard drives 103F or computer program product interfaces 103G. Computer program product interfaces 103G are devices that access objects (such as information and/or software) stored in computer program products 103. Examples of computer program product interfaces 103G include, but are not limited to, floppy drives, ZIP™ drives, JAZ™ drives, optical storage devices, etc. Examples of computer program products 103H include, but are not limited to, floppy disks, ZIP™ and JAZ™ disks, memory sticks, memory cards, or any other medium on which objects may be stored.

The computer program products 103H include computer useable mediums in which objects may be stored, such as but not limited to optical mediums, magnetic mediums, etc.

Control logic or software may be stored in main memory 103D, secondary storage device(s) 103E, and/or computer program products 103H.

More generally, the term "computer program product" refers to any device in which control logic (software) is stored, so in this context a computer program product could be any memory device having control logic stored therein. The invention is directed to computer program products having stored therein software that enables a computer/processor to perform functions of the invention as described herein.

The data processing unit 103A may also include an interface 103J which may receive objects (such as data, applications, software, images, etc.) from external entities 103N via any communication mediums including wired and wireless communication mediums. In such cases, the objects 103L are transported between external entities 103N and interface 103J via signals 103K, 103M. In other words, such signals 103K, 103M include or represent control logic for enabling a processor or computer to perform functions of the invention. According to embodiments of the invention, such signals 103K, 103M are also considered to be computer program products, and the invention is directed to such computer program products.

3. Operational Embodiments of the Present Invention 3.1. Enabling On-device Servers, Off-line Forms, and Dynamic Ad Tracking On Mobile Devices 3.1.1. Caching Objects on Clients for Off-line Browsing Referring to FIG. 1C, a flowchart 160 is shown that illustrates a process by which content is captured and stored on client 108 to thereby allow the user to view the content on device 106 offline, according to an embodiment of the invention. Flowchart 160 begins with a user expressing the desire to see content on device 106 (step 160A). Device 106 may be a handheld unit of the type as described herein.

It is noted that when client 108 is resident on device 106, the terms client and device are used interchangeably herein (unless noted otherwise either explicitly or implicitly by context).

For convenience, functions are described herein as being performed by certain module(s). The invention is not limited to these descriptions. In embodiments, such functions are performed by other module(s). This is true throughout the discussion herein.

While device 106 is described in terms of the above-mentioned units, this is for convenience only and is not intended to limit its application. In fact, after reading the following description, it will be apparent to one skilled in the relevant art(s) how to implement the following invention in alternative embodiments (e.g., by providing the functionality of device 106 in emulation on a desktop PC or workstation).

In manipulating device 106, the user interacts with server 104 via user interface 130 to identify channels (step 160B). In one embodiment of the invention, channels contain content. As previously mentioned, content can be information. Additionally, content may be organized topically into areas of interest to a user. Generally, the channels can include any objects.

In another embodiment of the invention, the content in channels may be altered over time. For example, channels may be updated periodically in a predetermined fashion. In another example, channels are updated conditionally upon the occurrence of an event. In order to obtain the altered content, the user synchronizes device 106 via server 104 (step 160C). The synchronization process is discussed in detail in later sections of this application. During synchronization, server 104 gathers channel content and sends it to device 106 (step 160D).

3.1.2. Channel Aggregation and Selection By Clients

As discussed herein, the server 104 collects or aggregates channels for selection by clients 108.

FIG. 2 is a flow diagram describing in further detail the process 160D for gathering channels and sending the channels to device 106 according to an embodiment of the invention. The process begins with step 202.

In step 202, top level resources that server 104 needs to fulfill client 108's request are identified by server 104. For example, if client 108 is requesting a full synchronization, server 104 will identify any changed objects from providers 128 and send them to client 108. Client 108 can also request that a subset of providers 128 be updated Server 104 will identify any changed objects within the subset of providers 128 and send them to client 108.

In step 204, Web synchronization module 124 communicates with providers 128 to obtain the top-level resources. Other resources, such as images, links, JavaScript™, etc., needed to maintain the integrity of the information provided for each object are then determined in step 206. In step 207, objects are transformed so that they fit within the parameters of device 106. Such parameters may include, but are not limited to, memory size, the size of device 106, capabilities of device 106, etc. When all resources have been amassed to fulfill client 108's request, the process proceeds to step 208.

In step 208, the objects retrieved in the preceding steps are compared with the objects already cached on device 106. Server 104 determines the set of changes that have occurred between the retrieved objects and the objects already cached on device 106 in step 210. Only the set of changes determined in step 210 are transmitted to device 106. To improve the efficiency of the synchronization session between client 108 and server 104, as well as optimize the content displayed by client 108, a communication protocol collects requests and responses for network objects into a smaller number of protocol (such as HTTP) requests and responses. In an embodiment of the present invention, specific values are transformed in a conversion process to a tokenized encoding that is optimized for the device, client, and/or application. In one example, the encoding can be a mapping of parent and child HTML elements and/or resources to alphanumeric values designed to present content on the client's display.

FIG. 1W illustrates a block diagram of one embodiment of the optimized downstream protocol. FIG. 1W illustrates raw objects from provider 128, server 104, and device 106. Server 104 transforms the raw objects into an efficient representation for displaying the objects on device 106. For example, HTML objects are transformed into a tokenized compressed version of HTML. In another example, resources such as images, JavaScript™, etc. are transformed into tokenized compressed versions of resources. Generally, "human friendly" HTML is transformed into "machine friendly" format that is compact and regular (thereby reducing the requirements on the client 108 to process the objects). During the synchronization session, server 104 also determines the nature and the resources of device 106. Thus, server 104 can determine the amount of content to download to device 106 as well as the features of device 106. For example, device 106 may or may not be able to display color graphics and text. Therefore, a gif image would be scaled to fit the screen size of client 108 as well as reducing the color to a black and white image.

Returning again to FIG. 1C, the revised channels are cached on device 106 so that the content can be later accessed (step 160E) by the user in an off-line manner.

In order to access the cached content, the user launches client 108 on device 106 (step 160F). The user selects channels via user interface 144 (step 160G). User interface 144 provides logic for displaying the means to access the resources of client 108. In one embodiment, user interface 144 displays a list of channels from which a user may select specific channels.

Once a channel is selected, layout and rendering module 134 displays the selected channel (step 160H). In one embodiment, the content of the selected channel is presented. In another embodiment, a form is presented for a user to enter a query. Thus, the invention allows the user to interact with the channels (step 160I) even when not connected to server 104 or provider(s) 128. In one embodiment, a user is essentially viewing Internet content off-line via cached Web pages.

3.1.3. Forms to Enable Off-line Interactive Processing By Clients

As described herein, in one embodiment channel content may contain a form or forms. For a single form, the form may be a multiple submit form or a single submit form. A multiple submit form contains multiple submissions for a single page. A single submit form contains one submission for a single page. Multiple submit forms will allow a user to submit the form multiple times prior to synchronization. Alternatively, the single submit form can only be submitted once per synchronization. Referring to FIG. 1D, flowchart 160I illustrates a user's interaction with a channel having a single form (FIG. 1D is an example embodiment of step 160I in FIG. 1C). Starting with step 162A, a page is displayed by user interface 144 that contains form elements. Form elements may contain fields for the entry of data/commands such as query criteria. For example, query criteria may include identification information, location information, etc. Additionally, form elements may present a user with a list of choices and means by which a choice can be selected, such as radio boxes, check boxes, popup menus, etc. A user enters data/commands into the form elements via user interface 144 (step 162B).

Forms module 136 caches the data/commands for later synchronization (step 162C). During the synchronization process, which is discussed below in detail, control module 142 provides an appropriate notification (step 162D). In one embodiment, the appropriate notification is a message displayed by control module 142 that the response to the form will be obtained during the next synchronization.

Forms module 136 maintains the status of the forms cached and manages the completion of the forms (step 162E). In one embodiment, a user can access forms module 136 directly and review the cached forms before and after synchronization.

Multiple page forms may also be implemented. Multiple page forms may result from a single form that is too large to display on client 108. In this instance, server 104 transforms the single page form into multiple page forms for display on client 108. Referring to FIG. 1E, flowchart 160I' illustrates user interaction with a multiple page form (FIG. 1E is an embodiment of step 160I in FIG. 1C). Starting with step 164A, the user accesses a channel containing a multiple page form. User interface 144 displays the first page of the form (step 164B). In much the same way as in step 162B of FIG. 1D, the user enters data/commands into the form elements on the page of the displayed form (step 164C).

Client extension interface 138 stores the data/commands from the displayed form page (step 164D). User interface 144 displays the next page of the form (step 164E). Steps 164C, 164D, and 164E are repeated until all the pages of the form are completed. In one embodiment, client extension interface 138 delivers the completed multiple page form as a single form to forms module 136 (step 164F). In another embodiment, client extension interface 138 delivers each completed page of the form to the forms module 136 (not shown). During the synchronization process, which is discussed below in detail, control module 142 provides an appropriate notification (step 164G). In one embodiment, the appropriate notification is a message displayed by control module 142 that the response to the form will be obtained during the next synchronization. Similarly to step 162E of FIG. 1D, forms module 136 maintains and manages the forms (step 164H).

3.1.4. Tracking Client Behavior

As described herein, the invention enables client 108 to record user/client behavior. Examples may include, but are not limited to, tracking page impressions, such as tracking the number of times that a particular user has viewed a particular page or listened to a particular song, the amount of time a user spends viewing a page, or any other client activity. Other information that can be tracked includes, but is not limited to, user name, current time of request, page that is being viewed, the referred page, etc.

FIG. 1F1 is a flow diagram describing a method for tracking page impressions offline, and for tracking other client 108 activity. In step 166A, the user selects a page to view. It is then determined whether provider 128 of the page/object has requested that client activity be tracked and recorded (step 166B). If provider 128 has not requested that client activity be recorded, the page is displayed and the client is not tracked (step 166C). If provider 128 has requested that client activity be tracked and recorded, the process proceeds to step 166D.

In step 166D, client extension interface 138 tracks client activity (as defined by the provider 128). The process proceeds to step 166E.

In step 166E, the tracked information is transmitted to server 104 upon synchronization. In step 166F, server 104 then sends the information to the appropriate provider 128. The provider 128 may pay some compensation for this service.

3.1.5. Display of Context Sensitive Objects

The invention enables the processing of context sensitive objects based on context sensitive triggers while the client 108 is browsing pages/objects in either an off-line mode (i.e., when not connected to server 104) or an on-line mode (i.e., when connected to server 104). Table 4 displays a listing of exemplary context sensitive objects. Table 5 displays a listing of exemplary context sensitive triggers. One skilled in the relevant art(s) would realize that other context sensitive objects and context sensitive triggers may be used without departing from the scope of the present invention. This process is shown in FIG. 1F2.

TABLE 4

| Context Sensitive Objects |
| --- |
| Business card |
| Advertisement |
| e-mail |
| to do list |
| calendar event |
| ticket notification |
| channels |

TABLE 5

| Context Sensitive Triggers |
| --- |
| Global positioning satellite locator |
| Zip code |
| Time of day |
| User preferences |
| Last sync location |
| In range of a transmitter (e.g., bluetooth) |
| Credit card |
| Temperature |
| Altitude |
| Agent, arbiter, avatar |

In step 167A, the user selects a page to view on the client 108. The page is obtained from the cache of the client 108, or if not in the cache then from the server 104 (in on-line mode, or via the sync process when not on-line).

In step 167B, the client 108 determines if there are any context sensitive objects. Such objects may be related to the page of step 167A, or status information of client 108, or a combination thereof (or sensitive to other factors, as will be appreciated to persons skilled in the relevant art(s)).

If there are not context sensitive objects, then in step 167D the page is displayed on client 108.

If there are context sensitive objects, then in step 167C the objects are processed and the page is displayed on client 108. Processing of the objects depends on the nature of the objects. For example, if the object is an image, then the image is displayed. If the object is a script, then the script is processed.

In an embodiment, the objects may be advertisements, although the invention is not limited to this example. The sources of objects may pay the server 104 (or a party associated with server 104) for the ability to have such objects loaded and processed on clients 108.

3.2. Syncing to Mobile Devices

Referring to FIG. 1G, flowchart 168 illustrates a synchronization initialization process according to an embodiment of the present invention. This process is also explained by a corresponding example event trace diagram in FIGS. 63A and 63B.

Client 108 initializes a synchronization session and sends a null data marker [Cn] to server 104 (step 168A). See 6304 in FIG. 63A. In one embodiment, a data marker is a synchronization token associated with the state of data on the client 108. More specifically, in one example, a synchronization token is a number that is sequentially increased by server 104 with each synchronization. Server 104 tells client 108 which client databases it wishes to track and sends data marker [C1] to client 108 (step 168B). See 6306 in FIG. 63A. At this point, the synchronization data marker for the client 108 is equal to C1 at both the client 108 and the server 104, as indicated by 6308 and 6310, respectively.

FIGS. 1H1 and 1H2 collectively illustrate a synchronization process that occurs subsequent to the initialization process of FIG. 1G.

As shown in flowcharts 170 in FIG. 1H1, and 170' in FIG. 1H2, the synchronization process checks to see if it can proceed from an earlier known state of information on the client. In one embodiment, client communication module 110 of client 108 initializes a synchronization session (step 170A). Client control module 110 of client 108 sends a current data marker C1 to web synchronization module 124 on server 104 (step 170B). This is indicated by 6320 in FIG. 63B.

Figure 63A:
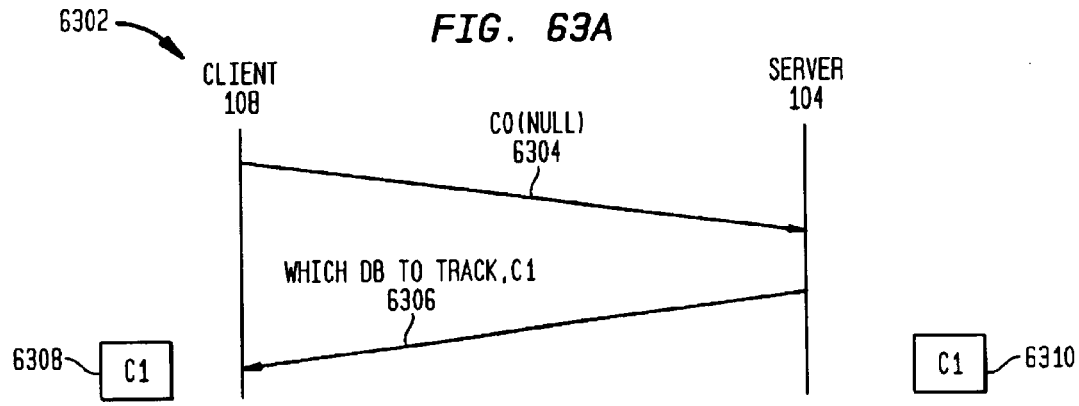
FIGS. 63A and 63B are event trace diagrams used to describe a synchronization process according to an embodiment of the invention.

Server 104 uses the data marker C1 received from client 108 (6320 in FIG. 63B) to determine whether the last synchronization with client 108 was successful (step 170C). In an embodiment, a successful synchronization is indicated if the value of the synchronization data marker that is maintained by the server 104 for the client 108 is equal to the data marker sent by the client 108 to the server 104 in the sync request. In the example of FIG. 63A, the data marker sent by the client 108 to the server 104 in the sync request is C1 (6320 in FIG. 63B), which matches the data marker maintained in the server 104 for the client 108 (6310 in FIG. 63B). Accordingly, in the example of FIG. 63B, the server 104 in step 170D determines that the last sync with the client 108 was successful. Accordingly, in step 170E, a normal sync process is performed, which is described below.

Figure 63B:
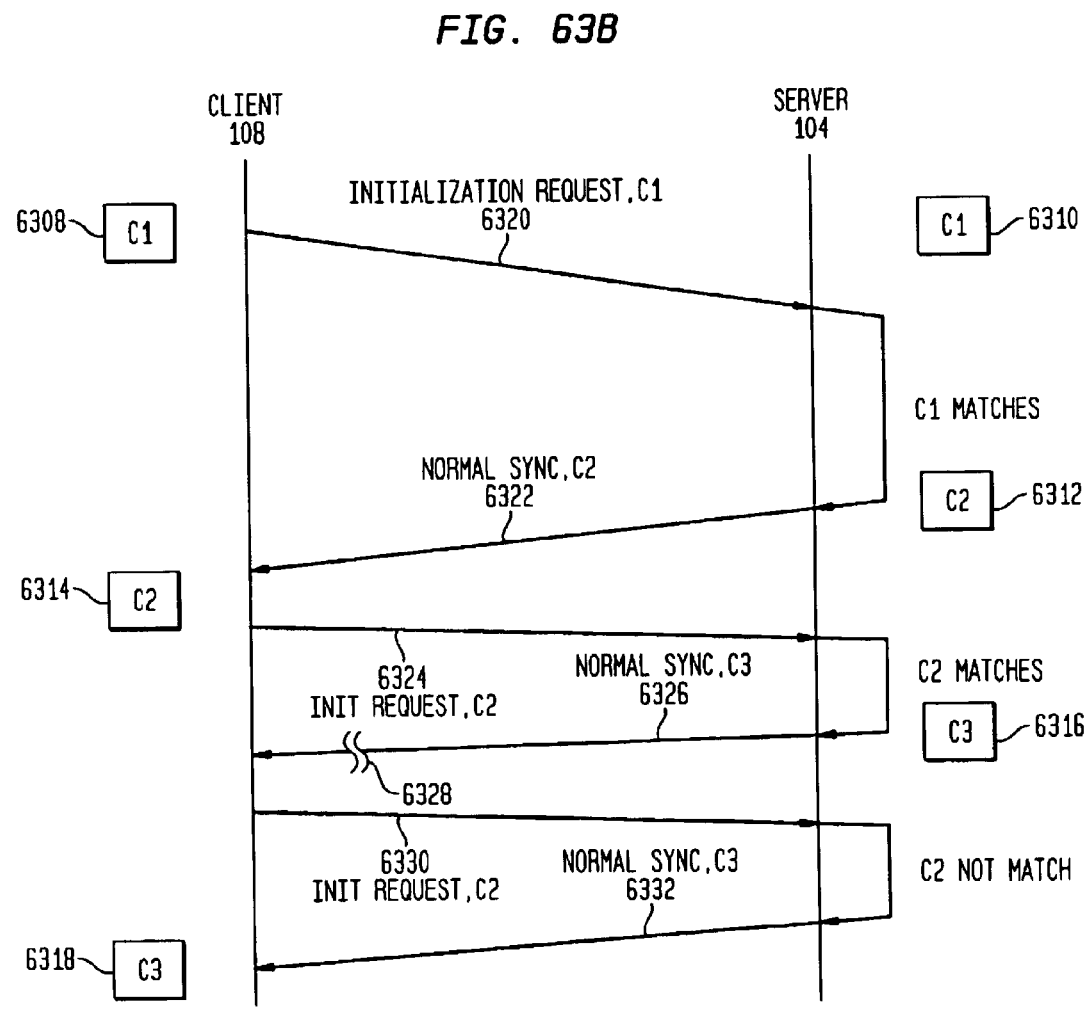

If the last sync was not successful as determined in step 170D, then control flows to step 170F (described below). FIG. 63B shows an example where the sync with client 108 is not successful. At 6324, the client 108 sends a sync request with data marker C2. At this point in time, the data marker maintained by the server 104 for the client 108 is equal to C2 (6312 in FIG. 63B). Accordingly, a match exists, and in 6326 the server 104 performs a normal sync and transmits new data marker C3 to client 108. However, due to some event 6328, this transmission is not received by client 108. Thus, client 108 never receives the new data marker C3. When the client 108 sends the next sync request, it transmits data marker C2 (6330 in FIG. 63B). At this point in time, the data marker maintained by the server 104 for the client 108 is equal to C3 (6316 in FIG. 63B), which does not match data marker C2 received from the client 108 in the sync request (6330 in FIG. 63B). Thus, the server 104 in step 170D determines that the last sync with client 108 was not successful. Accordingly, step 170F is performed.

In step 170F, the server 104 compares the latest data marker received from the client 108 (C2 in the example of 63B) with ones stored in the server 104 for the client 108. Essentially, the server 104 attempts in step 170F to "roll back" to a previous known state of client 108. In the example of FIG. 63B, the server 104 in step 170F determines that it can roll back to a known state of the client 108 corresponding to data marker C2 (6312 in FIG. 63B).

In steps 170G, 170H, and 170I, the server 104 determines what instructions are needed to cause the client 108 to roll back to the known state associated with data marker C2 identified in step 170F, and what instructions are needed to cause the client 108 to move forward from the previous state associated with data marker C2 to the current state associated with data marker C3.

In steps 170J, the instructions determined from steps 170G, 170H, and 170I are sent to client 108, along with the new data marker C3 (6332 in FIG. 63B). In one embodiment, a data marker is a synchronization token which is specifically constructed to provide information about the state of information on a client.

In steps 170K and 170L, the client interface module 112 executes these instructions to update the client 108, and saves the new data marker C3 (6318 in FIG. 63B).

Referring back to step 170F, if the server 104 cannot find a previous state of the client 108 corresponding to the data marker contained in the latest sync request from the client 108 (6330 in FIG. 63B), then step 170M is performed. In step 170M, the server 104 identifies the instructions needed to initialize the client 108. In one embodiment, the server 104 initializes the client 108 completely. Control then passes to step 170J, described above.

The full normal synchronization step discussed at step 170E in FIG. 1H1 is shown in FIG. 1H1. This process applies to a case where the client 108 communicates directly with the server 104.

Control module 142 identifies the deltas in the client databases identified by server 104 during initialization in step 168B (step 172A). In one embodiment of the present invention, a delta is a set of differences between versions of content or, more generally, objects (i.e., different versions of the same pages, documents, links, images, applications, services, etc.). In other words, deltas are sets of differences in the state of the objects currently being offered and the state of the objects in client 108.

Control module 142 sends the deltas to synchronization module(s) 155 via server extension module 156 (step 172B). In an embodiment, these deltas are sent in the synchronization request from client 108 to server 104. This is possible since the client 108 knows which databases the server is interested in. This enables the client 108 to only make one transmission to server 104 during the synchronization process, thereby improving performance.

In one embodiment, synchronization module(s) 155 include web synchronization module 124, fleet management module 154, and/or other synchronization modules. These modules are responsible for synchronizing to different types of providers 128. Server extension module 156 checks database module 126 to obtain a list of synchronization modules 155 resident on server 104. Depending on the implementation, only some synchronization modules are present on server 104. The server extension module 156 distributes the synchronization responsibilities among the synchronization modules 155. Synchronization modules 155 synchronize the deltas from client 108 with providers 128 (step 172C). Based on the information from provider(s) 128, synchronization modules 155 compile instructions to synchronize the client 108 with providers 128 (step 172D). Synchronization module 155 sends such instructions to client 108, plus updated data marker (step 172E).

Note this is the only transmission from the server 104 to the client 108 during the synchronization process. Thus, the invention achieves a one-up/one-down synchronization process, thereby improving performance. The instructions are transmitted via any reliable transport medium. For example, in one embodiment, HTTP is used. Control module 142 on the client 108 then executes the instructions (step 172F).

FIG. 1I2 illustrates a synchronization process of step 170E (FIG. 1H1) applied to a case where client 108B communicates with server 104 via adapter 118.

Adapter 118 reads data from the client 108 (step 172M). Specifically, adapter interface module 116 reads data from client 108 that includes state information about the resources of the device 106, user specific information, etc.

Adapter 118 identifies deltas in client databases identified by server 104 in step 168B (step 172N). Adapter 118 sends these deltas to synchronization module(s) 155 via server extension module 156 (step 172O). Such deltas are transmitted in the initial synchronization request, thus effecting a "one-up" protocol.

As discussed above, synchronization module(s) 155 on server 104 synchronize deltas from adapter 118 with providers 128 (step 172P). Synchronization module(s) 155 compile instructions to synchronize client 108 with providers 128 (step 172Q). These instructions are transmitted to the adapter 118, along with the updated data marker (step 172R). This is the only transmission from the server 104 to the adapter 118 during the synchronization process, thus effecting a "one-down" protocol. Adapter 118 then writes the updated data to client 108 (step 172T).

FIG. 1X is another view of the synchronization process. As discussed herein, the device 106 or client 108 provides information about itself and the content it wishes to receive in a single "up" transmission, and the server 104, upon identifying the device 106 or client 108, returns the desired information along with new synchronization changes in a single "down" transmission. Synchronization tokens are passed between client 108 and server 104 so that future transmissions only need to include the information which has changed since the last synchronization session. In other embodiments, a one up and many down synchronization process can be implemented to accommodate the implementation requirements of synchronization modules 155. In still further embodiments, the synchronization session can be implemented on the server 104 by server extension module 156. In such an embodiment, the implementation requirements of synchronization modules 155 would be irrelevant to the "down" transmission, because the server extension module 156 would cache all the information and instructions on behalf of the client and transmit them in all at once.

FIG. 1Y illustrates another view of the synchronization process.

Other synchronization embodiments shall be discussed. It is noted that the synchronization embodiments can be used individually or in combination, as will be appreciated by persons skilled in the relevant art(s).

FIG. 1Z illustrates a granular variable synchronization protocol, according to an embodiment of the present invention. Here, adapter 118 is referred to generically as "PC" and performs the same interface functions as described herein.

FIG. 3A shows flowchart 300 that illustrates the variable granular protocol according to yet another embodiment of the present invention. In step 304, client 108 couples to adapter 118 using a connector or medium (for example, Bluetooth, infrared, etc.).

In step 306, client 108 sends updated information to adapter 118.

In step 308, server 104 receives updated information from adapter 118 (one-up transmission).

In step 310, server 104 examines the updated information and in step 312, server 104 obtains updated information from provider(s) 128.

In step 314, server 104 receives information regarding the sets of content available from provider(s) 128.

In step 316, server 104 constructs a set of content requests for provider(s) 128.

In step 318, server 104 sends requests to provider(s) 128.

In step 320, server 104 receives responses from provider(s) 128.

In step 322, server 104 interacts with client 108 to determine the state of its resources.

As already described herein, client 108 provides state information regarding the nature of its resources. In one embodiment, server 104 assesses the state information pre-emptively prepared and sent down in order to fit all the required information to the all the necessary device specifications including but not limited to: Dynamic memory specifications, high memory specifications, available storage space, screen size, user profile(s), color depth, applications on device, buttons on-device, data markers, preferences, fonts, sync type, supported data types, supported mime types, and connection/network profile. These types of state information are only for illustration and are not intended to limit the present invention.

In step 324, server 104 optimizes the content received from provider(s) 128. In one embodiment, HTML content is optimized into a tokenized "machine friendly" format which provide specific functionality for client 108. Other embodiments include optimized formats for XML, JavaScript™, music files, images, etc. For example, as shown in FIG. 1AA, an image is optimized to meet the requirements of client 108 as determined by the state information determined in step 322. As described already herein, image 1A1 is optimized into image 1A2, which may be in color, reduced to fewer colors, etc.

In step 326, server 104 encodes the content received from provider(s) 128 for transmission to adapter 118 and/or client 108. Some of the content may be optimized for display, storage, and/or other functionality on client 108. Some other content may not require any optimization. All content is then encoded for transmission. In one embodiment, the encoding protocol is HTTP. In another embodiment, the transmission protocol is TCP/IP. Various transmissions protocols can be implemented in the present invention with little or no added steps or loss of functionality.

In step 328, adapter 118 signals that it is ready to process content and other network objects from server 104. Client 108 may or may not signal its readiness. In embodiments described herein, client 108 does not communicate with server 104 other than to provide the "up" transmission with all the information required for server 104 to respond completely.

In step 330, server 104 constructs a transmission protocol message for the content and other network objects to be transmitted to adapter 118 or client 108. As discussed with regard to step 326, the transmission protocol selected may determine the characteristics of the message, but not the content of the message.

In step 332, server 104 sends protocol message to providers(s) 128. In one embodiment, the messages sent are queries for forms which were selected and activated by a user of client 108.

In step 334, server 104 receives responses from provider(s) 128 with interactive content. As discussed with regard to step 332, in one embodiment the interactive content can be the responses to form queries.

In step 336, server 104 presents the responses from provider(s) 128 to client 108 and/or adapter 118.

In step 338, server 104 sends modified content to client 108 and/or adapter 118.

In step 340, server 104 sends updated content to client 108 and/or adapter 118.

The variable granularity protocol discussed in FIGS. 1Z, 3A and in the methods of FIGS. 1G–1I2 do not use file serving or other conventional methods for synchronizing a device to a server or desktop. Instead, the synchronization methods of the present invention can synchronize by using any reliable transport protocol because the delivery of the byte code is transportable in the widest array of delivery protocols. HTTP is one embodiment described herein which is widely implemented and accepted in current computer network topologies. The protocol of the present invention enables operation between client 108 and server 104 and pre-configures the client to preemptively send sets of data to the server 104. This synchronization process of the present invention dynamically checks the need to update or not update content. In one embodiment, it checks the integrity of all data on any page sent via the protocol for the level of granularity. Granularity is determined by a set of deltas. For example, the protocol could acknowledge and read tags associated with HTML and/or XML and sort the objects modeled by theses languages to a client or to a database during a synchronization. In addition this synchronization enables clients with disparate data markers (synchronization tokens) to synchronize by resetting data marker data and maintaining authentication integrity. The features of the present invention described herein are now discussed in more detail with respect to certain embodiments.

As an extension of the variable granular protocol and the use of deltas to determine what should be transmitted up or down, server 104 can deliver XML objects to client 108. The server 104 creates data structures for applications on a client 108 and can receive data structures from the client 108 for conversion to XML for use with a database.

FIG. 3B shows block diagram 350 of one embodiment of the present invention where XML is served to a device 106. Device 106 synchronizes with server 104 and has its data structure with XML output 354 from database 352. XML table 358 illustrates the format for the results and the structure of inputted queries 356. Layout and rendering module 134 displays the XML output on device 106. This XML output is obtained from server 104 through a XML style and rendering specification 360. Device 106 is able to store and display XML structured information. FIG. 3C shows block diagram 375 of one embodiment of the present invention of off-by-any-number synchronization recovery. See also FIGS. 63A and 63B. FIGS. 1H1 and 1H2 above discuss the steps of this embodiment in detail. FIG. 3C provides additional illustration to aid the explanation and is not intended to limit the present invention.

3.3. Administering Channels, Content, and Data for Mobile Devices

Example administrative related functions are described below. It is noted that these functions are described for illustrative purposes only, and are not limiting.

3.3.1. Cached Device Information on Server

Conventionally, state information on a user or device 106 is stored on the device 106 (such as HTML data markers). Accordingly, functionality to process and maintain such state information resides on a device 106. Locating such functionality on the device 106 may not be optimal in some situations where the resources of the device 106 are limited, such as when the device 106 is a handheld computer.

Accordingly, according to embodiments of the invention, state information (and associated functionality) associated with clients 108 is maintained or cached on the server 104.

FIG. 1J is a flowchart representative of the manner in which state information is cached on server 104.

In step 174A, the client 108 accesses a provider 128 via the server 104.

In step 174B, the provider 128 returns some state information to the server 104. This may be a data marker, for example, or any other type of information on the device/client/user/transaction/etc.

In step 174C, the server 104 maintains such state information on behalf of the client 108. This is performed by the web synchronization module 124 and the database module 126.

In step 174D, the client 108A requests the server 104 to access the same provider 128 as in step 174A.

In step 174E, the server 104 (specifically, the web synchronization module 124) accesses the provider 128 using the state information that is maintained on behalf of the client 108.

3.3.2. Server Side Optimization of Content

When the server 104 obtains an object from a provider 128, the server 104 in some instances passes that object to a client 108. In other cases, however, it may be more efficient for the server 104 to transform the object to a form that is more suitable for use by the client 108. In an embodiment, this transformation is performed by the web synchronization module 124.

This process is represented, for example, in FIG. 1K. Steps 176A–176C illustrate the initial configuration actions in one embodiment of the present invention. Steps 176D and 176E illustrate an embodiment of any subsequent actions where the client's state information is already stored on the server 104.

In step 176A, client 108 sends state information to server 104 via client communications module 110. State information may contain, among other things, user identity, secure login information, current resources, etc.

In step 176B, server communications module 114 receives client's state information.

In step 176C, server communications module 114 forwards the received state information to database module 126 and web synchronization module 124.

In the case where the client's state information is already stored by database module 126, steps 176D and 176E replace steps 176A–176C.

In step 176D, client 108 identifies itself to server 104.

In step 176E, server 104 obtains state information about client 108 from database module 126.

In step 176F, the web synchronization module 124 obtains an object from a provider 128. In one embodiment, the object is content which conforms to that which is requested by client's 108 state information, although the object can be any entity, such as an application, service, etc.

In step 176G, the web synchronization module 124 translates/transforms/optimizes the object for use by a particular client. The state information of the device 106 and/or client 108 is considered in this optimization process. The following list of state information is only some of the factors that the web synchronization module 124 considers when performing this optimization (and when determining what, if any, transformations/conversions/optimizations to perform):

Dynamic memory specifications
High memory specifications
Protected memory
Storage memory
Database memory
Available storage space
Screen size
User profile(s)
Color depth
Applications on device
Buttons on-device
Data markers (e.g., cookies, tokens)
Preferences
Fonts
Font specifications
Sync type
Synchronization types
Supported data types
Supported mime types
Connection/Network profile Other factors will be apparent to persons skilled in the relevant art(s) bases on the teachings contained herein.

Figure 4A:
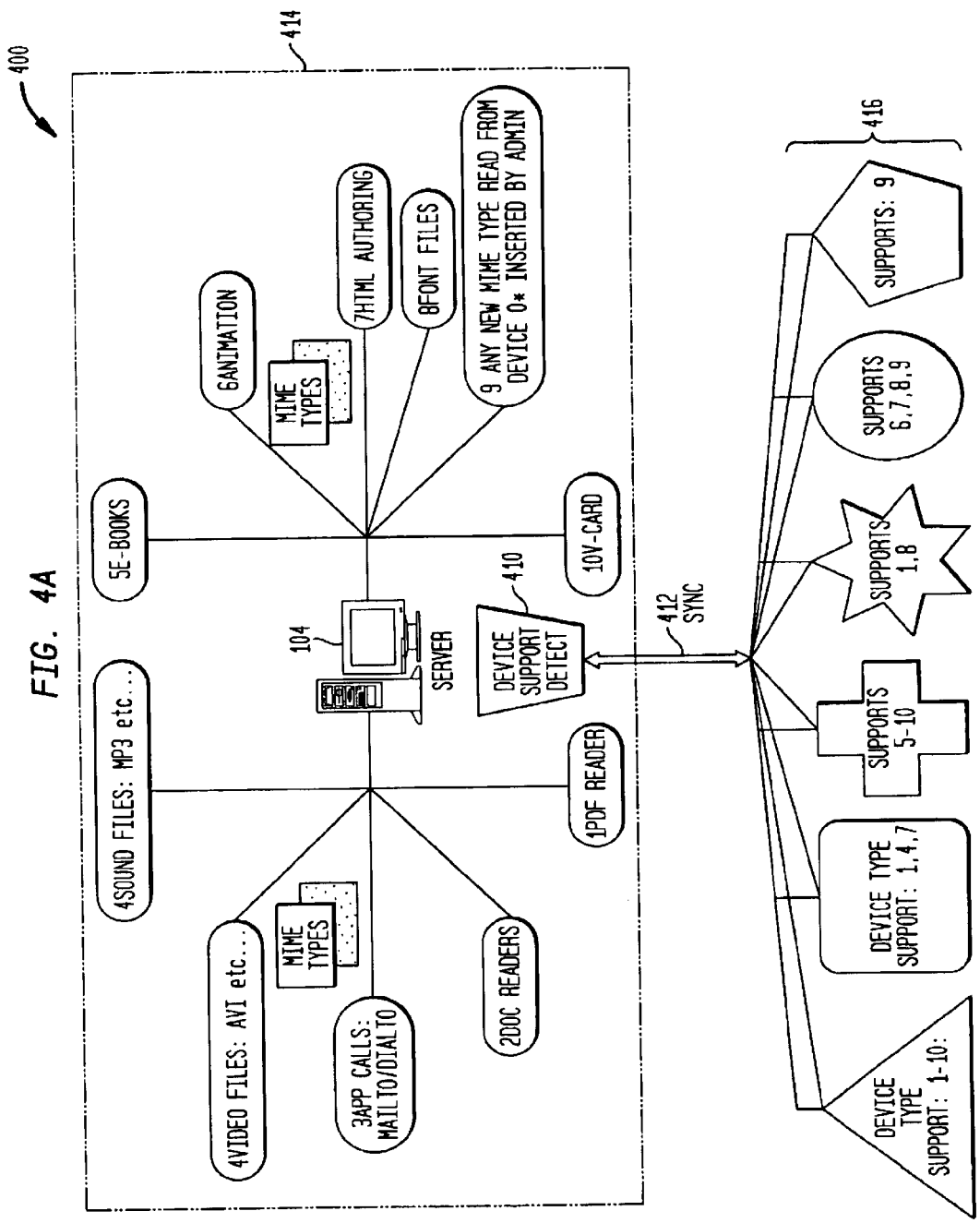

FIG. 4A shows block diagram 400 which illustrates the detection 410 of device/client state information by server 104 (or components thereof). In diagram 400, the synchronization process 412 includes only kinds of content 414 supported by various devices/clients 416.

3.3.3. Hashed Device State

In embodiments, during synchronization operations, prior to sending an object to a client 108, the server 104 checks to see if the object differs from the instance of the object already resident on the client 108. If the object is the same as that already resident on the client 108, then the server 104 does not send the object to the client 108. This process is illustrated in FIG. 1L.

In step 178A, the client 108 requests an object (directly or indirectly).

In step 178B, the web synchronization module 124 obtains the requested object from a provider 128.

In step 178C, the web synchronization module 124 performs a hash operation on the object and compares the hash result to a previously stored hash result for the object.

In step 178D, the web synchronization module 124 determines if the hash result generated in step 178C is the same as the previously generated and stored hash result of the object.

In step 178E, if they are the same, then the client 108 is informed that the object has not changed.

In step 178F, if they are not the same, then object is transformed as in step 176B of FIG. 1K. Also, the new hash value generated in step 178C is stored by the server 104.

In step 178G, the web synchronization module 124 performs a hash operation on the transformed object.

In step 178H, the web synchronization module 124 compares the hash result of the transformed object to a previously stored hash result of the transformed object.

In step 178I, the web synchronization module 124 determines if the hash result generated in step 178G is the same as the previously generated and stored hash result of the transformed object.

In step 178E, if they are the same, then the client 108 is informed that the object has not changed.

In step 178J, if they are not the same, then the transformed object is sent to the client 108. Also, the new hash value generated in step 178G is stored by the server 104.

Thus, according to embodiments of the invention, the server 104 determines whether current versions of objects already reside on clients 108 by using hash results, as opposed to the objects themselves. This reduces the amount of memory needed on the server 104 (since only the hash results need to be stored, not the objects themselves).

Also, according to embodiments, there are two checks to see if the current versions of objects already reside on clients 108. The first check is made to the raw object, and the second check is made to the transformed versions of the objects.

Figure 4B:
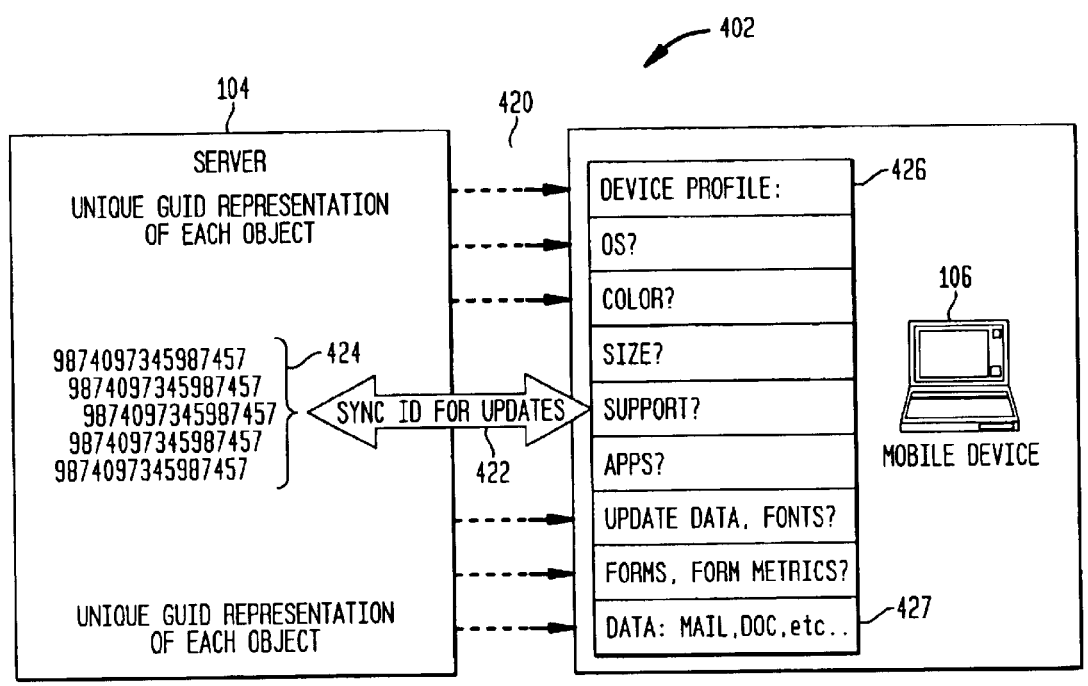
FIG. 4B is used to indicate how the invention processes hash results according to an embodiment.

FIG. 4B shows block diagram 402 illustrating the hashed device state process described herein. In diagram 402, Server 104 synchronizes with device 106 identifiers for updated device information 422. The synchronization 422 includes state information 426 and data 427 that is stored by server 104 using global unique identifiers (GUIDs) 424 for each object. GUIDs provide the hash object for the hash operations/comparisons described herein. A hash value is the result of a hash operation. In an embodiment, a hash value is a numerical fingerprint of any amount of data. In one embodiment, hash values are calculated for each HTML document. This hash value is smaller and more efficient to store on server 104. Additionally, server 104 can compare two or more hash values more readily and faster than comparing the complete documents than the hash values. It is noted that in embodiments, data 427 have hash operations performed on them more frequently than state information 426. For example, the screen size of a device will likely remain constant while the data on the device changes repeatedly.

3.3.4. Syncing Music, Movies, Books, Photo Albums, and Other Collections of Objects The invention supports channels which comprise web sites having collections of objects, such as collections of music, images, books, movies, applications, services, etc. By selecting such a channel, the client 108 can be populated with such collections of objects.

For example, if a channel having a collection of music is selected, then it is possible to turn the client 108 into a "jukebox" once the music collection is stored on the client 108 during the synchronization process. Similarly, a client 108 can become a photo album, a book library, a movie theater, an application library, etc., by selecting appropriate channels. This process is represented by FIG. 1M. It is noted that this process is applied to collections of music, but it is also applicable to collections of any types of objects. It is also noted that a given channel may have combinations of different types of objects, such as combinations of music, movies, applications, images, services, etc.

In step 180A, a provider 128 is added to list of the channels supported by the server 104. The provider 128 offers a collection of objects.

In step 180B, a user of client 108 selects the channel 128.

In step 180C, during the next synchronization operation, the selected channel is synchronized with client 108.

3.3.5. Fleet Management

The invention supports organizing groups of clients 108 as "fleets." For example, all clients 108 associated with employees of a company, or of a department of a company, may be a fleet. As another example, client 108 in a family can be a fleet. Generally, any group of clients 108 can be a fleet.

The invention supports performing mass operations on or relating to clients 108 in a given fleet (or multiple fleets). This process is shown, for example, in FIG. 1N.

In step 182A, a desired mass operation is defined. For example, one may define a mass operation to be the collection and processing of state information relating to clients 108 in a fleet. Another operation could involve installing an application on all clients 108 in a fleet. In embodiments, a third party is permitted to define the mass operation by paying some amount to the server 104 (specifically, by providing some compensation or consideration to the entity associated with or responsible for the server 104).

In step 182B, the fleet or fleets are identified.

Steps 182D and 182C/182E illustrate processing relating to two types of mass operations.

In step 182C, cached information in server 104 relating to the clients 108 in the identified fleet(s) are collected and processed in a manner defined by the mass operation defined in step 182A. Optionally in step 182E, perhaps upon payment by a third party of some consideration to the entity associated with or responsible for server 104, such information is used in a manner desirable to the third party (such as providing marketing information to the third party).

In step 182D, during synchronization with the clients 108 in the fleet(s), the desired mass operation defined in step 182A is performed on the client 108 (such as upgrading software on the clients 108).

3.4. Customizing Channels, Content, and Data

3.4.1. Creating Custom Channels

Figure 10:
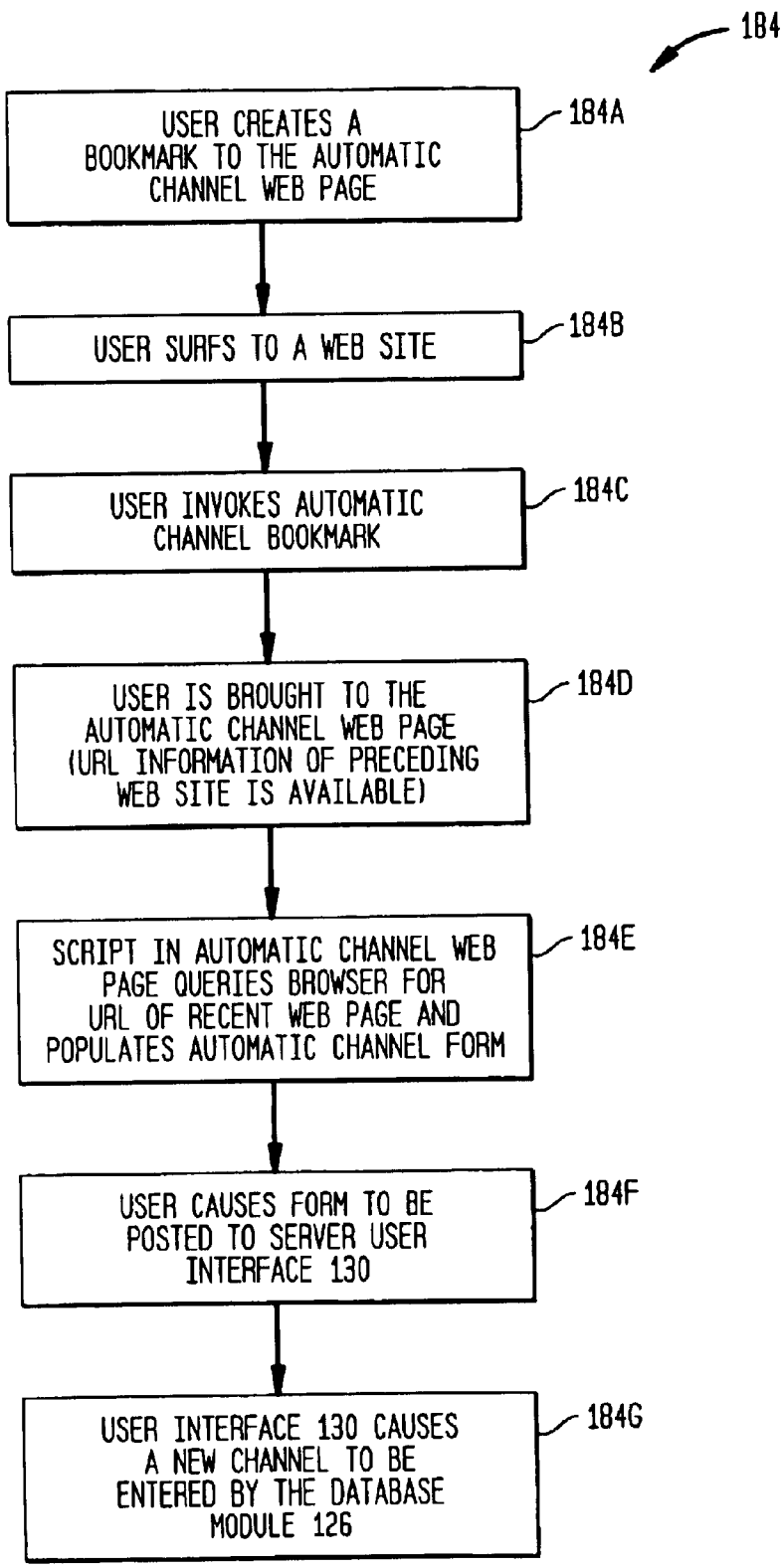

As described herein, the invention provides a user or an administrator with the ability to navigate or "surf" to a Web page or site and automatically add that Web page or site to the user's list of channels and/or to the channels provided by server 104, respectively. FIG. 10 is a flow diagram describing a process 184 for automatically adding a Web page or Web site to a user's list of channels from a Web browser. Although flow diagram 184 is described from a user's perspective, flow diagram 184 is equally applicable to an administrator for automatically adding channels provided by server 104. Process 184, as well as other applicable processes described herein, may be performed using a desktop Web browser, such as Internet Explorer, developed by Microsoft and Netscape Communicator, developed by Netscape, or other browsers. Process 184 begins with step 184A.

In step 184A, the user bookmarks an automatic channel link from the Web page of server 104. Bookmarking identifies the URL (Uniform Resource Locator) of the automatic channel Web page. For example, with Internet Explorer 4.0, the user creates a bookmark by right clicking on the automatic channel link and selecting "Add to Favorites." In another example, using Netscape Communicator 4.0, a bookmark is created by right clicking on the automatic channel link and selecting "Add Bookmark." Bookmarking is a well known technique to those skilled in the relevant art(s). The process proceeds to step 184B.

In step 184B, the user surfs to a Web site. The user determines that he/she wishes to create a channel. In step 184C, the user invokes the automatic channel bookmark. The process then proceeds to step 184D, where the user is brought back to the automatic channel Web page. The URL of the preceding Web site is now available to server 104. The process proceeds to step 184E.

In step 184E, in an embodiment, a script in the automatic channel Web page queries the browser for the URL of the previous Web site and automatically populates an automatic channel form for the Web site to be added to the user's list of channels. In another embodiment, a header is used to determine the URL of the previous Web site. The automatic channel form contains fields identifying the title and URL of the Web site, the maximum channel size, the link depth, whether images are to be included, whether to follow off-site links, when to refresh, etc. The process proceeds to step 184F.

In step 184F, the user reviews the channel settings that were automatically generated, and, if satisfied, selects the save channel button to save the channel settings. If the user is not satisfied, the user may modify the settings to the user's satisfaction and then select the save button to save the channel settings. The process proceeds to step 184G.

In step 184G, user interface 130 causes a new channel to be added to the user's list of channels. The new channel is entered in database module 126 of server 104. On the next sync of client 106, the new channel will be synced to the client.

The invention also allows a provider 128 to enable a user of device 106 to have the Web page of provider 128 loaded on the user's device 106. Provider 128 provides a link or quick channel button on its Web page that, if selected by the user, indicates that the user would want the Web page converted into a channel that is loaded on his/her mobile device. This process does not require that the user be a registered user of server 104. FIG. 1S describes a process 192 for allowing a provider 128 to enable a user of device 106 to have the Web page of provider 128 converted into a channel that is then loaded on device 106. As described herein, device 106 may be a mobile device. Process 192 begins with step 192A.

In step 192A, a user surfs to the Web page of a provider 128. Provider 128 has a quick channel button that, when selected by the user, links the user to a Web page of server 104. The process proceeds to step 192B.

In step 192B, the user selects the quick channel button indicating that the user would like the Web page converted into a channel that is loaded on his/her device 106. In step 192C, the user is automatically sent to the Web site of server 104 by selecting the quick channel button. The process proceeds to step 192D.

In step 192D, the server attempts to determine whether the user is a registered user of server 104. The process proceeds to step 192E.

In step 192E, server 104 determines if the user is a registered user of the Web site of server 104. If the user is detected to be a registered user with the Web site of server 104, the process proceeds to step 192F. If the user cannot be detected as a registered user of the Web site of server 104, the process proceeds to step 192G.

In step 192G, server 104 queries the user as to whether or not the user is registered with the server 104. If the user's response is yes, the process proceeds to step 192I. In step 192I, the user logs on to server 104. The process then proceeds to step 192F.

Returning to step 192G, if the user response is no, that he/she is not registered as a user of the Web site of server 104, the process proceeds to step 192H. In step 192H, the server allows the user to register by taking the user through the registration process. The process proceeds to step 192F.

In step 192F, server 104 adds a new channel (that is, the Web site of the content provider having the quick channel button) to the user's list of channels, returns the user to the Web site from which it was linked, and presets state information to enable the Web site to be displayed on the user's device 106 on the next syncing operation.

3.4.2. Tags

As described herein, the invention delivers Web content to clients 108. Server 104 optimizes the Web content display to enable the display to fit within the parameters of the client 108. Such parameters may include, but are not limited to, dynamic memory specifications, high memory specifications, protected memory, storage memory, database memory, available storage space, screen size, user profile(s), color depth, applications on the device, buttons on the device, data markers, preferences, fonts, font specifications, sync type, supported data types, supported mime types, and connection/network profile. FIG. 1AA illustrates an optimization of a Web site page for display on a handheld device. As shown in FIG. 1AA, Web page graphic display 1A1 is from a large screen desktop display and Web page graphic display 1A2 is an optimized version 1A2 of Web page graphic display 1A1 that has been optimized to fit on a handheld device, such as device 106.

The invention also identifies Web content that is designed for additional modifications. Server 104 identifies the additional modifications through the use of tags. Any and all bytes processed by server 104 are potentially examined for compression. Server 104 detects the tag and executes the necessary logic. FIG. 1P is a flow diagram describing an overview of a process 186 for handling predefined tags by server 104 and clients 108. The process begins with step 186A.

In step 186A, providers 128 create Web page content using predefined tags to optimize use on devices 106. The process proceeds to step 186B.

In step 186B, server 104 and clients 108 process objects within the Web page using tags contained therein.

FIG. 1Q is a flow diagram describing process 186B in greater detail when a client 106 accesses a Web page having predefined tags. The process begins with step 188A.

In step 188A, client 108 accesses a Web page cached in client 108 or provided to client 108 by server 104. The process proceeds to step 188B.

In step 188B, client 108 processes the Web page based on the presence or absence of tags. For example, META tags may be used. An example META tag is <META NAME= "Handheld-Friendly" content="True">. This META tag (if set to true) enables several HTML features that are normally turned off. For example, most TABLES, HSPACEs, and VSPACES are designed for much larger screens, and are therefore not usually processed by client 108. However, TABLE tags are displayed, and HSPACE and VSPACE attributes of IMG (image) tags are processed if the page is marked as "Handheld Friendly." Another exemplary tag is an <AGIGNORE> or </AGIGNORE> tag used in a wireless channel. The AGIGNORE tag is used to surround content within an HTML page that may be inappropriate or unattractive on Internet-based phones. Content surrounded by this tag is ignored by client 108. A tag also exists to control how JavaScript™ is handled. If the tag exists, JavaScript™ behavior is enabled. If the tag does not exist, JavaScript™ behavior is ignored.

A page tracking tag may be used that enables client 108 to report to server 104 the number of times a user has viewed a Web page (in embodiments, the client 108 may report other client activity). A page break tag, <PAGEBREAK TITLE= "your title"> is used in a wireless channel. Such a tag breaks up pages on request. When processing pages for devices other than WAP (Wireless Application Protocol) phones, server 104 ignores the page break tag.

FIG. 1R is a flow diagram describing process 186B in greater detail when a server 104 accesses a Web page having predefined tags. The process begins with step 190A.

In step 190A, server 104 accesses a Web page. The process proceeds to step 190B.

In step 190B, server 104 processes the Web page based on the presence or absence of tags, as previously described above. In one embodiment, tags exist for server 104 that indicate whether to follow a link, not to follow a link, or to follow a link a number of layers (N) down.

The invention is not limited to the tags described above. One skilled in the relevant art(s) would know that other types of tags may be used without departing from the scope of the present invention, based on the teachings contained herein.

3.4.3. Client Registration Process Embodiment

In one embodiment, the invention includes a client registration process that includes GUI elements for the capture and configuration of client details and preferences. The invention is not limited to all of the steps described herein. One skilled in the relevant art(s) would know that other steps may be used without departing from the scope of the present invention, based on the teachings contained herein.

Figure 5C:
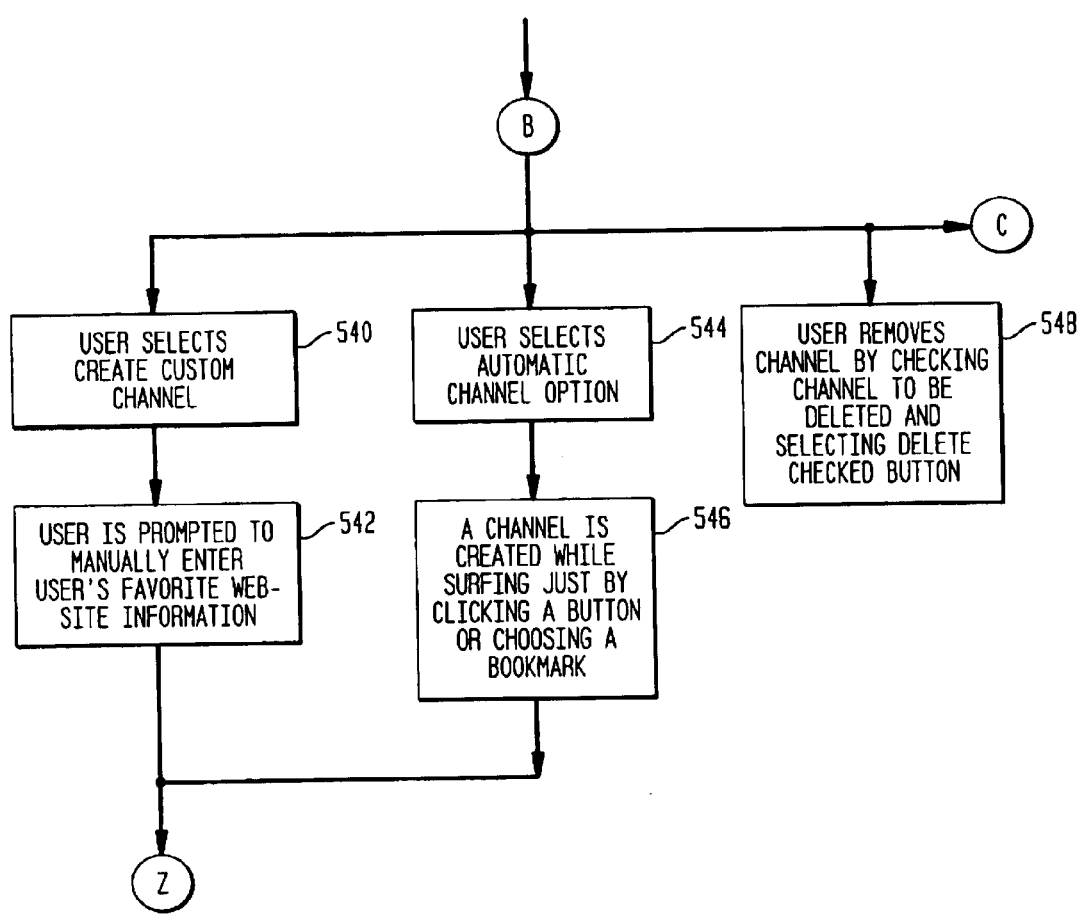
Figure 5E:
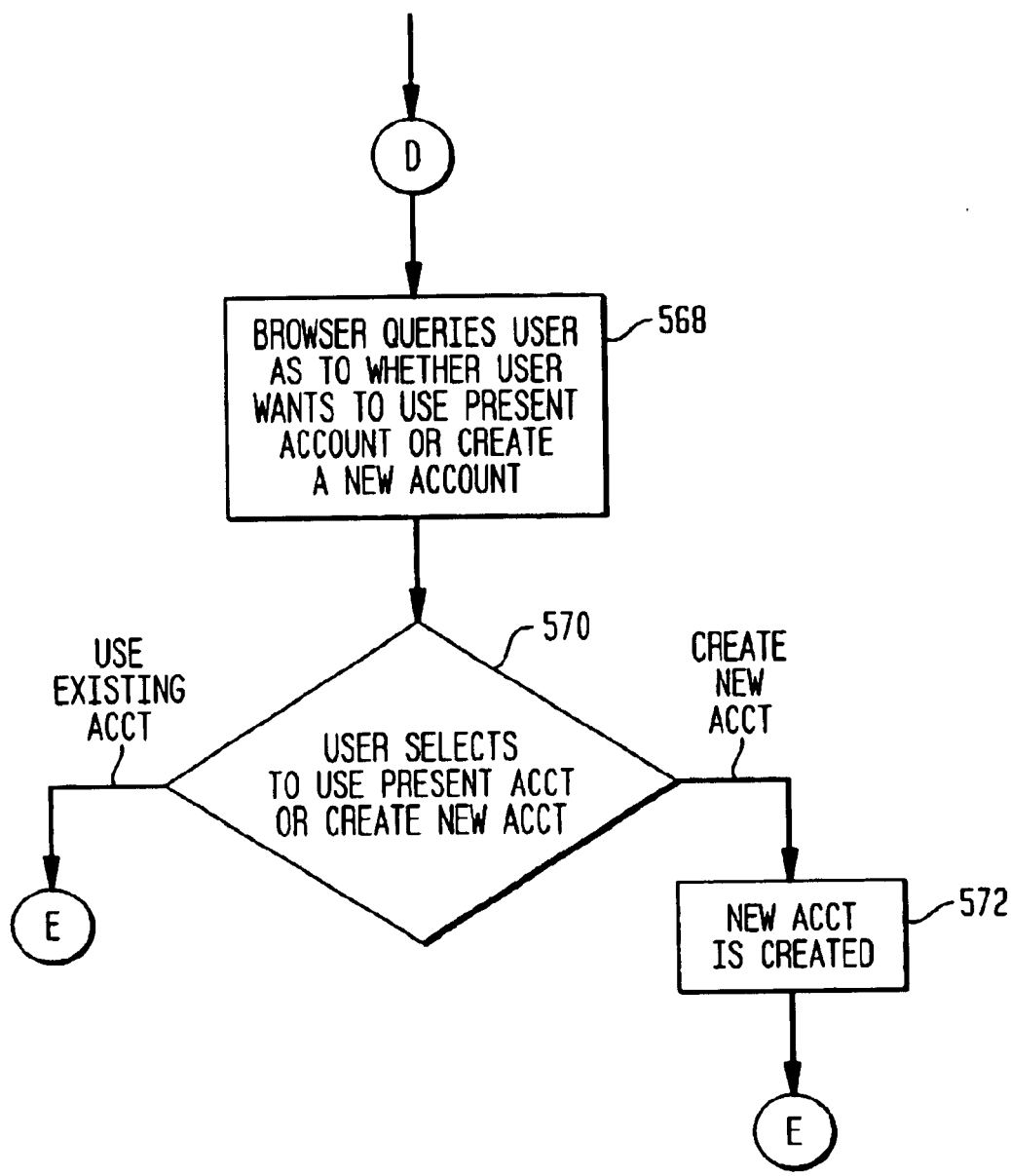

In one embodiment, the invention registers a user from the Web site of server 104. FIGS. 5A through 5J are flow diagrams describing the registration process. In FIG. 5A, the process begins with step 502. In step 502, a user arrives at the home page of server 104. The user may arrive at the home page from a link or a direct URL. If the user has previously registered, the user is identified via a data marker, and the user's identification is displayed on the screen.

In step 504, if the user is a current user, the process proceeds to step 508. If the user is not a current user, the process proceeds to step 506.

In step 506, a new user is registered. The registration process for a new user is described below with reference to FIGS. 5I–5J.

In step 508, the current user may select between an editing option for editing their account or an add channel(s) option for adding additional channels to their account. If the current user selects the add channel(s) option, the process proceeds to step 512.

In step 512, the user may add new channels using an "Add featured channels" option or the user may add new channels via an explore and add new channels option. If the user adds new channels via the "Add featured channels" option, the process proceeds to step 514.

In step 514, the user may select channels from a featured channels list. The added channel is displayed in a smart little unit (SLU) labeled "user account." An indicator will appear beside the added channel to indicate that the channel has not been synchronized with client 108 (step 516).

Returning to step 512, if the user adds new channels via the "explore and add new channels" option, the process proceeds to step 518. In step 518, the user selects a category from a directory of channel categories. A list of Web sites from the selected category is displayed in step 520. In step 522, the user may explore any Web site in the list and/or add any of the Web sites to their account. If the user adds a Web site to their account, the process proceeds to step 516.

Returning back to step 508, if the user selects the edit account option, the process proceeds to step 510. In step 510, the user is linked to a "user channel" page of the Web site of server 104. The process then proceeds to step 524 in FIG. 5B.

In step 524, the user is presented with a plurality of options. The user may add and remove channels, export channels, import older channels and data files for viewing, alter settings, upgrade the software, or view their sync history. If the user wishes to view their sync history, the process proceeds to step 526.

In step 526, the user selects the sync log option. The user's sync history is accessed and displayed in step 528.

Returning to step 524, if the user wishes to alter their account settings, the process proceeds to step 530. In step 530, the user selects the settings option. The user is then linked to an account settings page in step 532. In step 534, the user is queried to change their password and email address, as well as other user information.

Returning back to step 524, if the user wishes to export channels, the process proceeds to step 538. In step 538, the user selects the export channels option. URLs from the user's channels are automatically generated for adding the channels to another user account.

Returning back to step 524, if the user wishes to import older channels and data files, the process proceeds to step 585. In step 585, the user selects the import option. Old versions of channels and data files are then selected and displayed in step 587.

Returning back to step 524, if the user wishes to modify their existing channel(s), the process proceeds to step 581. In step 581, the user clicks on a channel to edit. Once the clicks on the channel, the channels parameter settings are displayed. In step 583, the user may edit the channel parameter settings. Channel parameter settings may include, but are not limited to, the channel name, root URL, an images option, link depth, an offsite links option, maximum size, and refresh period.

Returning back to step 524, if the user wishes to add a customized channel, the process proceeds to step 540 in FIG. 5C. In step 540, the user selects a "create custom channel" option. The user is then queried to manually enter information for adding a user favorite Web site to the SLU. The process then proceeds to step 516 in FIG. 5A, where the added channel is entered into the SLU.

Returning back to step 524 in FIG. 5B, if the user wishes to add a channel automatically, the process proceeds to step 544 in FIG. 5C. In step 544, the user selects the automatic channel option. A channel is then created while surfing the Web when the user clicks a button or chooses a bookmark, as described with reference to FIGS. 10 and 15. The process then proceeds to step 516 in FIG. 5A, where the added channel is entered into the SLU.

Returning back to step 524 in FIG. 5B, if the user wishes to remove a channel, the process proceeds to step 548 in FIG. 5C. In step 548, the user removes a channel by checking the channel to be deleted in the SLU and selecting the delete button.

Returning back to step 524 in FIG. 5B, if the user wishes to update the software, the process proceeds to step 550 in FIG. 5D. In step 550, the user selects the software setup option. The user is then linked to a software setup page in step 552. The process proceeds to step 554.

In step 554, the user may either download the software or configure a client communication module 110. If the user selects the configure client communication module 110, the process proceeds to step 562.

In step 562, the user is linked to a configure client communications page. In step 564, the user must click the select button to begin the configuration. Therefore, the client communication module 110 is configured to identify the particular server that will send data to device 106.

In step 566, the software is configured to communicate with the appropriate servers. The process then proceeds to step 590 in FIG. 5H.

In step 590, a browser prompts the user to sync the device. In one embodiment, a browser prompts the user to place their device in a cradle and synchronize the device. In step 592, the user synchronizes the device. A notification from the browser will be displayed to indicate that the client communication module 110 process is complete.

Returning to step 554 in FIG. 5D, if the user wishes to download the software, the download software option is selected. The process proceeds to step 556.

In step 556, the software is downloaded. In step 558, a notification is displayed to indicate that client 108 will be installed on device 106 upon synchronization.

In step 560, the browser is displayed to prompt the user to sync the device. In one embodiment, the browser prompts the user to place the device in the cradle and press the sync button to sync the device 106. The process then proceeds to step 568 in FIG. 5E.

In step 568, the browser queries the user as to whether the user wants to use their present account or create a new account. In step 570, if the user selects to use their existing account, the process proceeds to step 562 in FIG. 5D to configure the client communication module 110. If, in step 570, the user selects to create a new account, the process proceeds to step 572. In step 572, a new account for the user is created. The process then proceeds to step 562 in FIG. 5D to configure the client communication module 110.

Figure 5F:
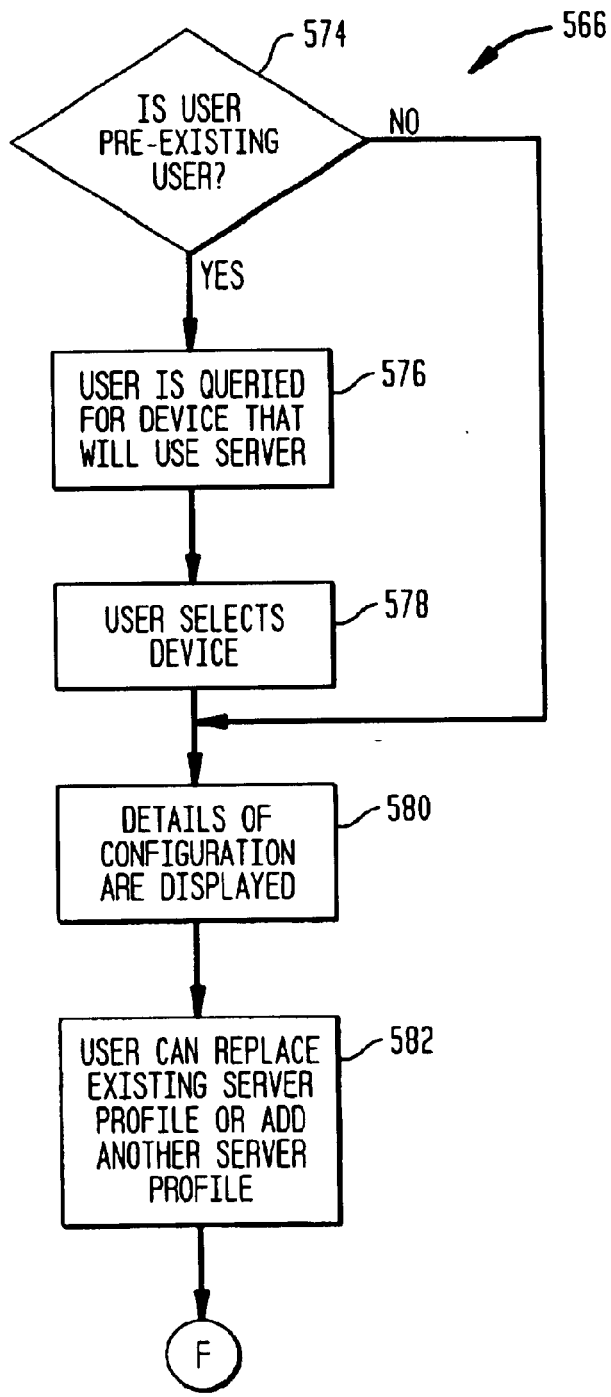

The process of configuring the software to communicate with the servers, such as server 104, will now be described in greater detail in FIG. 5F. The process begins with step 574.

In step 574, it is determined whether the user is a pre-existing user. If the user is a pre-existing user, the user is queried for the type of device that will use the server in step 576. In step 578, the user selects the type of device. The process then proceeds to step 580.

Returning to step 574, if the user is not a pre-existing user, the process proceeds to step 580.

In step 580, details of the configuration are displayed. The process proceeds to step 582.

In step 582, the user may replace their existing server profile or add another server profile. Many reasons may exist as to why a single user may want different server profiles. For example, a first server profile may contain only sports channels and a second server profile may be directed to stock channels. The process then proceeds to step 584 in FIG. 5G.

The user has the option of testing their settings. In step 584, the user is queried as to whether the user desires to test their settings. If the user selects the test settings option, the process proceeds to step 586. In step 586, the results of the tests are displayed. The process then proceeds to step 588.

Returning to step 584, if the user does not select the test settings option, the process proceeds to step 588.

In step 588, the process ends.

Figure 5G:
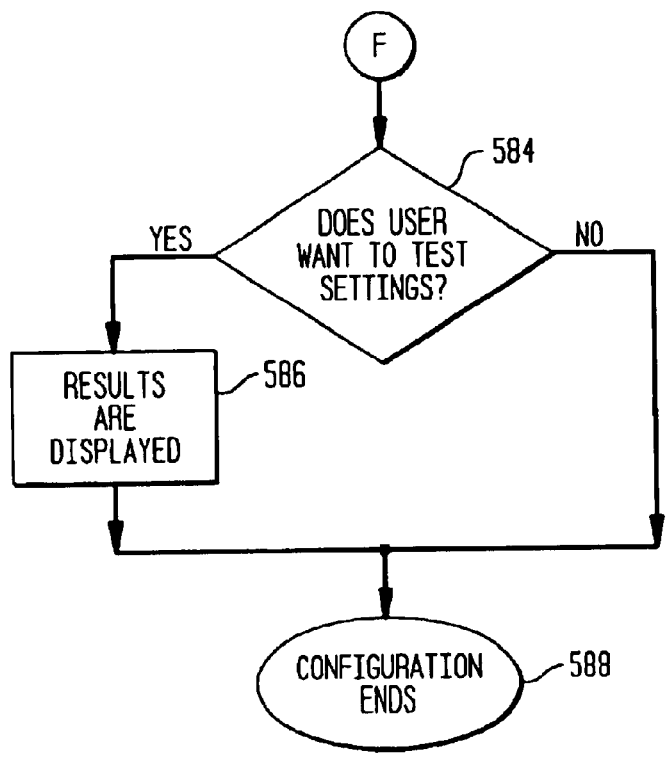
Figure 5H:
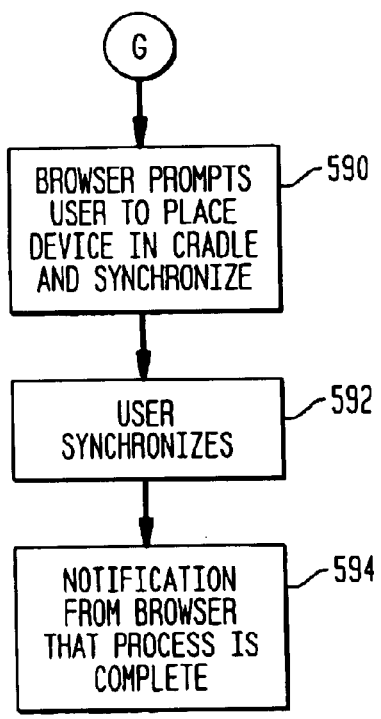
Figure 5I:
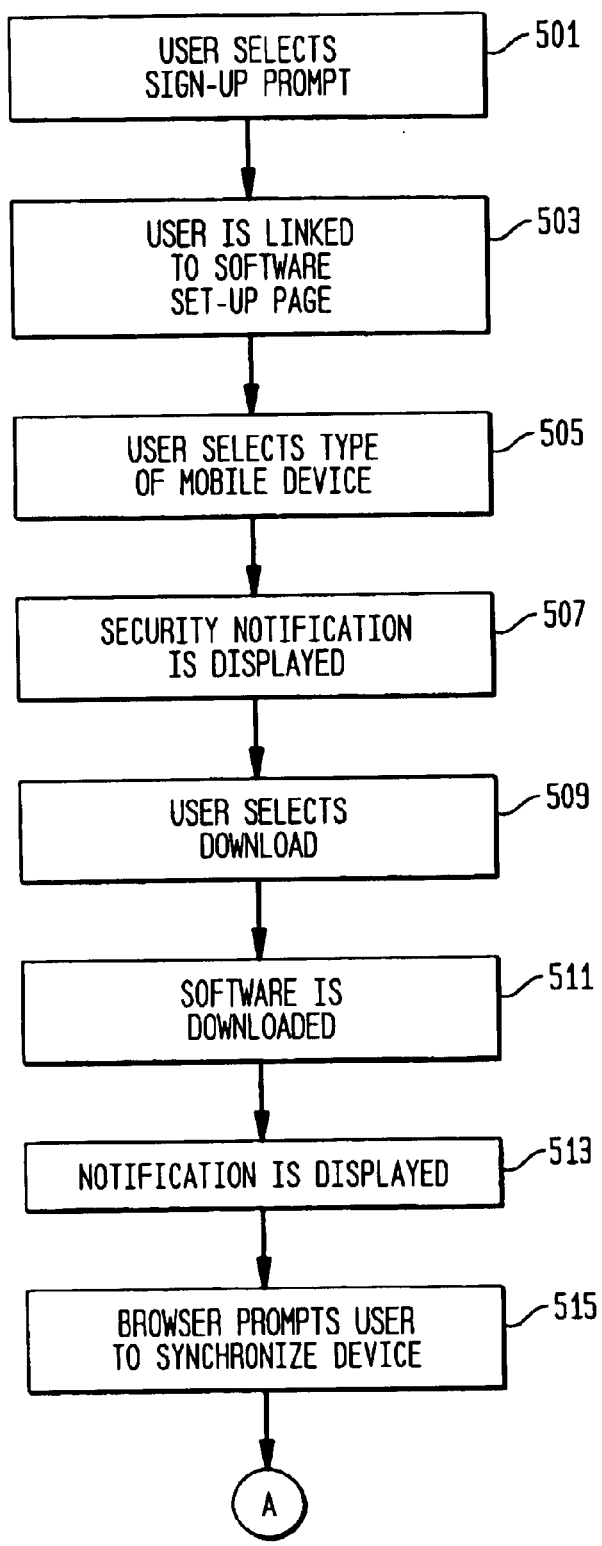
Figure 5J:
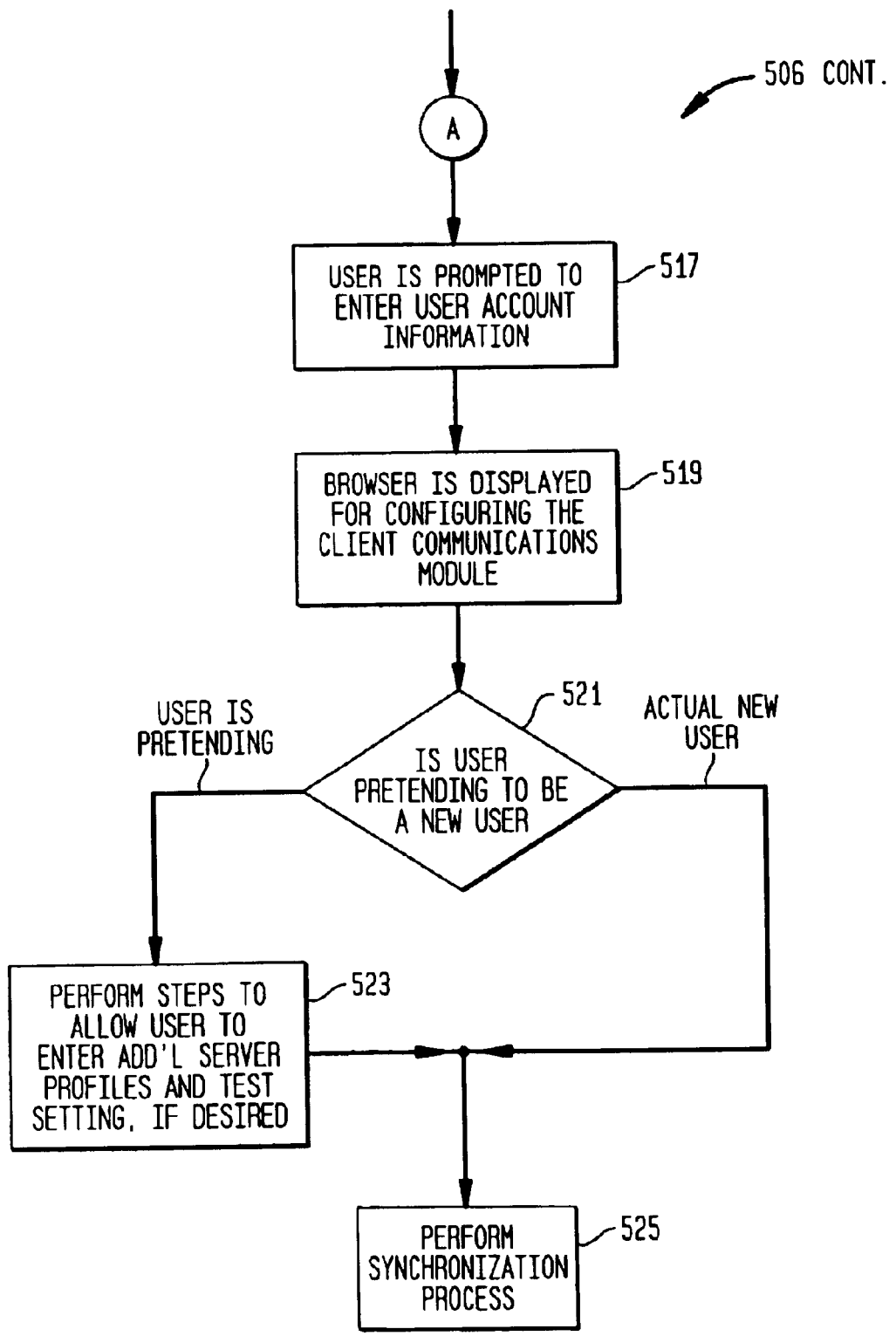

FIG. 5I is a flow diagram illustrating registration process 506 for a new user. The process begins with step 501. In step 501, the user selects the sign-up prompt. The user is then linked to the software setup page in step 503.

In step 505, the user selects the type of mobile device the user will be synchronizing.

In step 507, a security notification pertaining to import/export laws is displayed.

In step 509, the user selects the download software prompt. The software is downloaded in step 511. A notification is displayed indicating that the software has been successfully downloaded in step 513.

In step 515, the browser prompts the user to sync the device. In one embodiment, the browser prompts the user to place their device 106 into a cradle and initialize the sync process for the device. The process then proceeds to step 517 in FIG. 5J.

In step 517, the user is prompted to enter their user account information. The user account information may include, but is not limited to, the user's name, address, email address, and password. The process then proceeds to step 519.

In step 519, the browser is displayed for configuring the client communication module 110. The client communication module 110 application must be informed of the server that will send data to the user's device 106. The client communication module 110 is processed in a similar matter as described in steps 562, 564, and 566 of FIG. 5D.

In step 521, it is determined whether the new user is pretending to be a new user or is a real new user. If the user is pretending to be a new user, the process proceeds to step 523, where steps 582–588 in FIGS. 5F and 5G are performed to allow the user to replace their existing server profile, and to test the settings, if desired. If the user is an actual new user, the process proceeds to step 525. In step 525, the user is instructed to perform the synchronization process as described in steps 590–594 in FIG. 5H.

In one embodiment, a user may have access to a user account without having to be registered. FIG. 1T is a flow diagram describing a process for enabling an unregistered user to access server 104. The process begins with step 194A.

In step 194A an unregistered user invokes client 108. Control then proceeds to step 194B.

In step 194B, client 108 is synchronized with server 104. Server 104 assigns client 108 an anonymous account in step 194C. The process proceeds to step 194D.

In step 194D, server 104 periodically reminds client 108 to register. It is not a requirement that the user register. If the user registers, in step 194E, the user is promoted to a registered user.

3.4.4. Selecting and Organizing Channels for a Client

As described herein, the invention allows a user to select and organize channels for client 108 of device 106. FIG. 5K is a flow diagram describing a method for selecting and organizing channels. A process 531 begins with step 533. In step 533, a SLU, also referred to as a basket or cart, displays the current channels in a user's account. The SLU is representative of the user's account. In step 535, the SLU enables the user to create, remove, or modify channels.

Figure 5L:
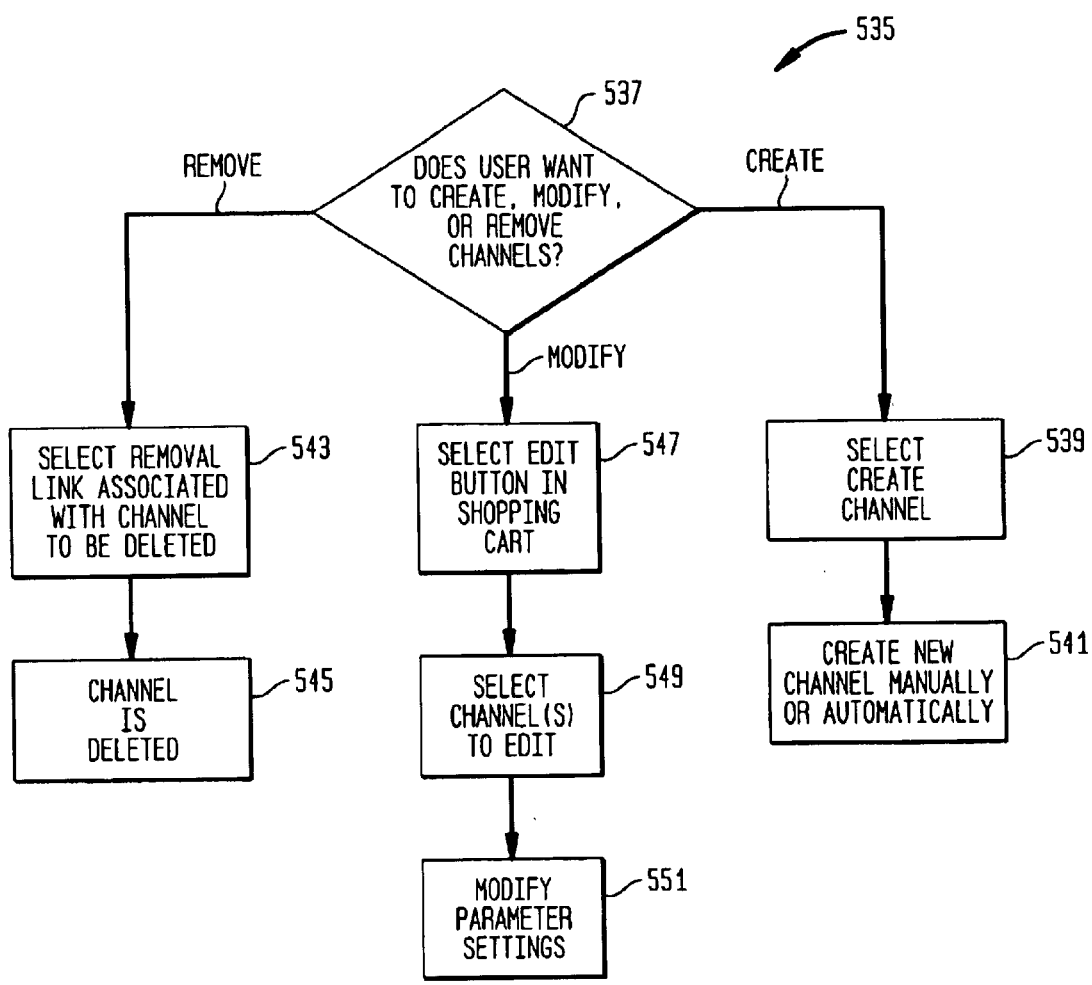

FIG. 5L is a flow diagram describing in greater detail, process 535 for creating, modifying, and removing channels. The process begins with decision step 537. In step 537, if the user wishes to create channels to place into their SLU, the process proceeds to step 539.

In step 539, the user may select the create channel button displayed in the SLU. In step 541, the user is then linked to the create channel page, where the user may manually enter information to add a favorite site to their account. The user may also create a new channel automatically using the automatic channel methods described above.

Returning to decision step 537, if the user wishes to remove channels from their SLU, the process proceeds to step 543. In step 543, the user selects the removal link associated with the channel to be deleted in the SLU. In step 545, the channel is deleted.

Returning to decision step 537, if the user wishes to modify channels that are contained in their SLU, the process proceeds to step 547.

In step 547, the user selects the edit button displayed on their SLU. The edit button links the user to the "user channels" page. In step 549, the user may click on a channel to be modified. Parameter data for that channel is then displayed, the parameter data may include, but is not limited to, the channel name, root URL, maximum size, link depth, an offsite links option, and refresh period setting.

In step 551, the user may modify the parameter(s) for the channel.

Device 106 may contain a channel manager. The channel manager operates in a similar manner as the SLU.

3.4.5. An Account Management Process

Figure 5M:
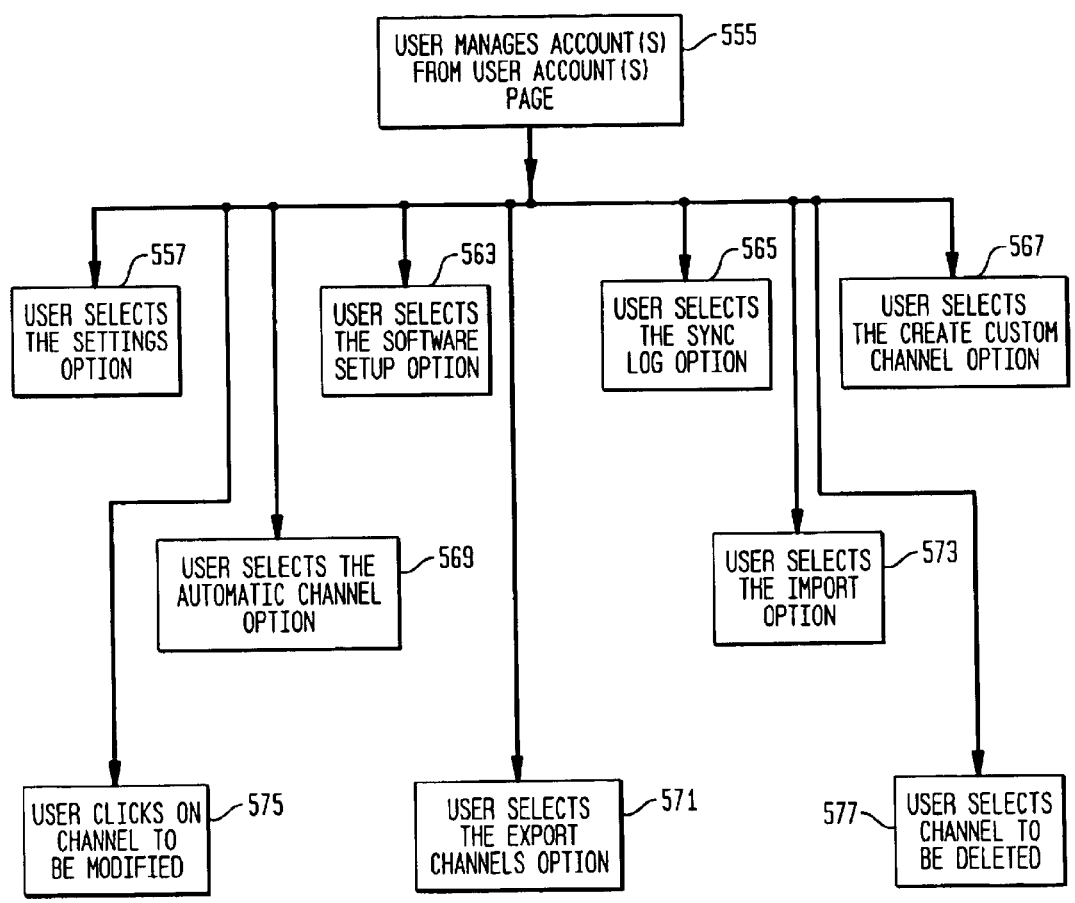

The invention also allows a user to manage their accounts without having to use the registration process for a current user. A flow diagram describing an account management process is shown in FIG. 5M. With the account management process, a user may choose to alter the settings of their account, update the software, view their sync history, create custom channels manually or automatically, export channels, import channels, modify channels, and delete channels. The process begins with step 555. In step 555, a user is allowed to manage their account from the "user channels" page of the Web site for server 104.

If the user wishes to alter their settings, the process proceeds to step 557. Account settings, such as the user's password and/or email address, may be altered in a similar manner as described in FIG. 5B.

If the user wishes to update the software, the process proceeds to step 563. The software may then be updated in a similar manner as described in FIGS. 5D, 5E, and 5H.

If the user wishes to view their sync history, the process proceeds to step 565. The user may view their sync history in a similar manner as described in FIG. 5B.

If the user wishes to create customized channels manually, the process proceeds to step 567. Customized channels are created in a similar manner as described in FIG. 5C.

If the user wishes to create channels automatically while surfing, the process proceeds to step 569. Channels are automatically created in a similar manner as described in FIG. 5C.

If the user wishes to export channels to other users, the process proceeds to step 571. The user's channels are exported to other users in a similar manner as described in FIG. 5B.

If the user wishes to import old channels and data files, the process proceeds to step 573. Old channels and data files are imported for viewing as described in FIG. 5B.

If the user wishes to modify channels, the process proceeds to step 575. Current user channels may be modified in a similar manner as described in FIG. 5B.

If the user wishes to remove channels from their account, the process proceeds to step 577. Channels are removed from the user's account in a similar manner as described in FIG. 5C.

4. Example User Interface Screen Shots

Various example screen shots related to the functionality of the invention are considered in this section. It is noted that these screen shots are provided for illustrative purposes only, and are not limiting. Additional screen shots will be apparent to persons skilled in the relevant art(s).

These screen shots are generated by the user interfaces of the invention, such as user interface 130 in the server 104 and user interface 144 in the clients 108. However, other modules of the invention may also contribute to the user interface function with regard to their respective functionalities and responsibilities. For example, and without limitation, the forms module 136 may contribute to user interface functionality with regard to forms.

Generally, screen shots are generated to enable interaction with users. For example, screen shots may be generated to provide information to users, or to obtain information from users. Other uses of screen shots will be apparent to persons skilled in the relevant art(s).

Figure 62:
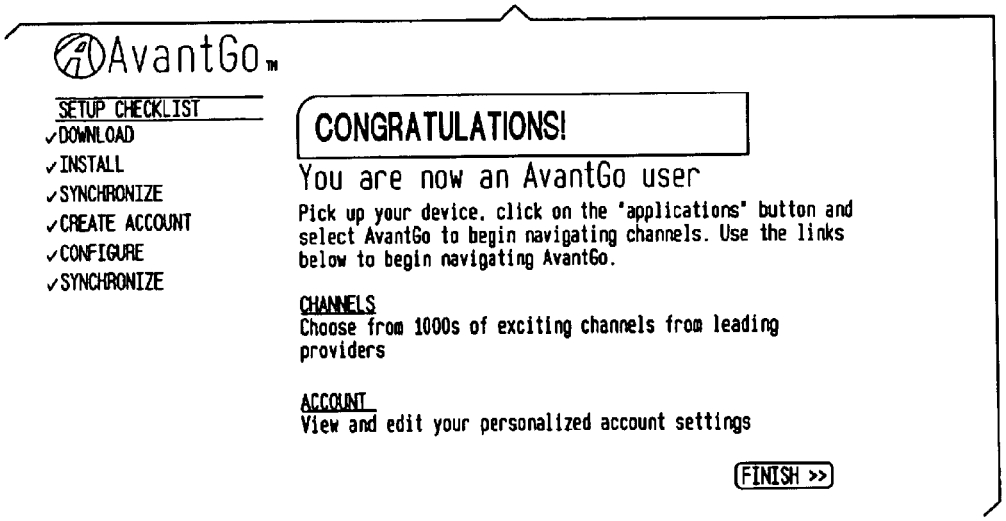

The screen shots in FIGS. 6–62 depict functionality of embodiments of the invention. The invention is directed to such functionality.

FIG. 6 is an example screen shot generated by forms module 136. This screen shot shows the status of forms completed by the client 108. Via this screen, the client 108 may obtain additional information on forms, and may manipulate the forms (such as delete selected forms).

Figure 7:
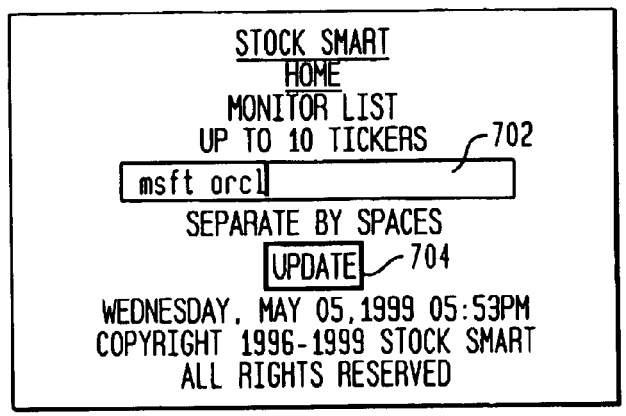

FIG. 7 is a screen shot of an example completed form displayed on a client 108.

Figure 8:
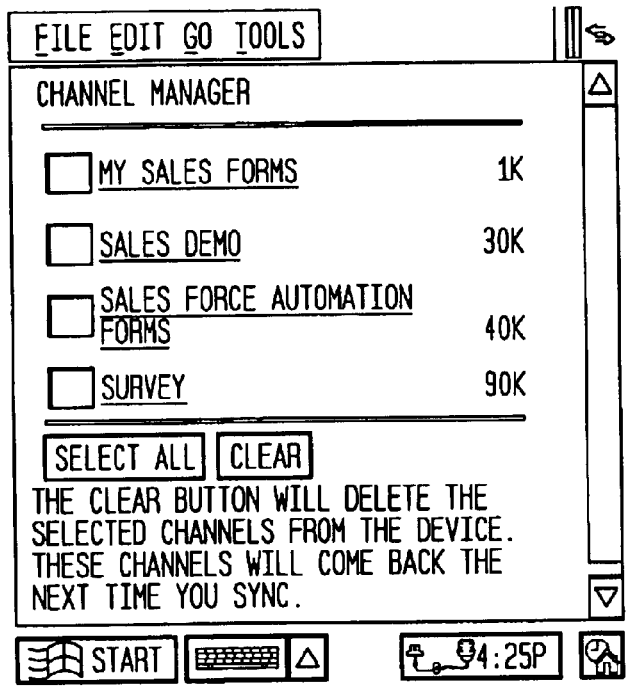

FIG. 8 is an example screen shot relating to the channel manager displayed on a client 108 (preferably, but not limited to, a device operating according to Windows CE). In this screen, the client 108 can remove channels, as well as perform other administrative tasks on channels.

Figure 9:
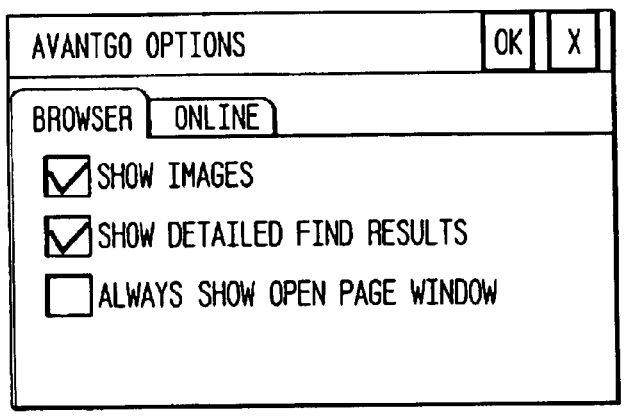
Figure 10:
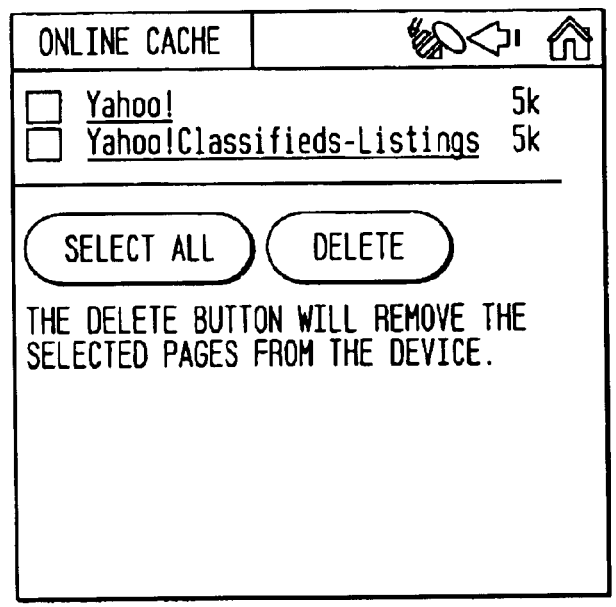

FIG. 9 is an example screen shot displayed on a client 108 relating to browsing options on client 108.

According to the invention, the client 108 can cache web pages in the databases of the client 108 when it is browsing the Internet (while connected to the server 104, for example). Then, when not connected to the Internet, the user of the client 108 may browse and interact with pages stored in the cache. FIG. 10 is an example screen shot that enables the client 108 to delete pages from the cache.

Figure 11:
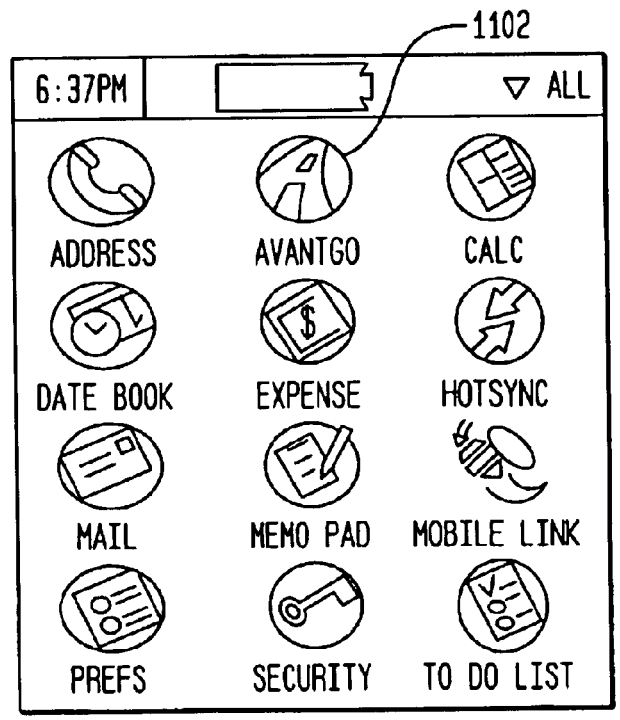

FIG. 11 is an example screen shot of an application menu displayed on the client 108. Item 1102 enables the user of the client 108 to access the functions of the client 108.

Figure 12:

FIG. 12 is an example screen shot representing a channel subscription page displayed on the client 108. When in the off-line mode, a user of the client 108 can elect to subscribe to channels listed in the channel subscription page. In an embodiment, the selected channels are loaded on the client 108 during the next synchronization operation.

Figure 13:
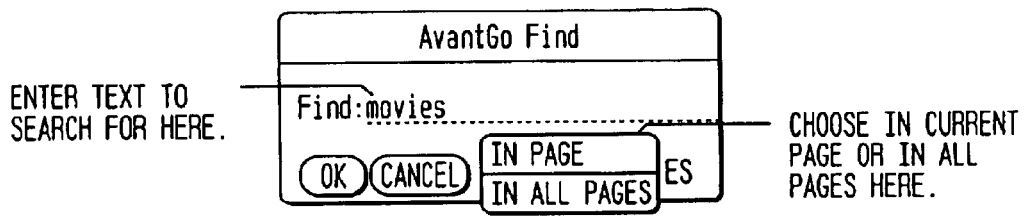

FIG. 13 is an example screen shot of a find function available on the client 108.

Figure 14:
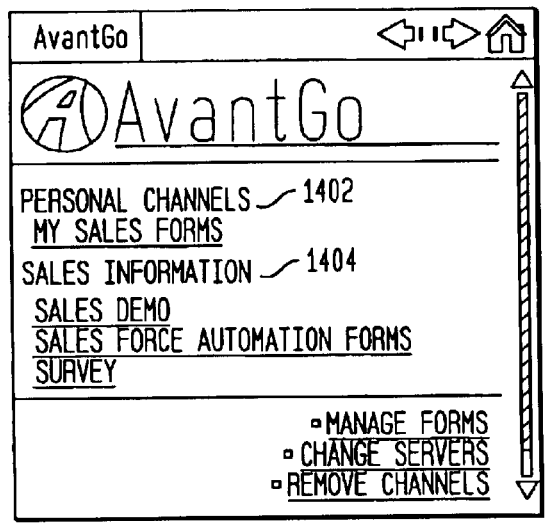

According to an embodiment of an invention, a corporate entity (or enterprise) controls a server 104, and its employees have devices 106 that interact with the server 104 in the manner discussed herein. The server 104 may support channels that are specific to the enterprise, or otherwise relevant to the enterprise (as well as supporting any other channels). FIG. 14 is an example screen shot of a home page for an enterprise having a server 104. The home page includes personal channels 1402 and group channels 1404. FIG. 20 shows an example screen shot corresponding to an enterprise specific channel that is displayed on the client 108.

Figure 15:
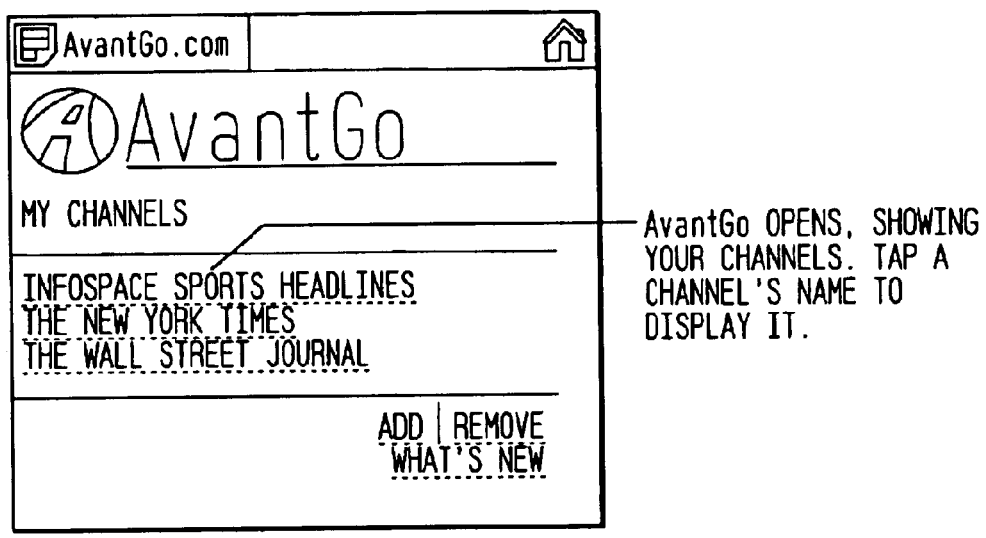

FIG. 15 is an example screen shot of a home page that is displayed on the client 108 when the client 108 connects to the server 104. The client 108 may be connected to the server 104 via a wireless link, for example (although the invention is not limited to this example).

Figure 16:
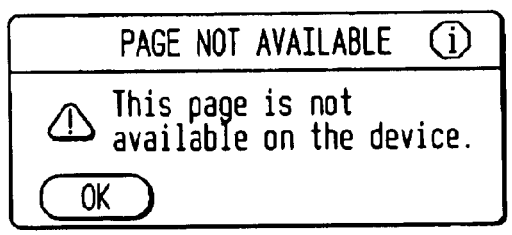

FIG. 16 is an example notification message that is displayed on the client 108 when the client 108 attempts to access a web page or other object that is not resident on the client 108 (either because the object was not loaded on the client 108 during the sync process, or the page is not in the on-device cache).

Figure 17:
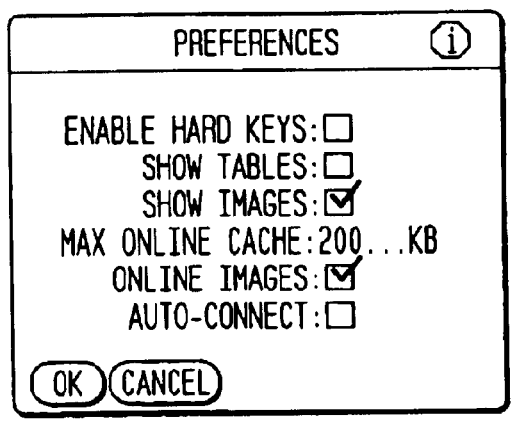

FIG. 17 is an example screen shot displayed on the client 108 showing preferences for operation on the client 108 (preferably, but not limited to, devices 106 using the Palm operating system).

FIG. 18 is an example screen shot displayed on the client 108 wherein a user may enter a URL to retrieve an object corresponding to the URL. When connected to server 104, server 104 will retrieve the object at the URL (although an attempt is first made to locate the object on the client 108). When not connected to the server 104, the on-device cache is checked for the object. If the object is not found, then in an embodiment the request for the URL is cached and then processed during the next sync (an example notification screen is shown in FIG. 19).

FIG. 19 is the confirmation message for action 162D of FIG. 1D.

FIG. 20 is a sample enterprise application optimized for use on the client in a mobile device.

Figure 21:
Figure 22:

FIGS. 21 and 22 indicate that it is possible to change fonts and font sizes on the client 108 to enhance display quality.

Figure 23:
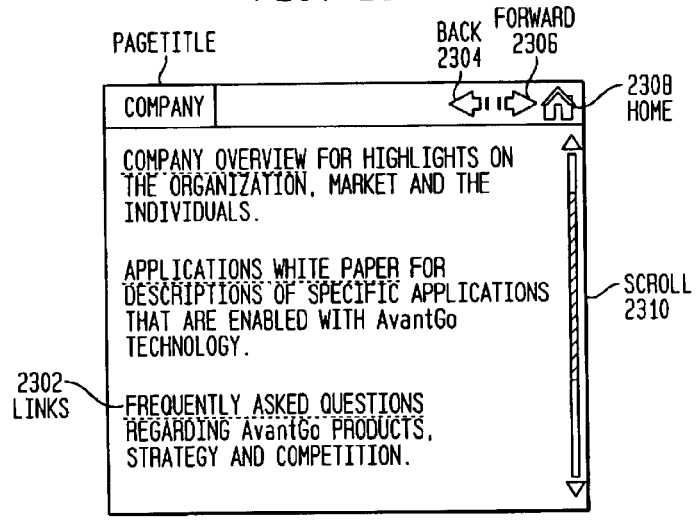

FIG. 23 shows an example screen shot displayed on a client 108 showing example navigation controls: links 2302, back 2304, forward 2306, home 2308, and scroll 2310.

Figure 24:
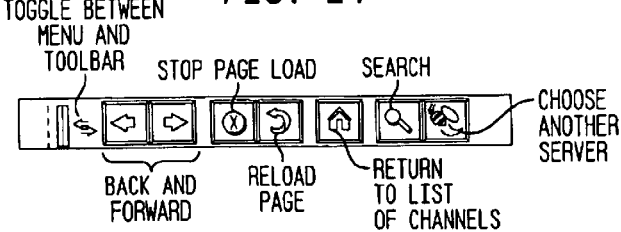
Figure 25:
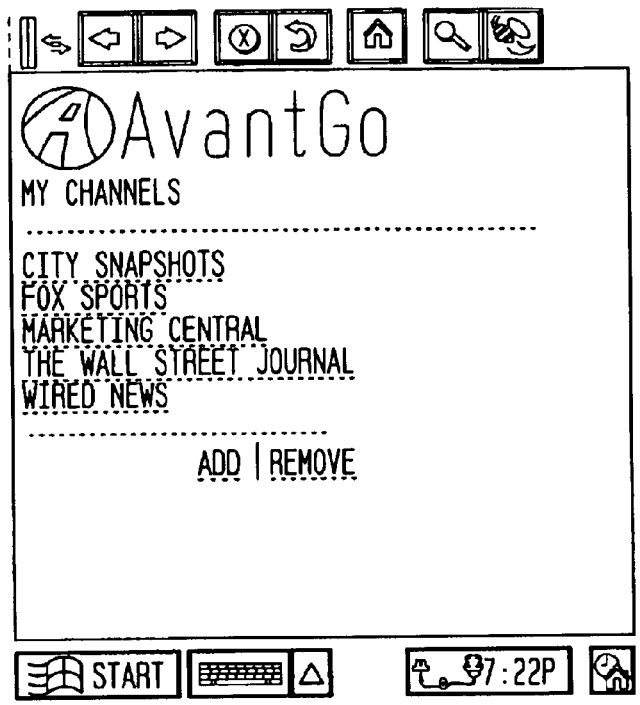
Figure 26:
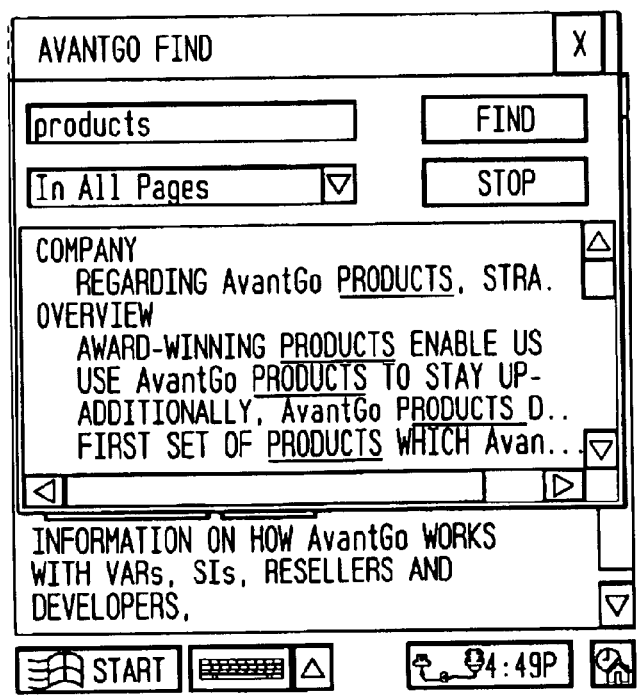
Figure 27:
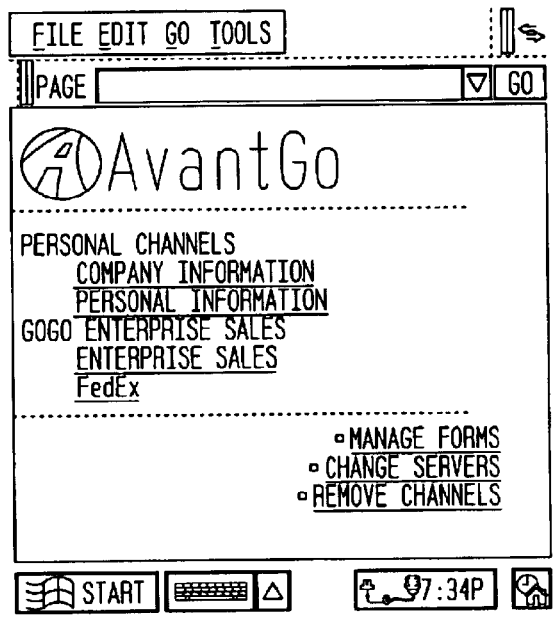

FIG. 24 shows an alternative menu/tool bar displayed on some clients 108 (such as clients 108 operating according to Windows CE environment). FIG. 25 illustrates a home page and FIG. 26 illustrates a find function displayed on some clients 108 (such as clients 108 operating according to Windows CE environment). FIG. 27 illustrates an example home page for an enterprise displayed on some clients 108 (such as clients 108 operating according to Windows CE environment).

Figure 28:
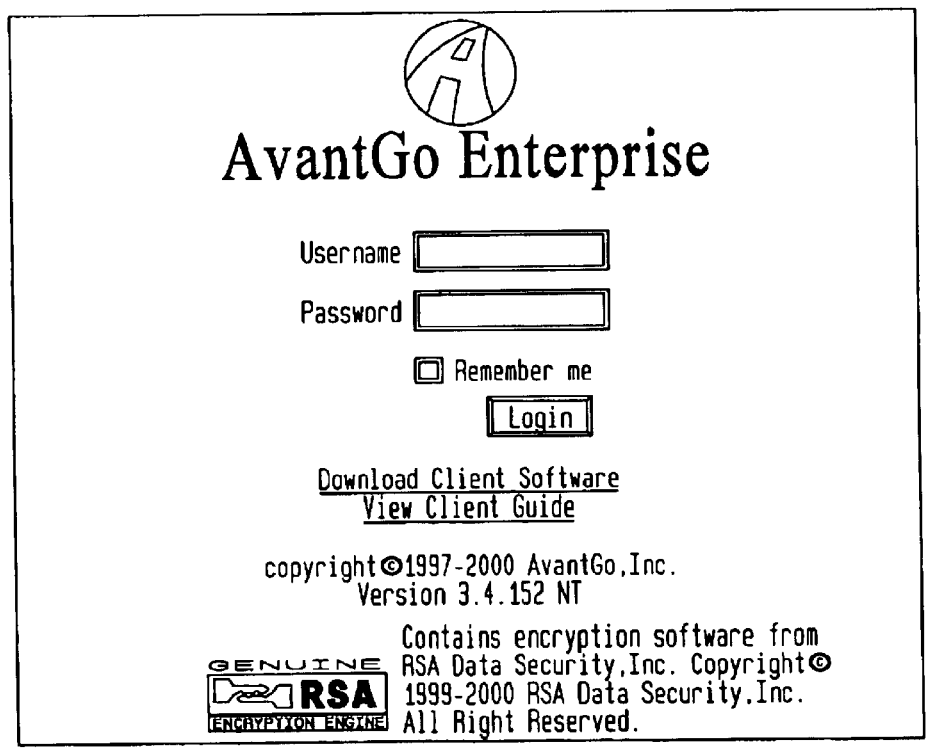

FIG. 28 shows an example enterprise server home page.

FIG. 29 shows example enterprise user interface naming conventions.

FIG. 30 illustrates an example enterprise software architecture.

FIG. 31 shows an example screen shot to enter new channels.

FIG. 32 shows an example screen shot to set refresh properties. It is noted that the user of the client 108 is permitted to indicate whether a particular object is refreshed at each sync, only once per day, or according to some other schedule. Accordingly, when a statement is made herein that some channel, object or other entity is loaded on the client 108 "during the next sync" (or using similar language), it should be understood that loading of the object/entity on the client 108 may occur during some other future sync operation (not just at the "next sync").

FIG. 33 shows an example screen shot to update user membership in a group.

Figure 34:
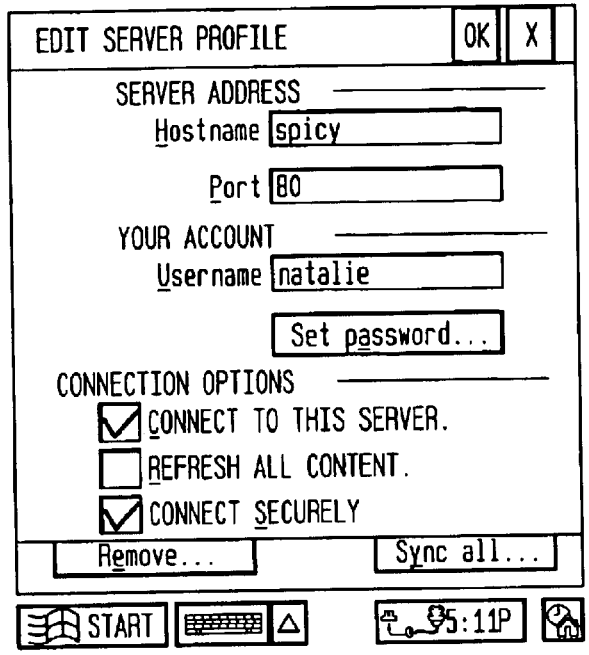

FIG. 34 shows an example edit server profile dialog.

Figure 35:
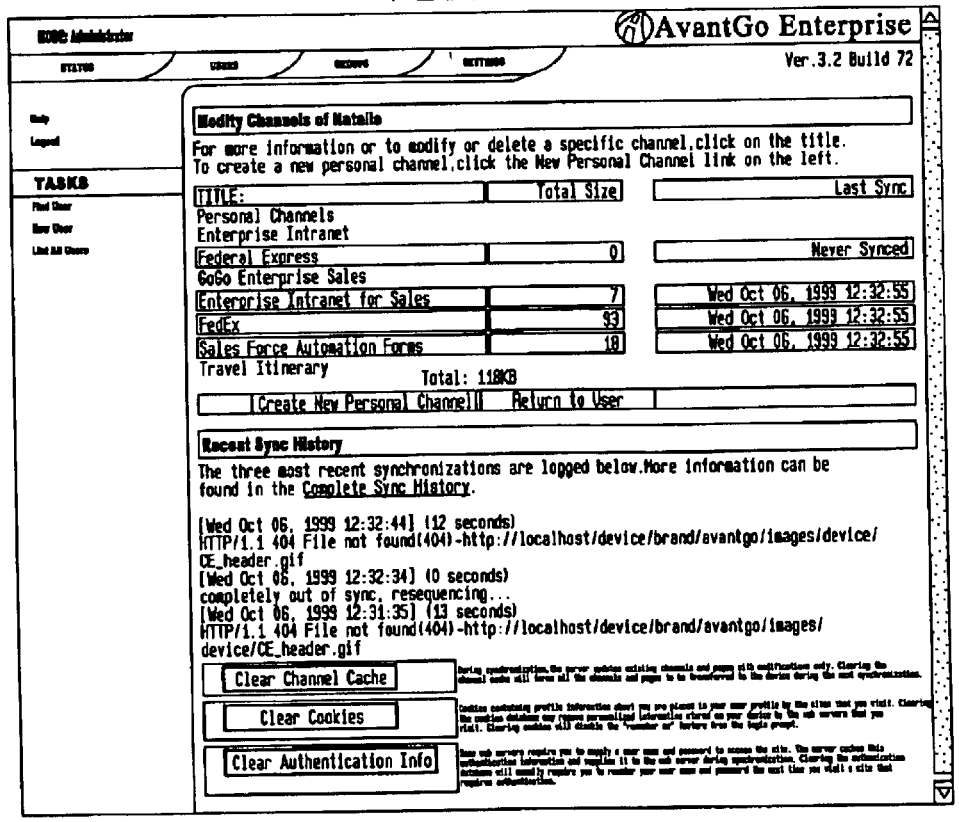

FIG. 35 shows an example screen shot to modify channels, and to display a sync history for a client 108.

Figure 36:
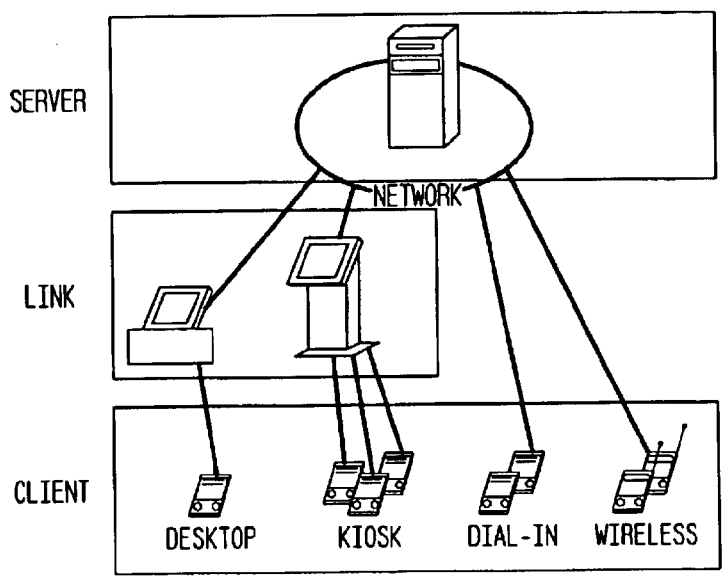

FIG. 36 shows an alternative view of the architecture of embodiments of the invention.

Figure 37:
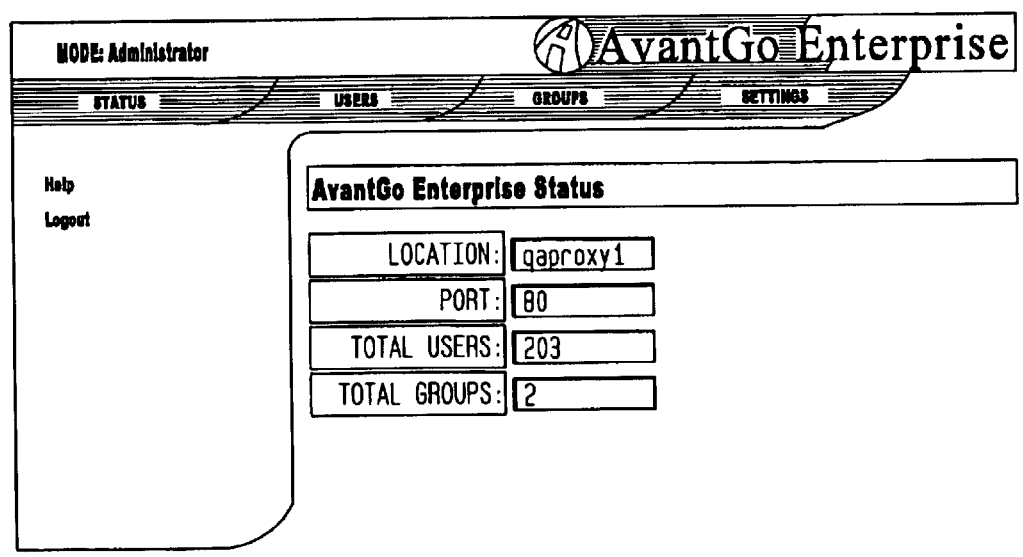

FIG. 37 shows an example enterprise server status page.

FIG. 38 shows an example find user page.

FIG. 39 shows an example user detail/account information page.

Figure 40:
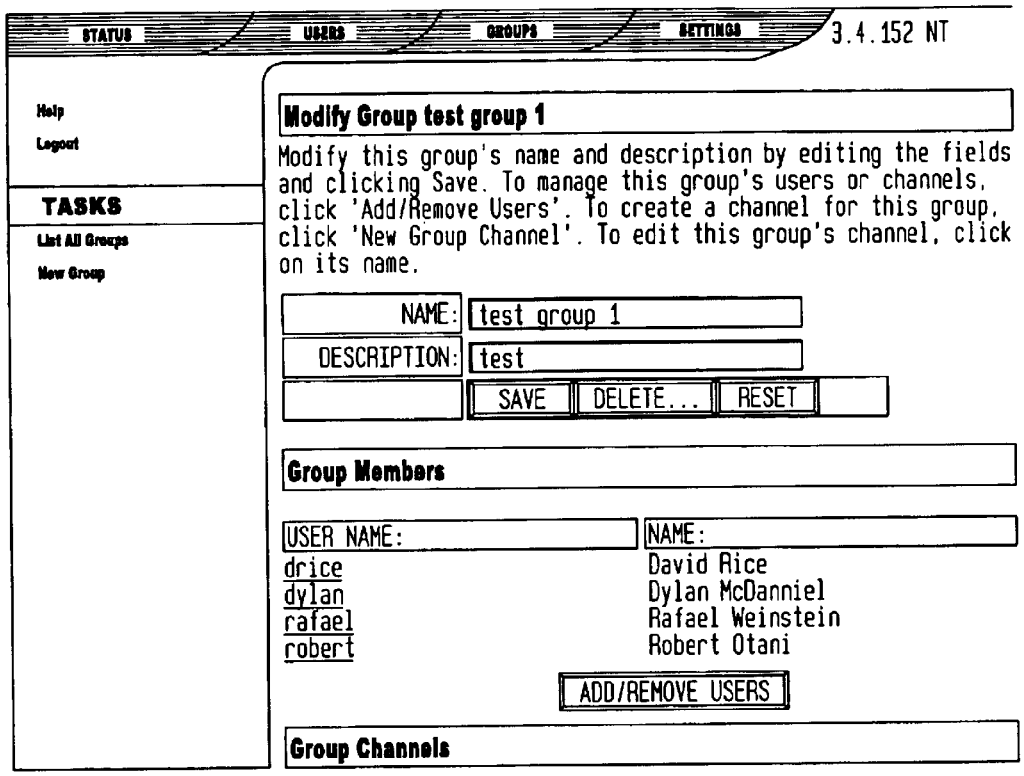

FIG. 40 shows an example screen shot to modify groups.

Figure 41:
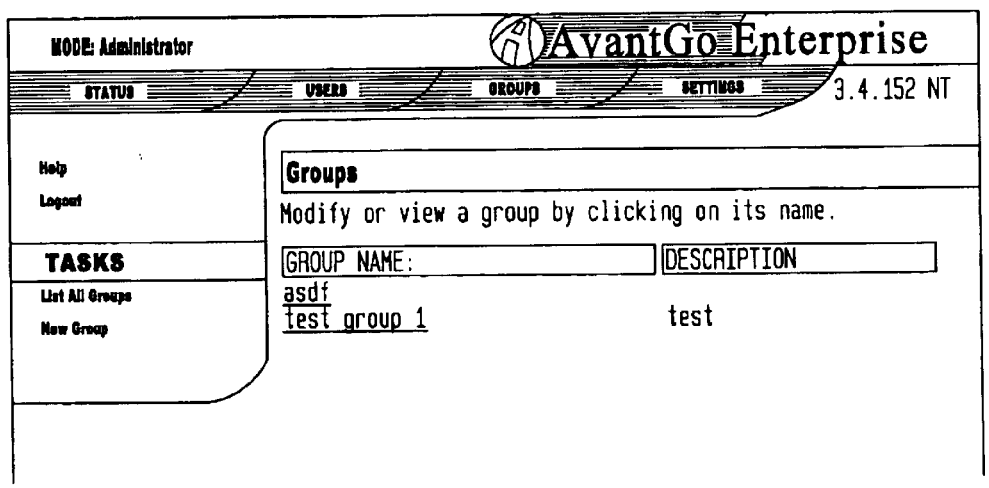

FIG. 41 shows an example screen shot showing group information.

Figure 42:
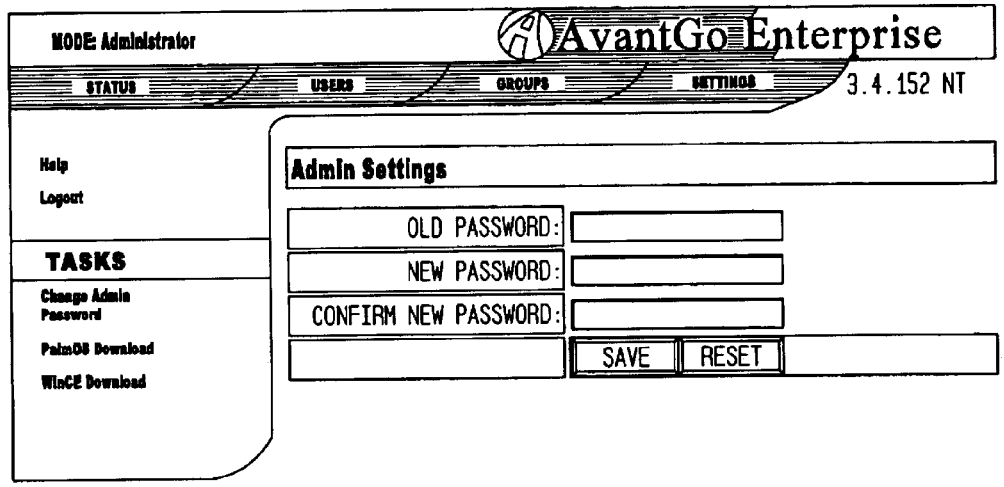

FIG. 42 shows an example screen shot to change admin passwords.

Figure 43:
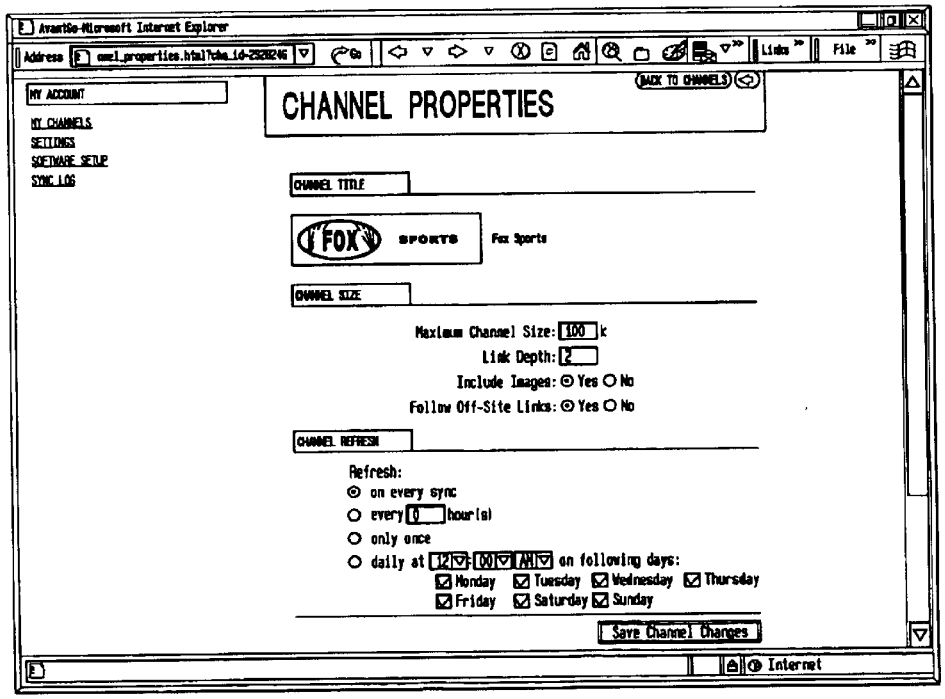

FIG. 43 shows an example screen shot to establish channel properties when adding a channel to the collection of channels supported by server 104.

FIG. 44 shows an example screen shot regarding a process for automatically adding channels, as described elsewhere herein.

Figure 45:
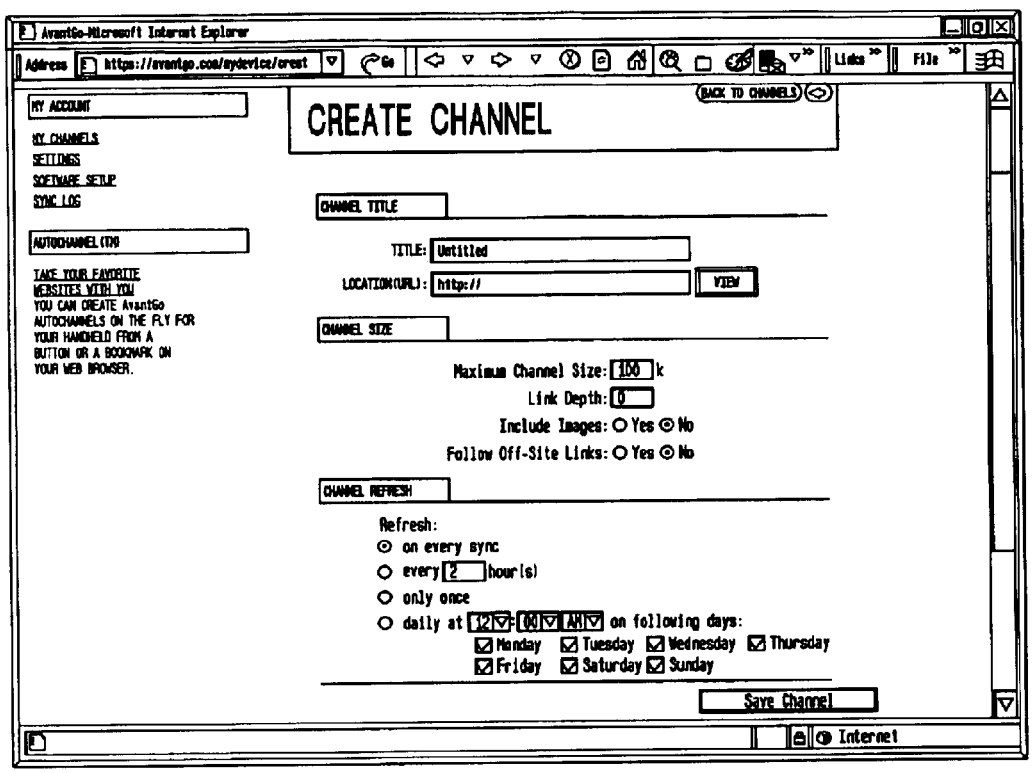

FIG. 45 shows an example screen shot to create a channel to add to the collection of channels supported by server 104.

Figure 46:
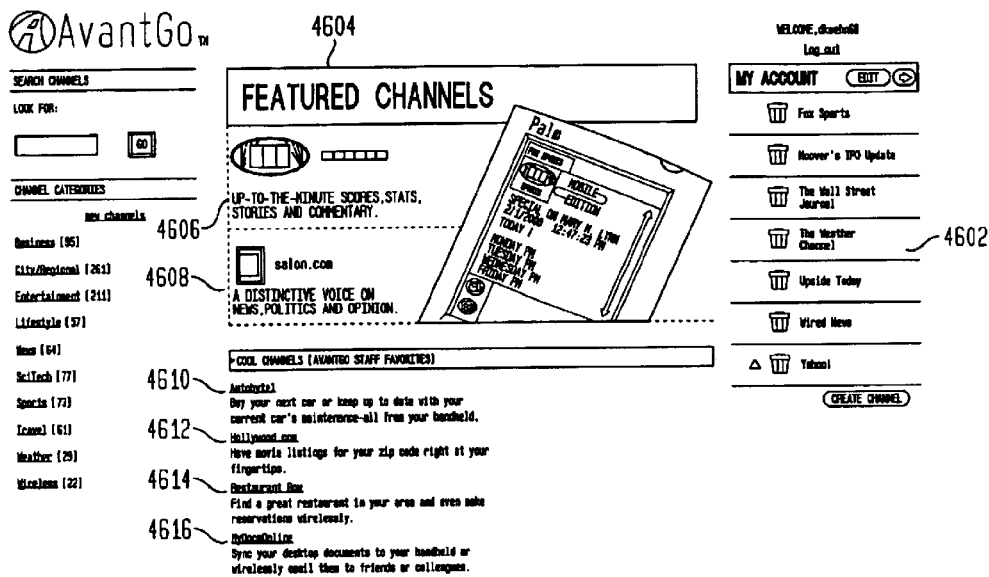

FIG. 46 shows an example personal account page. This page could be displayed on the device 108 or on some computer connected to the server 104 through any means, such as but not limited to the Internet. This page shows a list 4602 of the channels to which the user (or client 108) is currently subscribed. The page also shows a list 4604 of featured channels. The channels in the list 4604 of featured channels can be selected according to any procedure. For example, this list 4604 may include most frequently selected channels. Also, the list 4604 may be compiled based on financial considerations. For example, providers 128 may pay some compensation to have their channels in the featured channels list 4604. This compensation may be adjusted based on which slot on the featured channels list 4604 they have (such as the top spot 4606, the second spot 4608, etc.).

Figure 47:
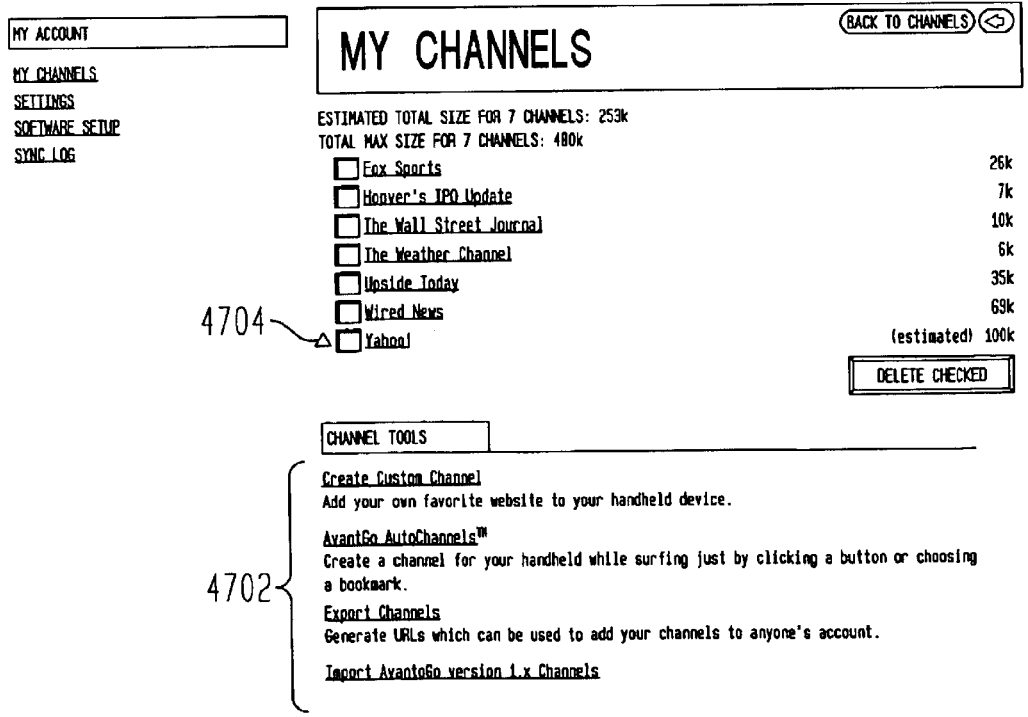

FIG. 47 shows an example channel manager page. This page could be displayed on the device 108 or on some computer connected to the server 104 through any means, such as but not limited to the Internet. In this page, the user can delete channels to which he is currently subscribed. The user can also add channels (to his or other users' accounts) via options designated as 4702. An icon is displayed if an account needs to be synced with the client 108.

FIG. 48 shows an account settings page to enable a user/client 108 to make changes to his account. This page could be displayed on the device 108 or on some computer connected to the server 104 through any means, such as but not limited to the Internet.

FIGS. 49–62 relate to registering a new client 108. These pages could be displayed any data processing device connected to the server 104 through any means, such as but not limited to the Internet.

Figure 50:
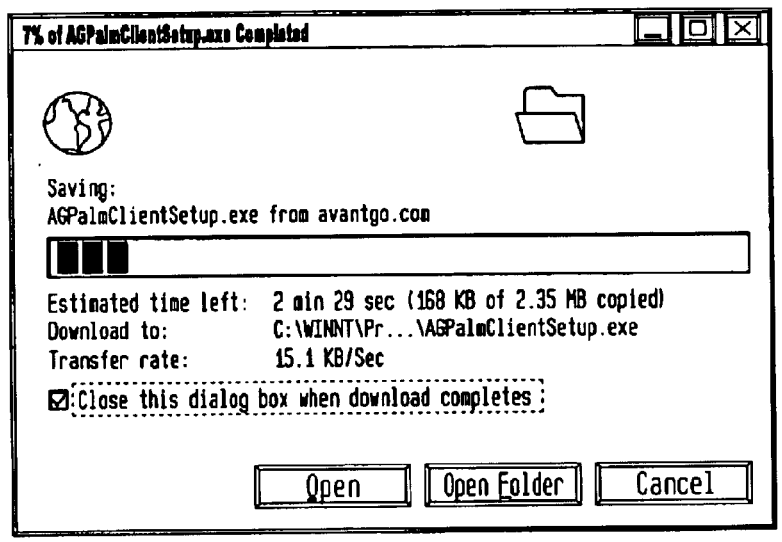
Figure 51:
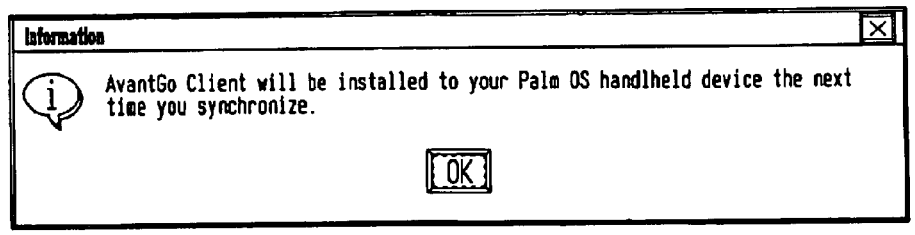

FIG. 49 shows an example software set up page. In this page, the user can elect which version of client software to download. FIG. 50 shows a display box that indicates the state of downloading the software selected in FIG. 49. After the software is downloaded, a notifier box shown in FIG. 51 informs the user that the client software will be install on the device 106 during the next sync between the device 106 and the computer that contains the software downloaded via FIGS. 49–50.

FIG. 52 is an instruction screen to help the user load the client software on device 106.

After the client software is installed on device 106, example screen shot in FIG. 53 is displayed. In this page, the user is able to indicate whether he is an existing user and wishes to use his existing account, or whether he wishes to open a new account. If the user indicates that he wants to open a new account, then the registration process follows (described elsewhere herein).

FIG. 54 is an example screen shot to enable the client 108 to configure client software to enable the client 108A to communication with the server 104. In an enterprise environment, clicking button 5402 will configure the client 108A to speak with the enterprise server 104 (i.e., a typically private server 104 controlled by an enterprise). In a non-enterprise environment, clicking button 5402 will configure the client 108A to speak with a non-enterprise server 104 (i.e., a typically publicly available server 104).

Figure 55:
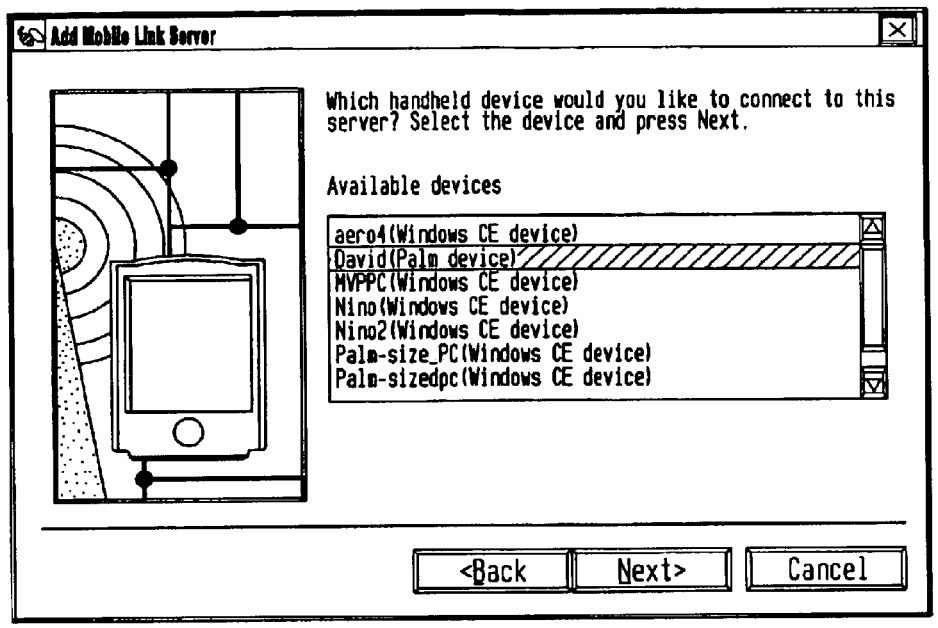

FIG. 55 is an example page that enables the user to select which device 106 to configure for communication with the server 104 (the user may have multiple devices 106).

Figure 56:
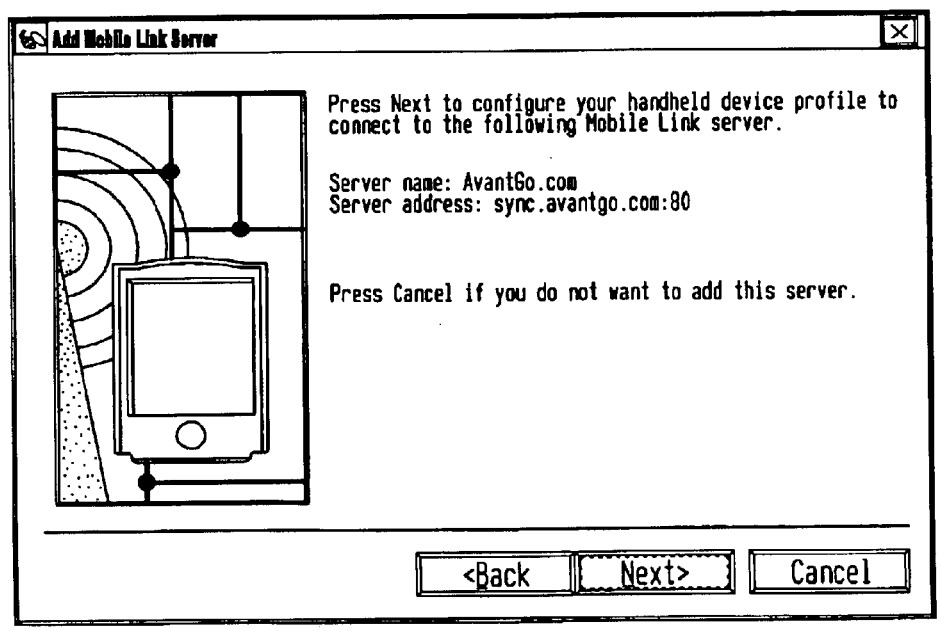

FIG. 56 is an example summary page indicating the user's selections from FIGS. 54 and 55.

Figure 57:
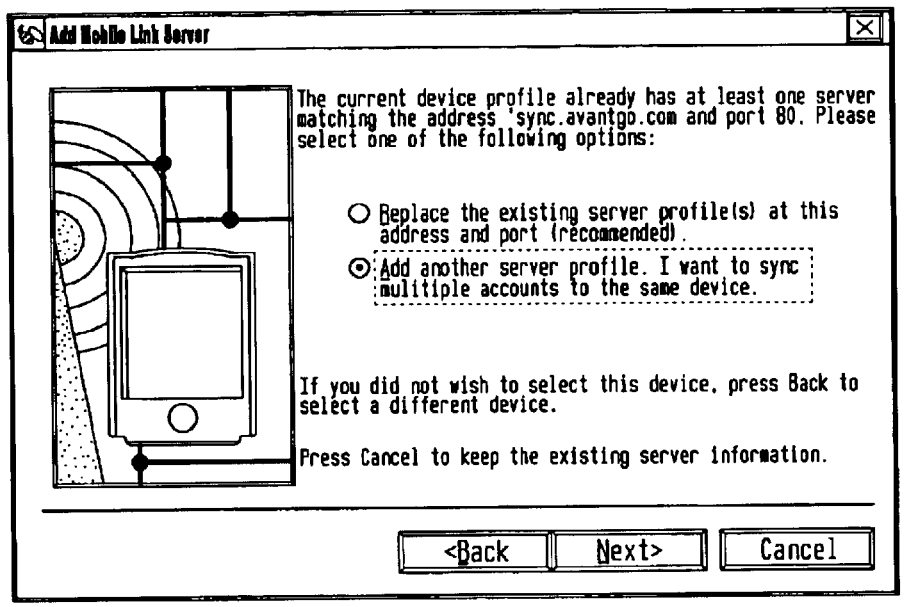

FIG. 57 is an example page that enables the user to indicate whether he wishes to add another server profile, or to overwrite the existing server profile.

Figure 58:
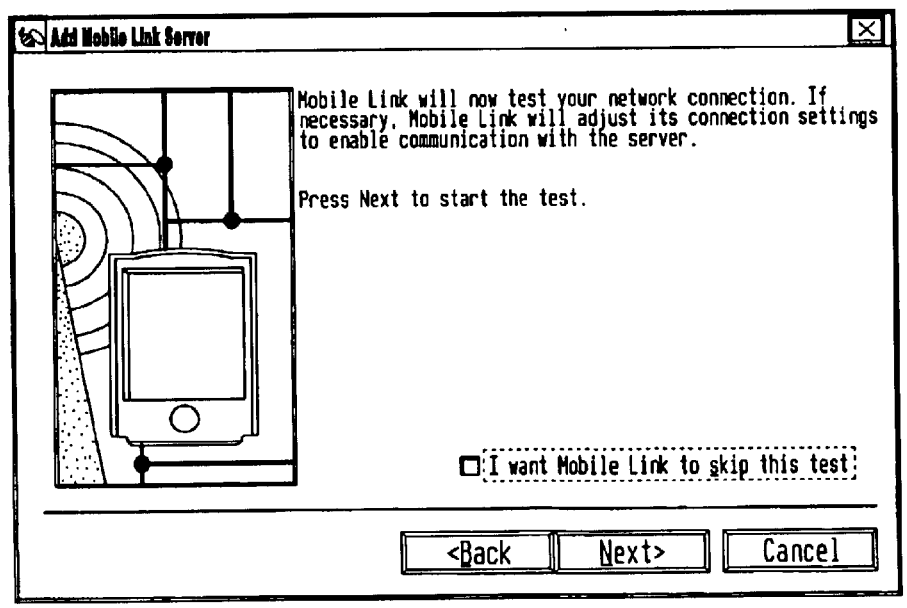
Figure 59:
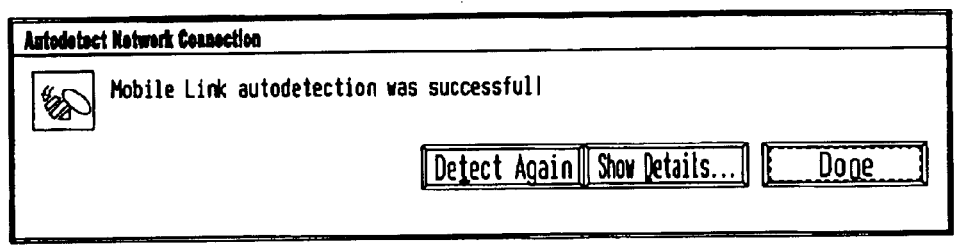
Figure 60:
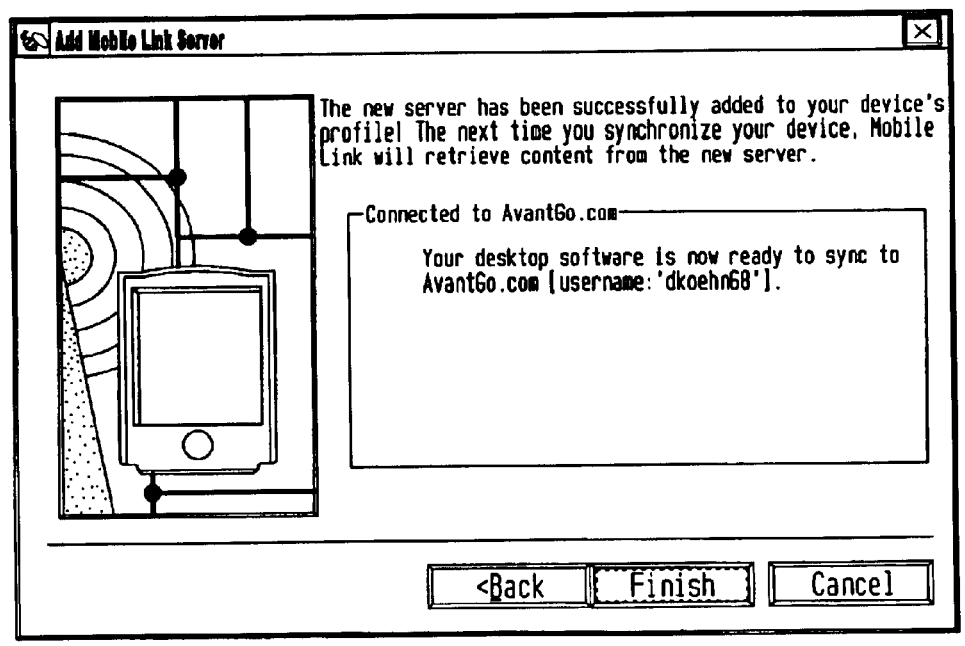

FIG. 58 is an example page that enables the user to test the connection between client 108A and server 104. FIG. 59 is an example page displayed if this test is successful. FIG. 60 is a summary page that indicates the state of the status of the set up process.

Figure 61:
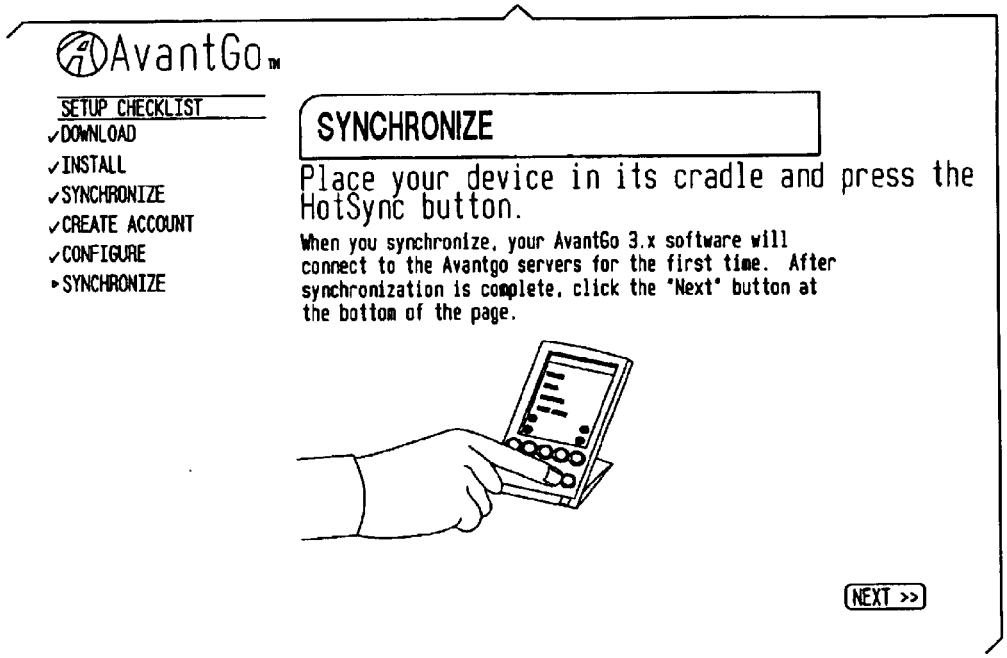

FIG. 61 is an example page that provides information regarding syncing with the server 104.

FIG. 62 is an example page confirming successful registration with server 104.

5. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method of browsing web-based content of a network while not in communication over the network, comprising the steps of:

(1) synchronizing a client and a server to transfer to the client objects associated with one or more web-based channels;

(2) storing said objects in the client;

(3) enabling browsing of said stored objects at the client by a user while the client is not in communication with the server; and (4) tracking user behavior during browsing of said stored objects.

2. The method of claim 1, wherein step (1) comprises the step of:

synchronizing the client and the server to transfer to the client objects associated with one or more web-based channels previously chosen by the client from a list of web-based channels embodied on a home page of the server.

3. The method of claim 1, wherein the client resides on one of a handheld communications device and a handheld data processing device.

4. The method of claim 3, wherein said handheld communications device and said handheld data processing device comprises one of a cellular phone, a pager, a radio, a TV, an audio device, a recorder, a text-to-speech device, a bar code scanner, a net appliance, a mini-browser, a hand-held computer, and a personal data assistants (PDA).

5. The method of claim 3, further comprising the step of:

transmitting tracked user behavior information to the server upon synchronization, wherein the tracked user behavior information is sent to an appropriate provider.

6. The method of claim 1, wherein step (3) comprises the step of:

(i) interactively browsing said stored objects at the client while the client is not in communication with the server.

7. The method of claim 6, wherein step (i) comprises the steps of:

displaying at the client a form page containing one or more form elements;

enabling a user to provide input associated with said form elements; and caching said user input in the client.

8. The method of claim 7, further comprising the steps of:

transferring said user input to the server during synchronization between the server and the client;

receiving from the server second objects pertaining to said user input that the server obtained from one or more providers based on said user input;

storing said second objects in the client; and enabling browsing of said stored second objects at the client while the client is not in communication with the server.

9. The method of claim 8, wherein said user can review the cached information before and after synchronization.

10. The method of claim 8, wherein an appropriate notification is provided to said user during synchronization.

11. The method of claim 7, further comprising the steps of:

displaying at the client a second form page containing one or more second form elements;

enabling a user to provide input associated with said second form elements; and caching said user input associated with said second form elements in the client.

12. The method of claim 1, wherein step (3) comprises the step of processing one or more context sensitive objects based on one or more context sensitive triggers.

13. The method of claim 12, wherein said context sensitive objects include one or more of a business card, advertisement, email, to-do list, calendar event, ticket notification, product code, and channel, and said context sensitive triggers include one or more of a zip code, bar code, time of day, user preferences, last sync location, whether the client is in range of a transmitter, credit card, temperature, altitude, location, and an agent, arbiter, or avatar.

14. A method of enabling browsing at a client of web-based content of a network while the client is not in communication over the network, comprising the steps of:

(1) assembling a plurality of web-based channels at a server;

(2) enabling a client to select one or more of said web-based channels;

(3) obtaining objects associated with said selected web-based channels;

(4) transferring to the client at least some of said objects during synchronization with the client, wherein said at least some of said objects are stored at the client for browsing at the client by a user while the client is not in communication with the server; and (5) tracking user behavior during browsing of said stored objects.

15. The method of claim 14, wherein step (4) comprises the steps of:

comparing information related to said objects with information related to the client to identify any of said objects not already resident at the client; and transferring to the client said any of said objects not already resident at the client.

16. The method of claim 14, wherein step (4) comprises the steps of:

comparing information related to said objects with information related to the client to identify any of said objects that have been altered from objects resident at the client; and transferring to the client said any of said objects that have been altered from objects resident at the client.

17. The method of claim 14, wherein step (3) comprises the steps of:

(i) identifying top level resources needed to fulfill the client's selection of one or more of said web-based channels;

(ii) communicating with providers of said objects to obtain top level resources;

(iii) determining other resources needed to maintain the integrity of information related to said objects; and (iv) optimizing said objects to fit within the parameters of the client.

18. The method of claim 17, wherein step (3)(iv) comprises the step of:
- transforming specific values of said objects in a conversion process to an encoding that is optimized for the client.

19. A computer program product comprising a computer useable medium including control logic stored therein, said control logic enabling browsing of web-based content of a network while not in communication over the network, said control logic comprising:
- synchronization means for enabling a processor to synchronize a client and a server to transfer to the client objects associated with one or more web-based channels that were previously selected;
- storing means for enabling a processor to store said objects in the client;
- browsing means for enabling a processor to enable browsing of said stored objects at the client by a user while the client is not in communication with the server; and
- tracking means for enabling a processor to track user behavior during browsing of said stored objects.

20. The computer program product of claim 19, wherein said synchronization means comprises means for enabling a processor to synchronize the client and the server to transfer to the client objects associated with said one or more web-based channels previously chosen by the client from a list of channels embodied on a home page of the server.

21. The computer program product of claim 19, wherein the client resides on one of a handheld communications device and a handheld data processing device.

22. The computer program product of claim 21, wherein said handheld communications device and said handheld data processing device comprises one of a cellular phone, a pager, a radio, a TV, an audio device, a recorder, a text-to-speech device, a bar code scanner, a net appliance, a mini-browser, a handheld computer, and a personal data assistants (PDA).

23. The computer program product of claim 19, wherein said browsing means comprises:
- interactive means for enabling a processor to interactively browse said stored objects at the client while the client is not in communication with the server.

24. The computer program product of claim 23, wherein said interactive means comprises:
- displaying means for enabling a processor to display at the client a form page containing one or more form elements;
- enabling means for enabling a processor to enable a user to provide input associated with said form elements; and
- caching means for enabling a processor to cache said user input in the client.

25. The computer program product of claim 24, wherein said control logic further comprises:
- transferring means for enabling a processor to transfer said user input to the server during synchronization between the server and the client;
- receiving means for enabling a processor to receive from the server second objects pertaining to said user input that the server obtained from one or more providers based on said user input;
- storing means for enabling a processor to store said second objects in the client; and
- browsing means for enabling a processor to enable browsing of said stored second objects at the client while the client is not in communication with the server.

26. The computer program product of claim 25, wherein said user can review the cached information before and after synchronization.

27. The computer program product of claim 25, wherein an appropriate notification is provided to said user during synchronization.

28. The computer program product of claim 24, wherein said control logic further comprises:
- displaying means for enabling a processor to display at the client a second form page containing one or more second form elements;
- enabling means for enabling a processor to enable a user to provide input associated with said second form elements; and
- caching means for enabling a processor to cache said user input associated with said second form elements in the client.

29. The computer program product of claim 19, wherein said browsing means comprises processing means for enabling a processor to process one or more context sensitive objects based on one or more context sensitive triggers.

30. The computer program product of claim 29, wherein said context sensitive objects include one or more of a business card, advertisement, email, to-do list, calendar event, ticket notification, product code, and channel, and said context sensitive triggers include one or more of a zip code, bar code, time of day, user preferences, last sync location, whether the client is in range of a transmitter, credit card, temperature, altitude, location, and an agent, arbiter, or avatar.

31. The computer program product of claim 19, wherein said control logic further comprises:
- transmitting means for enabling a processor to transmit tracked user behavior information to the server upon synchronization, wherein the tracked user behavior information is sent to an appropriate provider.

32. A computer program product comprising a computer useable medium including control logic stored therein, said control logic enabling browsing at a client of web-based content of a network while the client is not in communication over the network, said control logic comprising:
- assembling means for enabling a processor to assemble a plurality of web-based channels at a server;
- enabling means for enabling a processor to enable a client to select one or more of said web-based channels;
- obtaining means for enabling a processor to obtain objects associated with said selected web-based channels;
- transferring means for enabling a processor to transfer to the client at least some of said objects during synchronization with the client, wherein said at least some of said objects are stored at the client for browsing by a user at the client while the client is not in communication with the server; and
- tracking means for enabling a processor to track user behavior during browsing of said stored objects.

33. The computer program product of claim 32, wherein said transferring means comprises:
- comparing means for enabling a processor to compare information related to said objects with information related to the client to identify any of said objects not already resident at the client; and
- transferring means for enabling a processor to transfer to the client said any of said objects not already resident at the client.

34. The computer program product of claim 32, wherein said transferring means comprises:

comparing means for enabling a processor to compare information related to said objects with information related to the client to identify any of said objects that have been altered from objects resident at the client; and transferring means for enabling a processor to transfer to the client said any of said objects that have been altered from objects resident at the client.

35. The computer program product of claim 32, wherein said obtaining means comprises:

identifying means for enabling a processor to identify top level resources needed to fulfill the client's selection of one or more of said channels;

communicating means for enabling a processor to communicate with providers of said objects to obtain top level resources;

determining means for enabling a processor to determine other resources needed to maintain the integrity of information related to said objects; and optimizing means for enabling a processor to optimize said objects to fit within the parameters of the client.

36. The computer program product of claim 35, wherein said optimizing means comprises:

transforming means for enabling a processor to transform specific values of said objects in a conversion process to an encoding that is optimized for the client.

* * * * *